(12) United States Patent
Bashan et al.

(10) Patent No.: US 8,695,885 B2
(45) Date of Patent: *Apr. 15, 2014

(54) CONTACTLESS SMART STICKER

(76) Inventors: Oded Bashan, Rosh Pinu (IL); Guy Shafran, Hong Kong (HK); Tom Rahav, Kfar Tavor (IL); Dudu Lev, Eilnt (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,266

(22) Filed: May 23, 2012

(65) Prior Publication Data

US 2012/0228387 A1    Sep. 13, 2012

Related U.S. Application Data

(63) Continuation of application No. 12/564,222, filed on Sep. 22, 2009, now Pat. No. 8,186,603.

(51) Int. Cl.
*G06K 19/06* (2006.01)

(52) U.S. Cl.
USPC ........................................ 235/492; 235/487

(58) Field of Classification Search
USPC ................. 235/492, 487, 451, 488
See application file for complete search history.

(56) References Cited

U.S. PATENT DOCUMENTS

| 8,186,603 B2 * | 5/2012 | Bashan et al. | 235/492 |
| 2002/0100810 A1 * | 8/2002 | Amadeo | 235/492 |
| 2003/0025186 A1 * | 2/2003 | Leduc et al. | 257/679 |
| 2004/0155114 A1 * | 8/2004 | Rietzler | 235/492 |
| 2008/0117049 A1 | 5/2008 | Ogata et al. | |

FOREIGN PATENT DOCUMENTS

WO    WO 2005/088704    9/2005

OTHER PUBLICATIONS

European Search Report of Application No. EP 10 17 7796 mailed on Jan. 27, 2011.

* cited by examiner

*Primary Examiner* — Daniel StCyr
(74) *Attorney, Agent, or Firm* — Pearl Cohen Zedek Latzer Baratz LLP

(57) ABSTRACT

A method for manufacture of a contactless smart card device including mounting at least one antenna and at least one smart card module onto a substrate layer, placing aramagnetic material over at least part of the at least one antenna, and laminating the substrate layer and the paramagnetic material to provide a laminate.

17 Claims, 45 Drawing Sheets

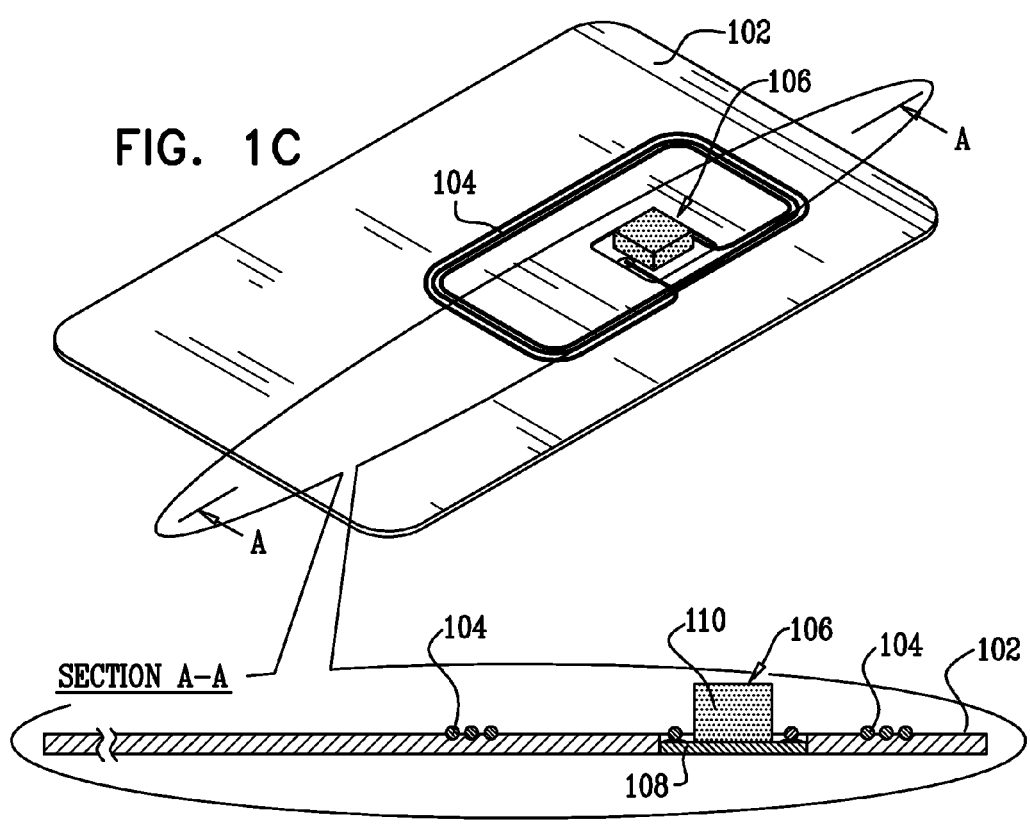

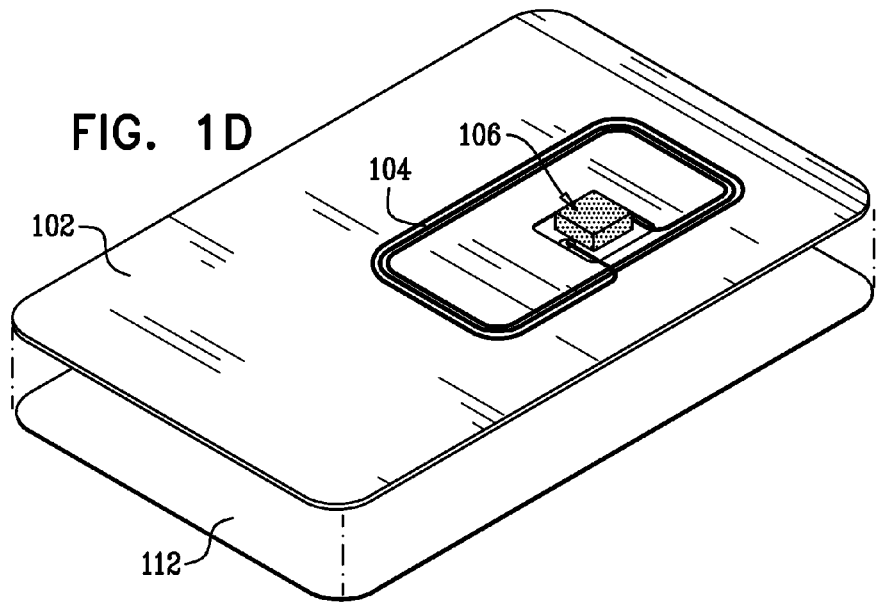
FIG. 1D
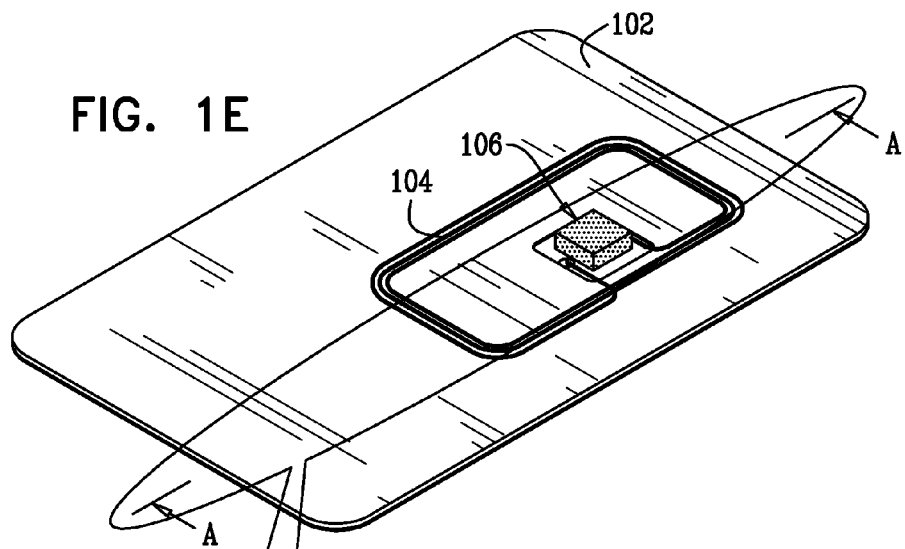
FIG. 1E
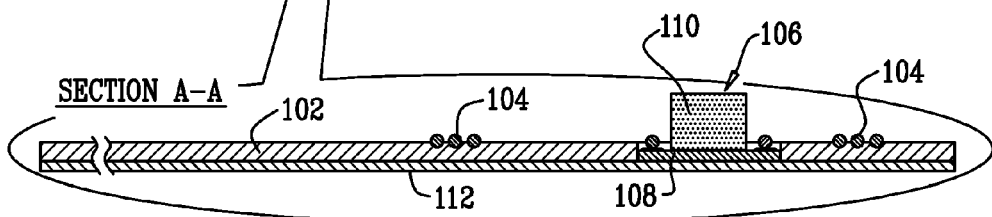
SECTION A-A

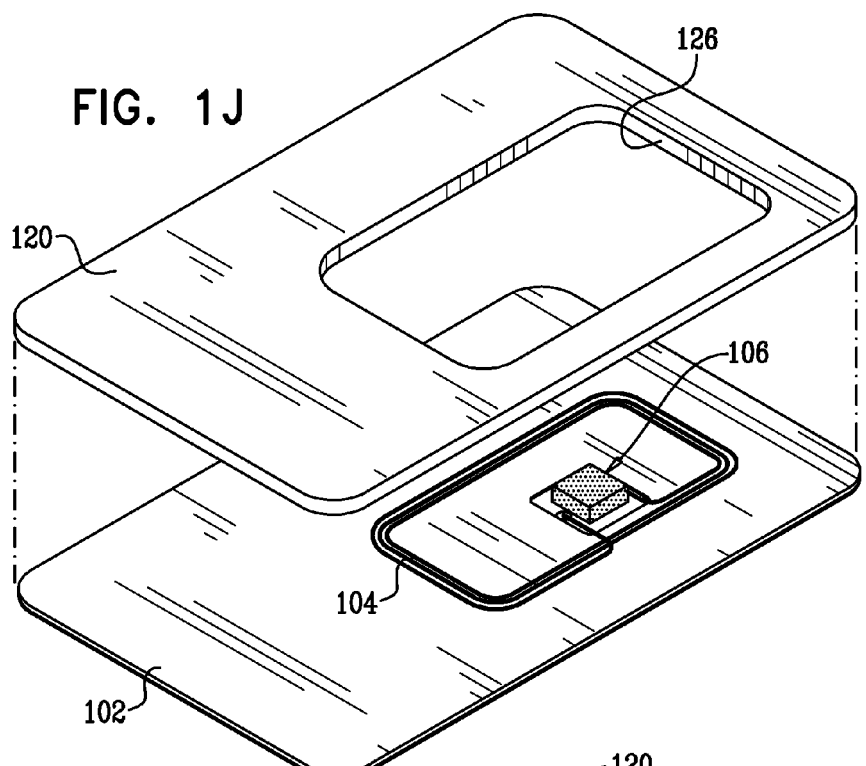
FIG. 1J
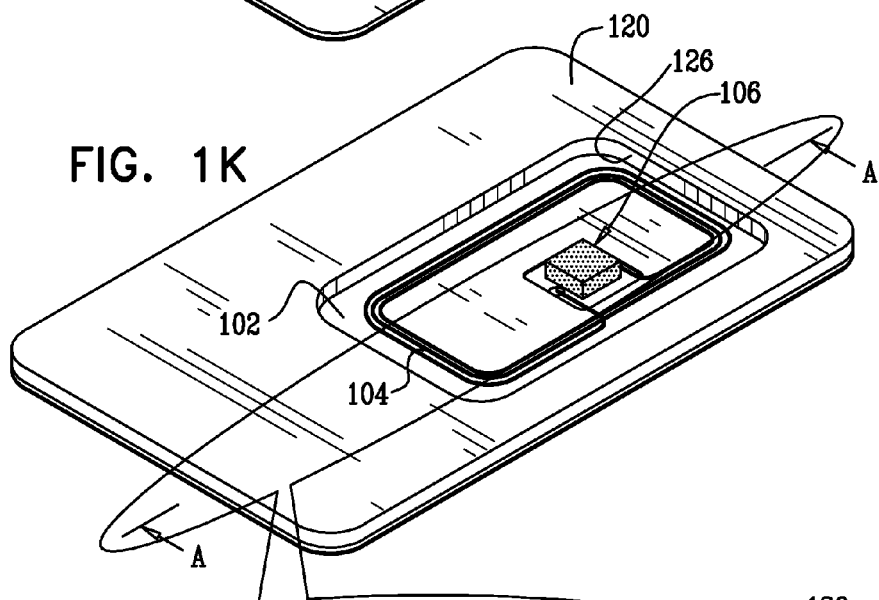
FIG. 1K
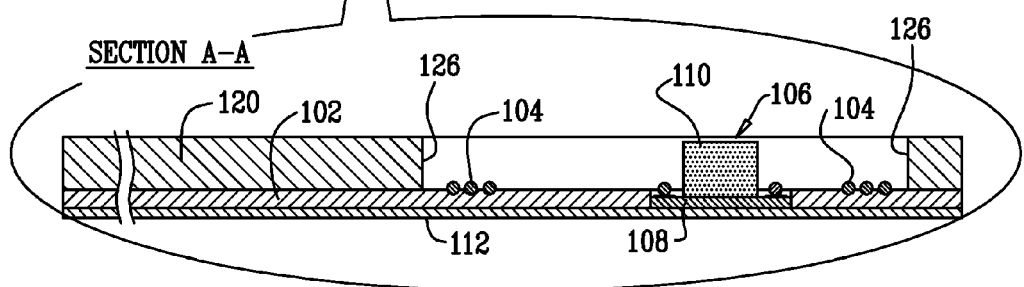
SECTION A-A

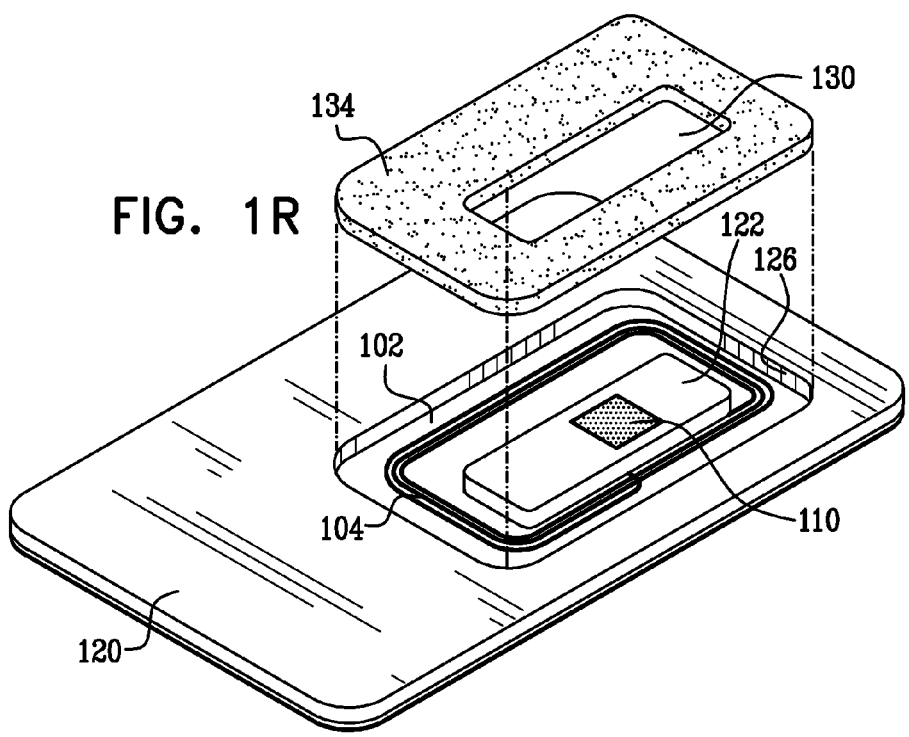
FIG. 1R
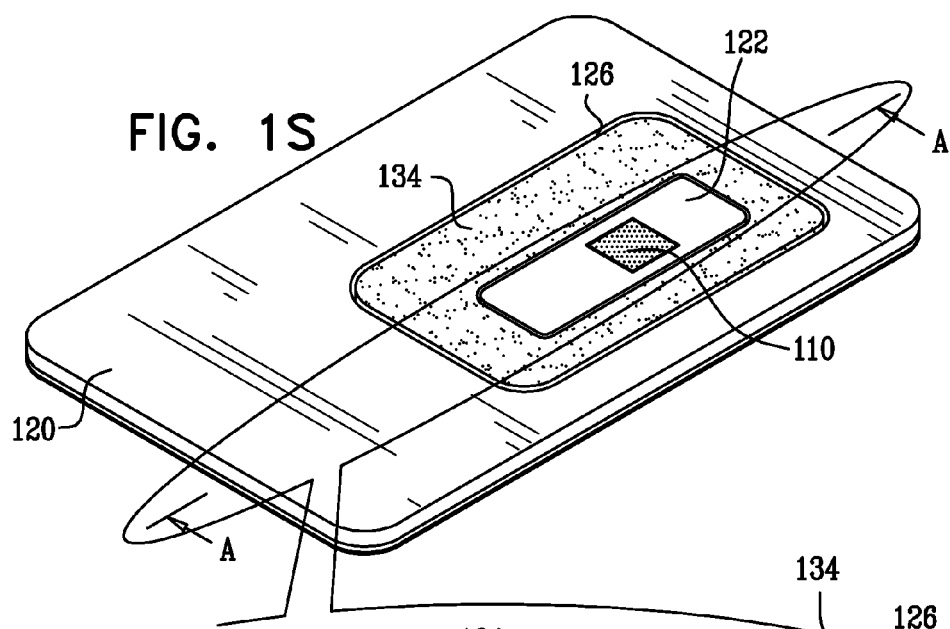
FIG. 1S
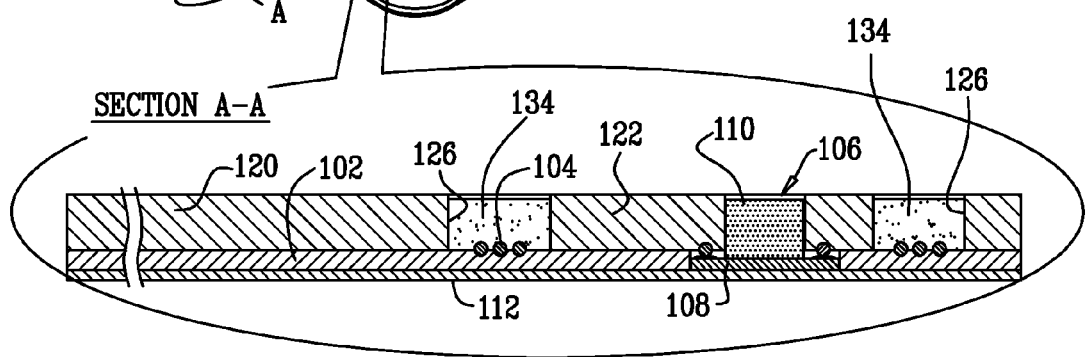
SECTION A-A

FIG. 1T
FIG. 1U
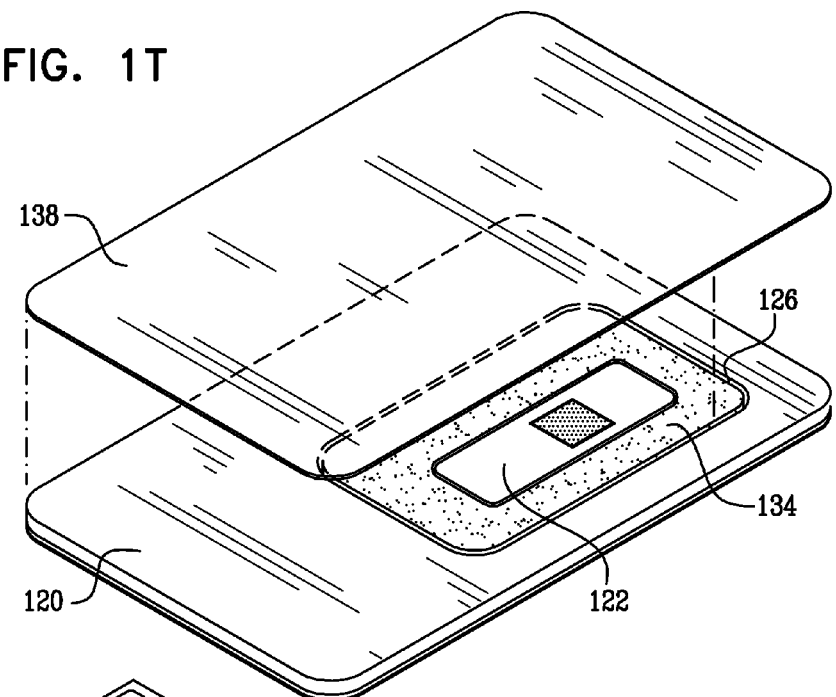
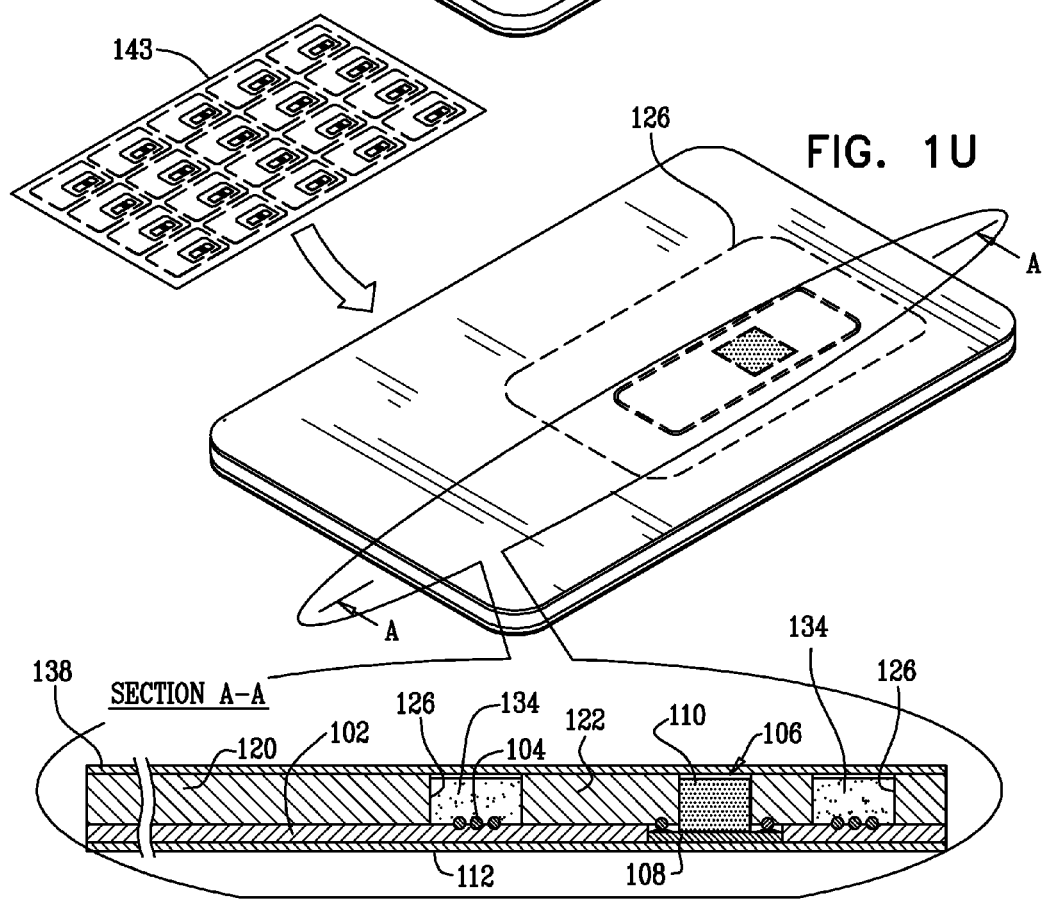

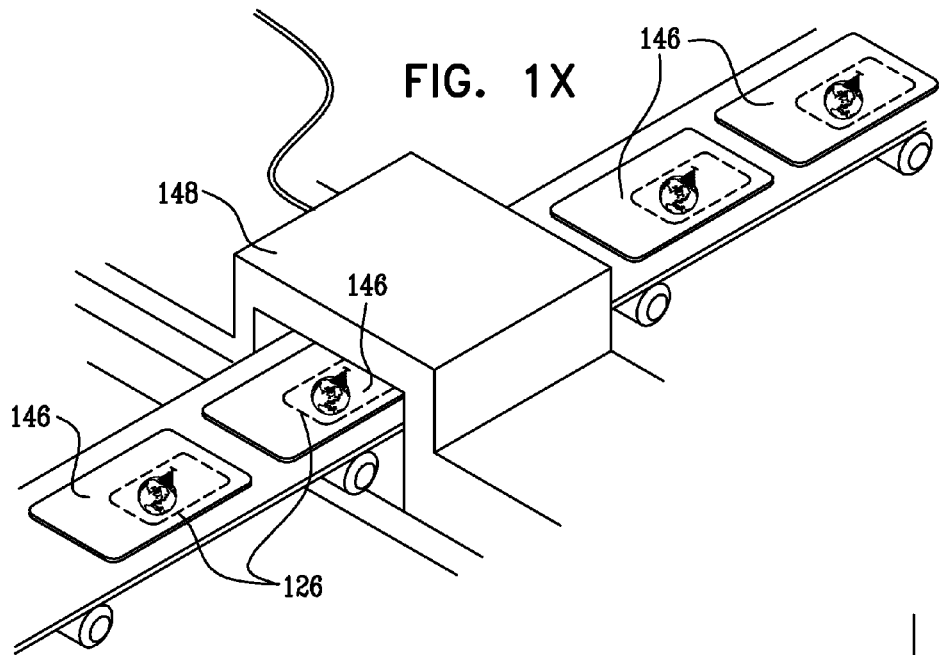
FIG. 1X
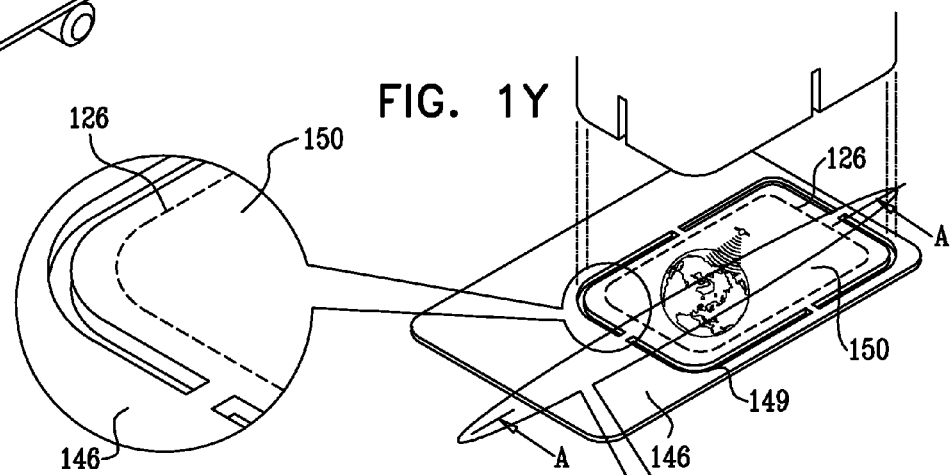
FIG. 1Y
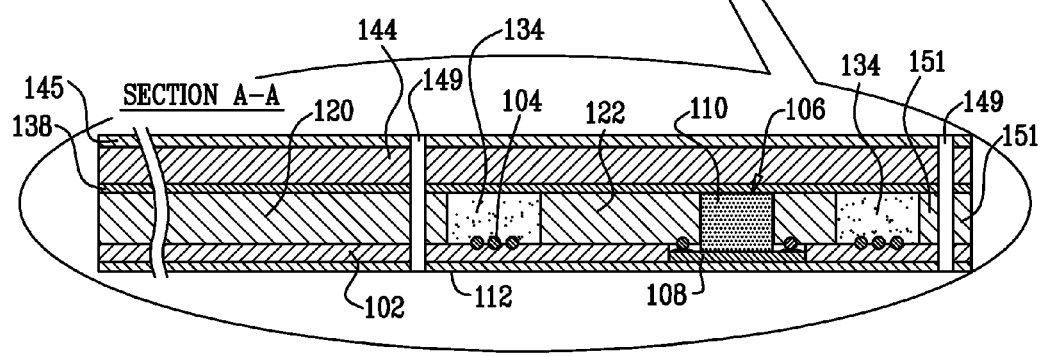

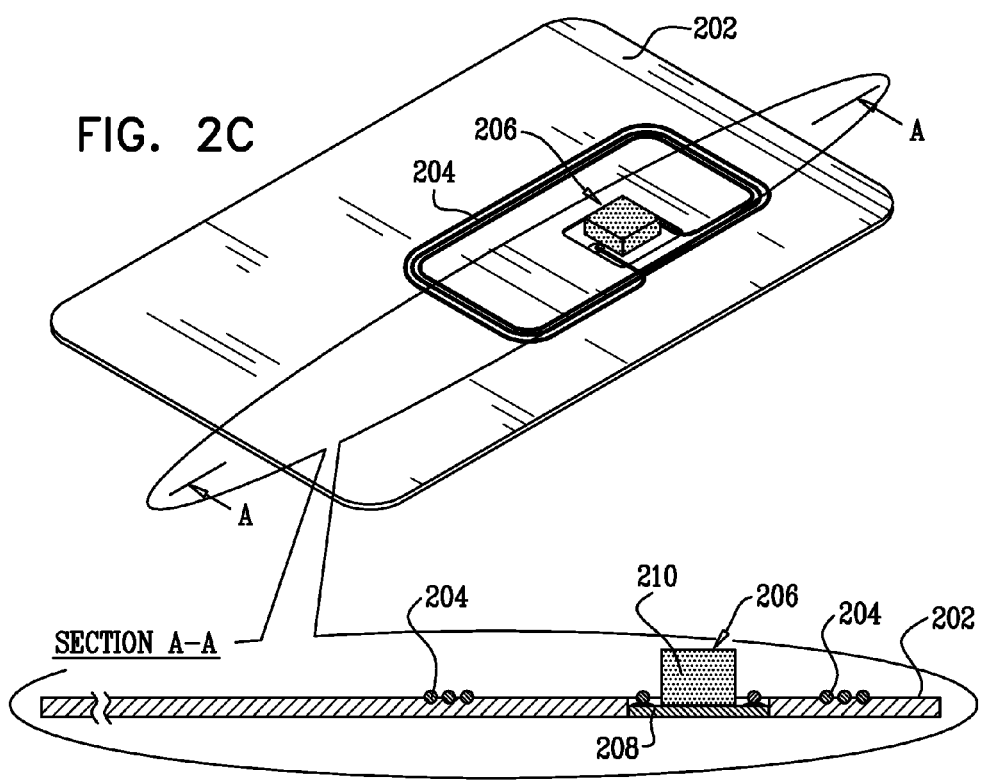

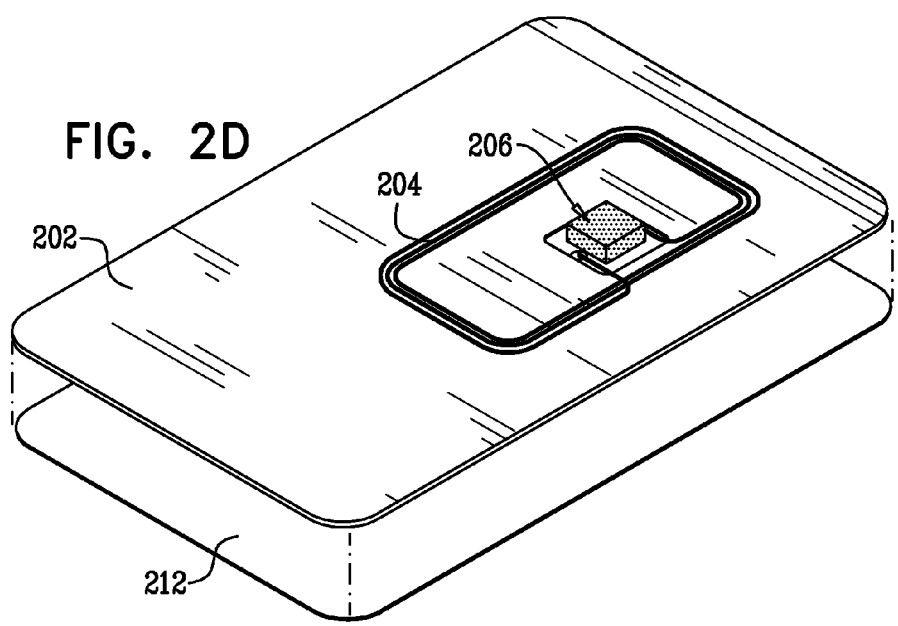
FIG. 2D
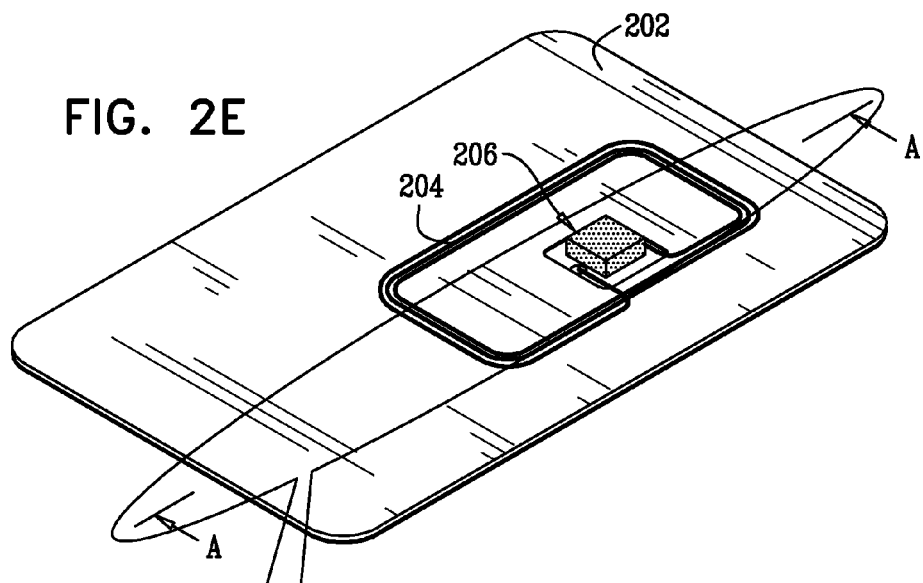
FIG. 2E
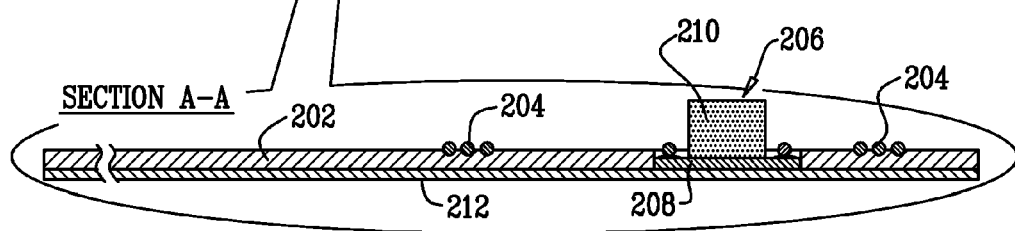
SECTION A-A

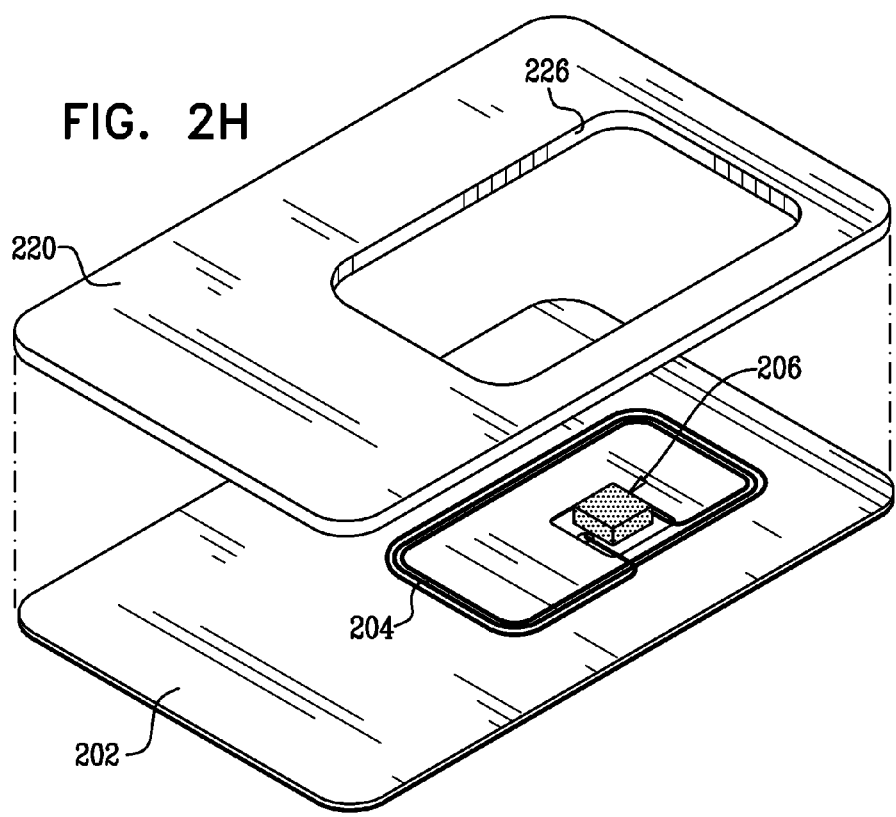
FIG. 2H
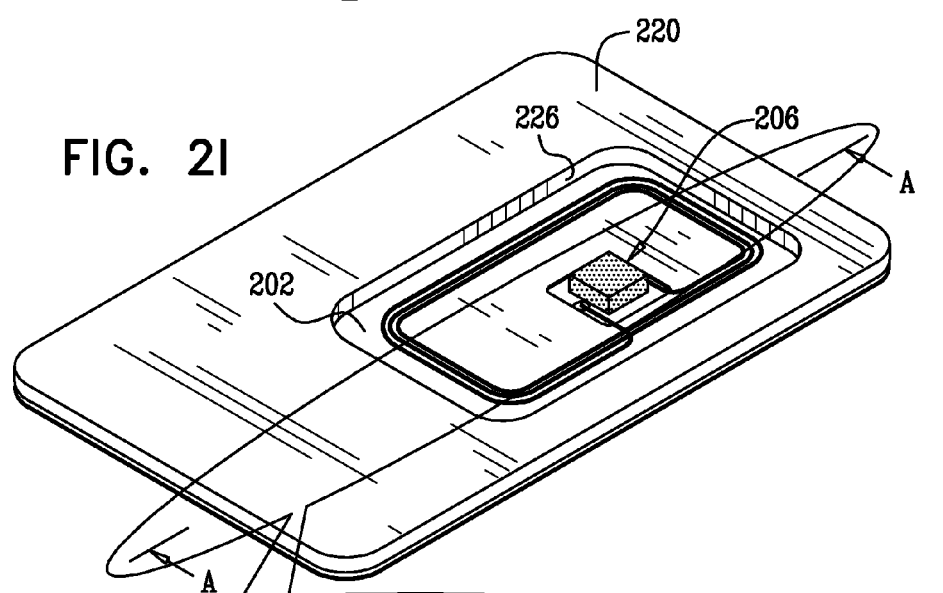
FIG. 2I
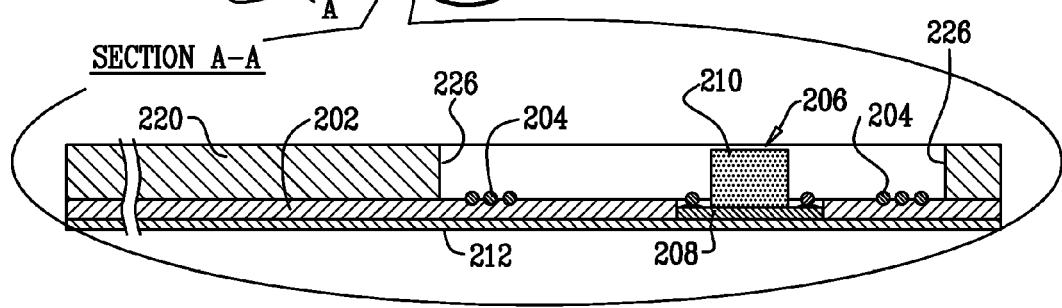
SECTION A-A

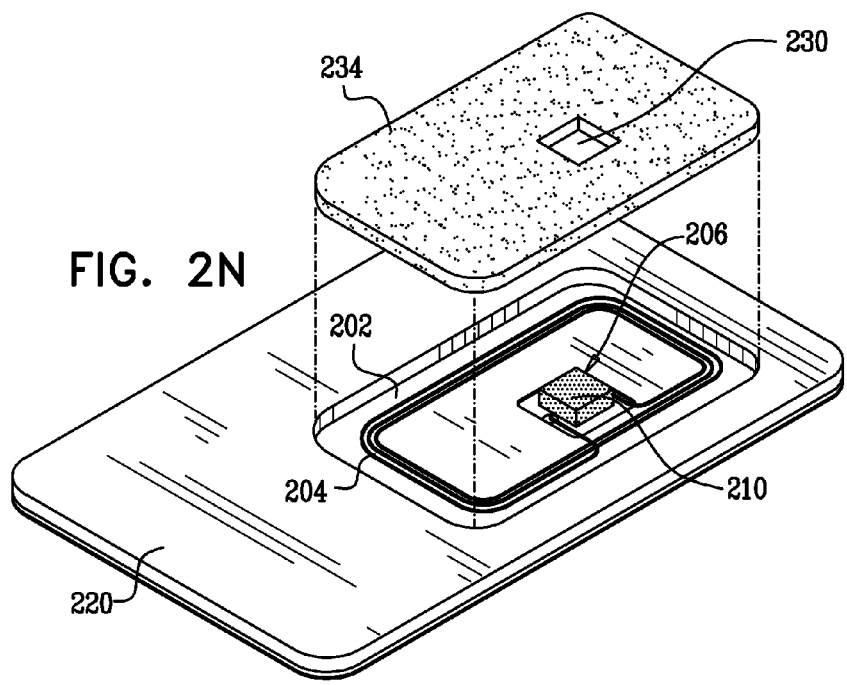
FIG. 2N
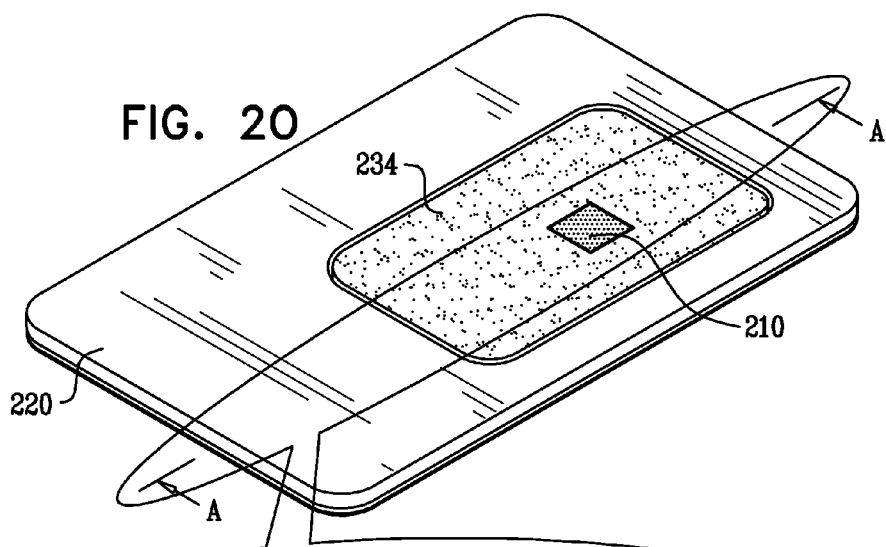
FIG. 2O
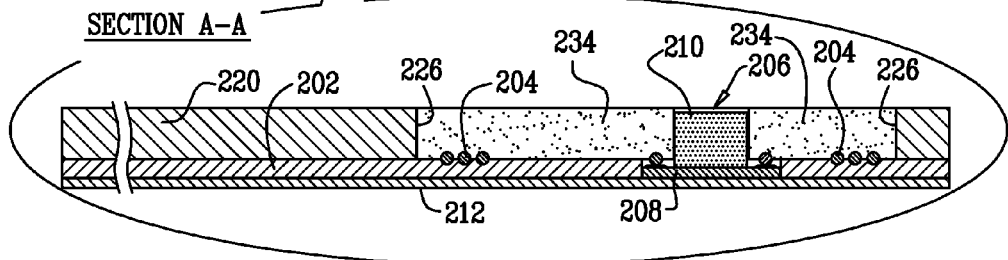
SECTION A-A

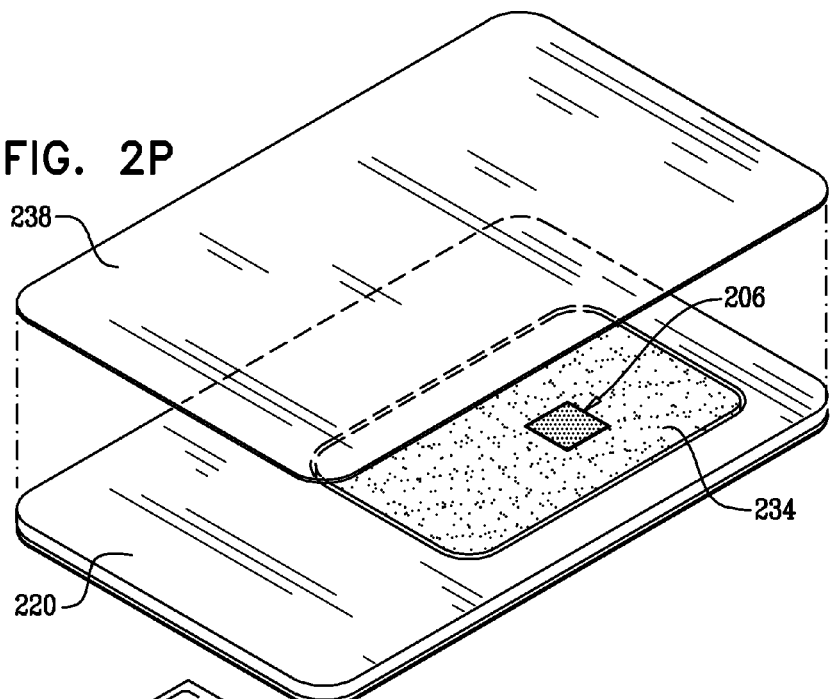
FIG. 2P
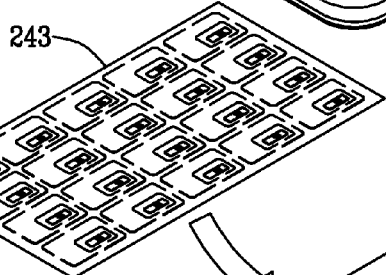
FIG. 2Q
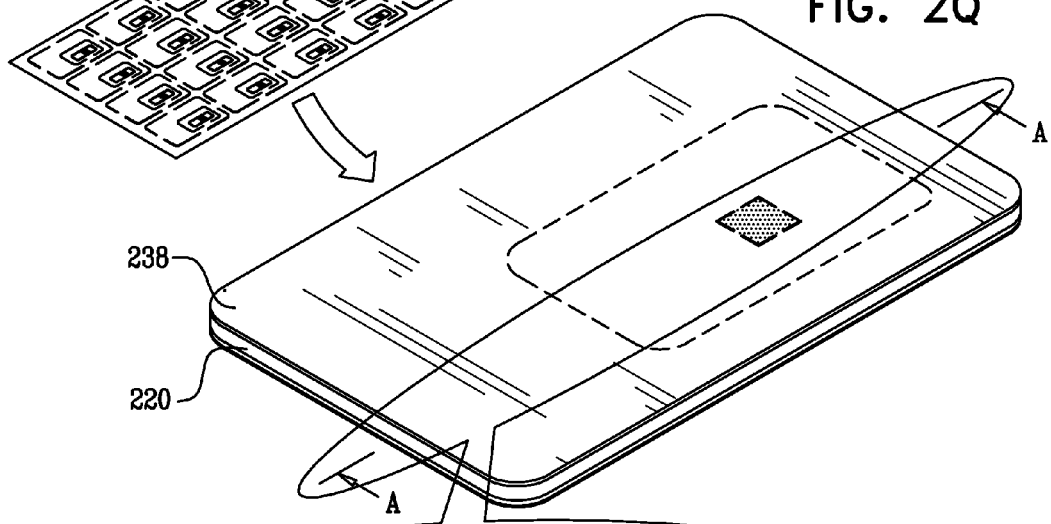
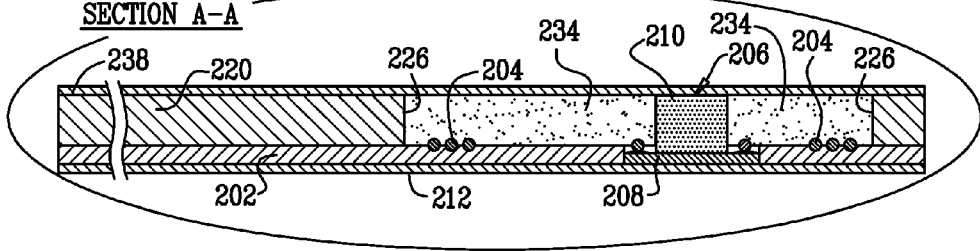

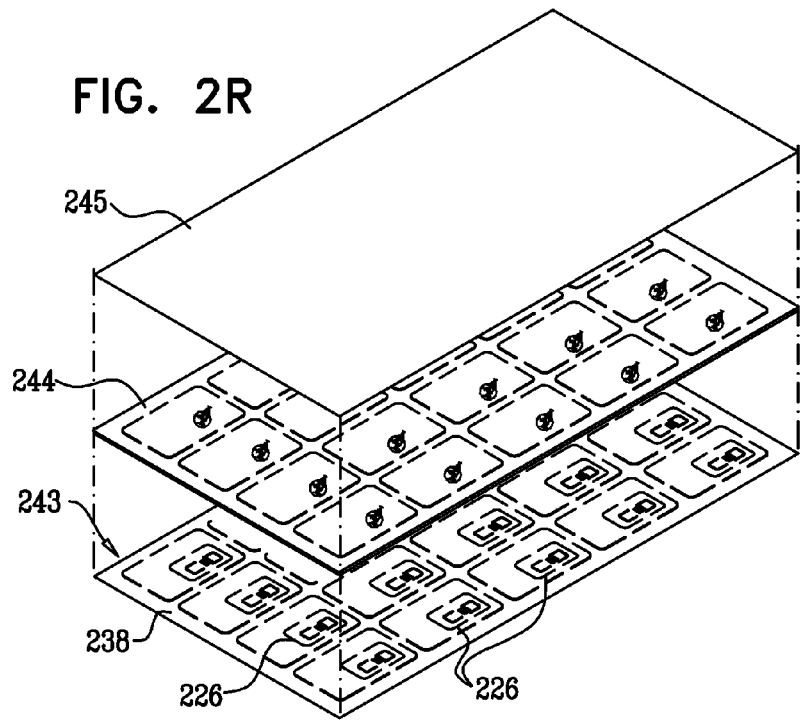
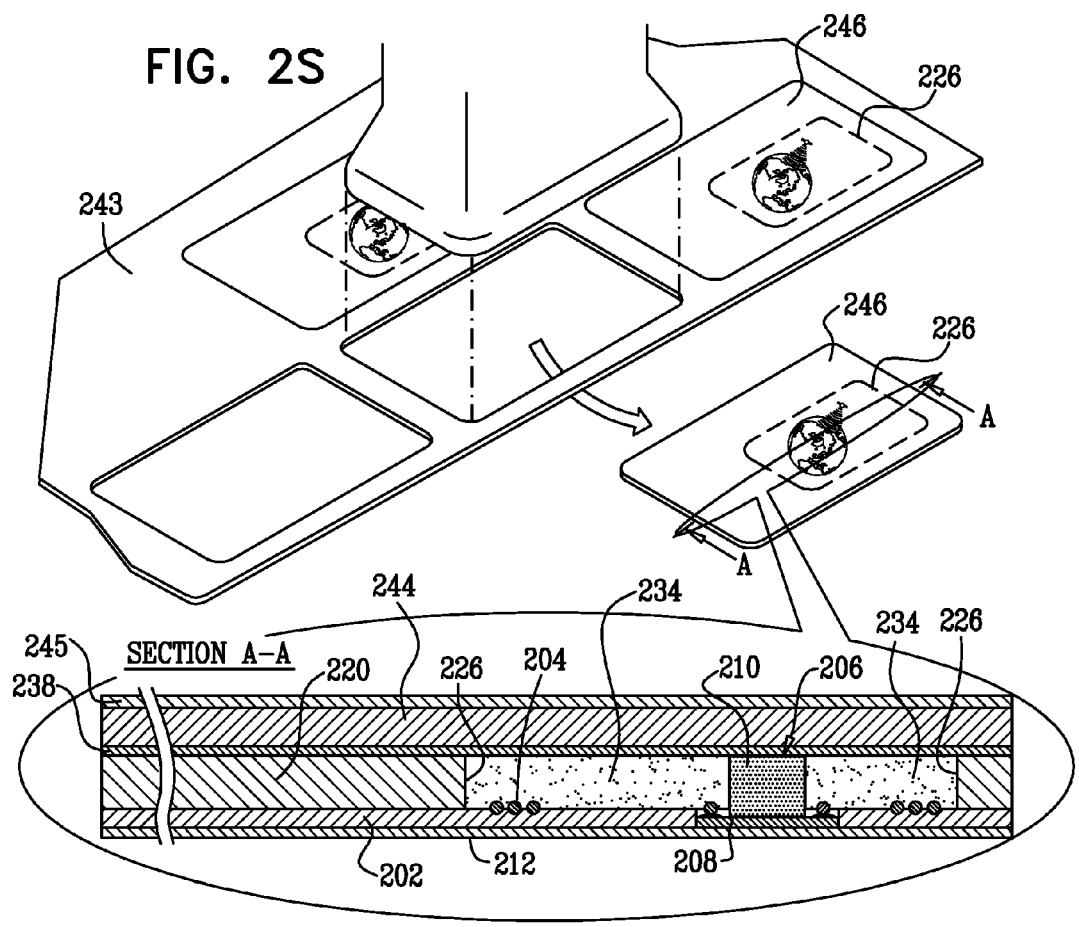

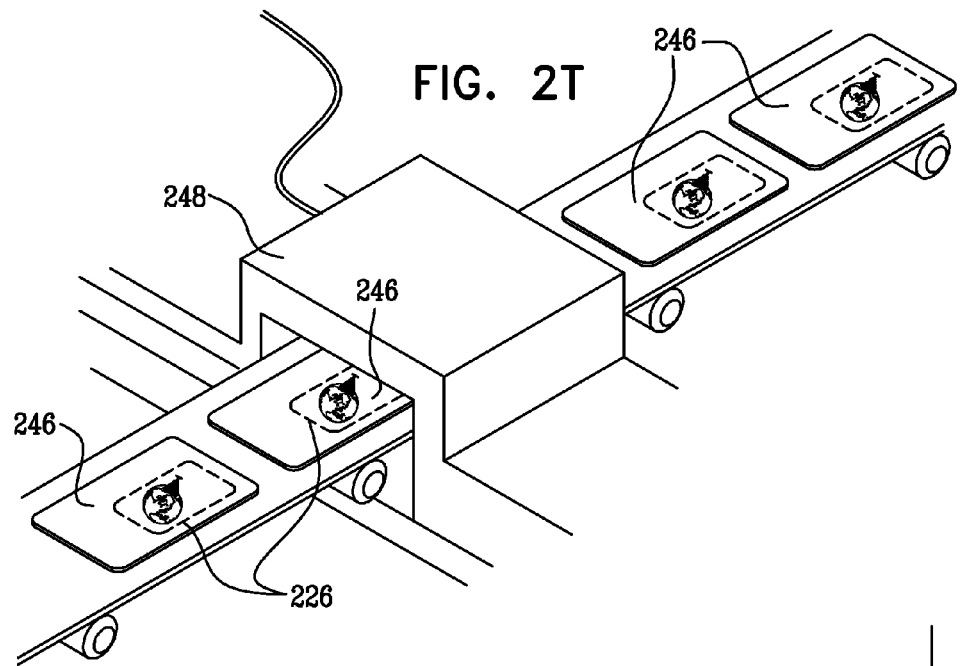
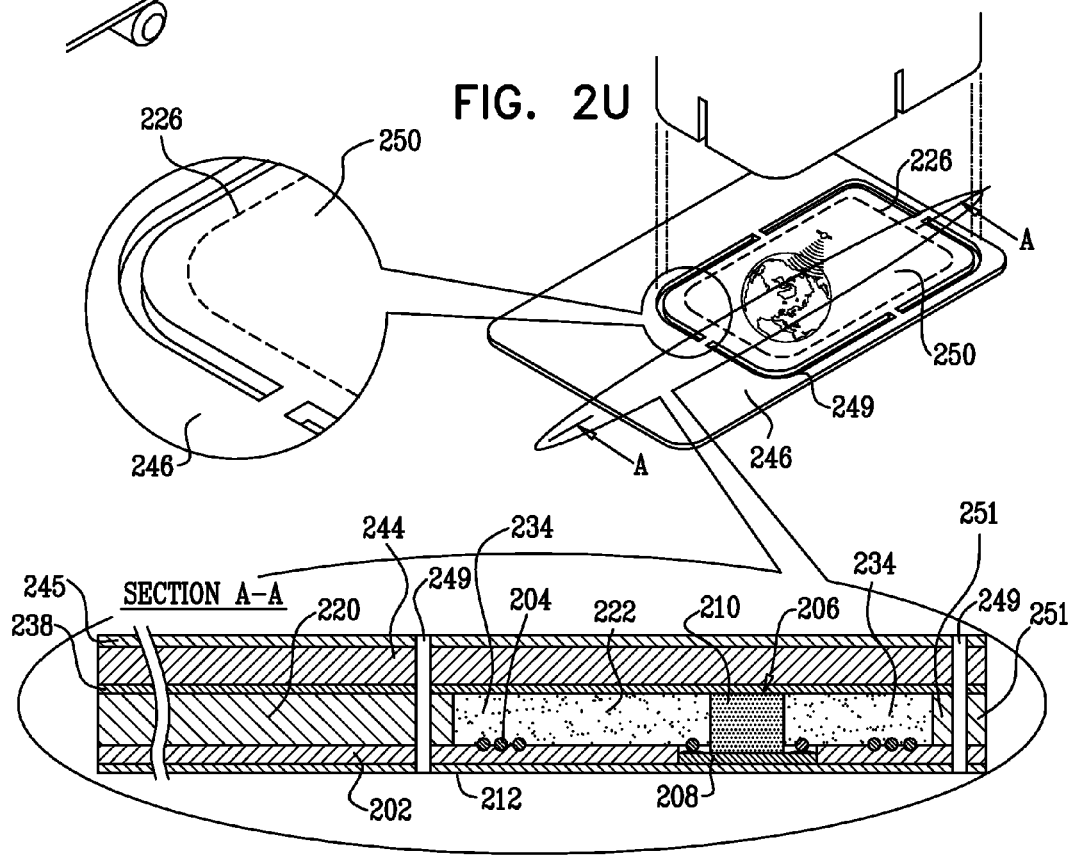

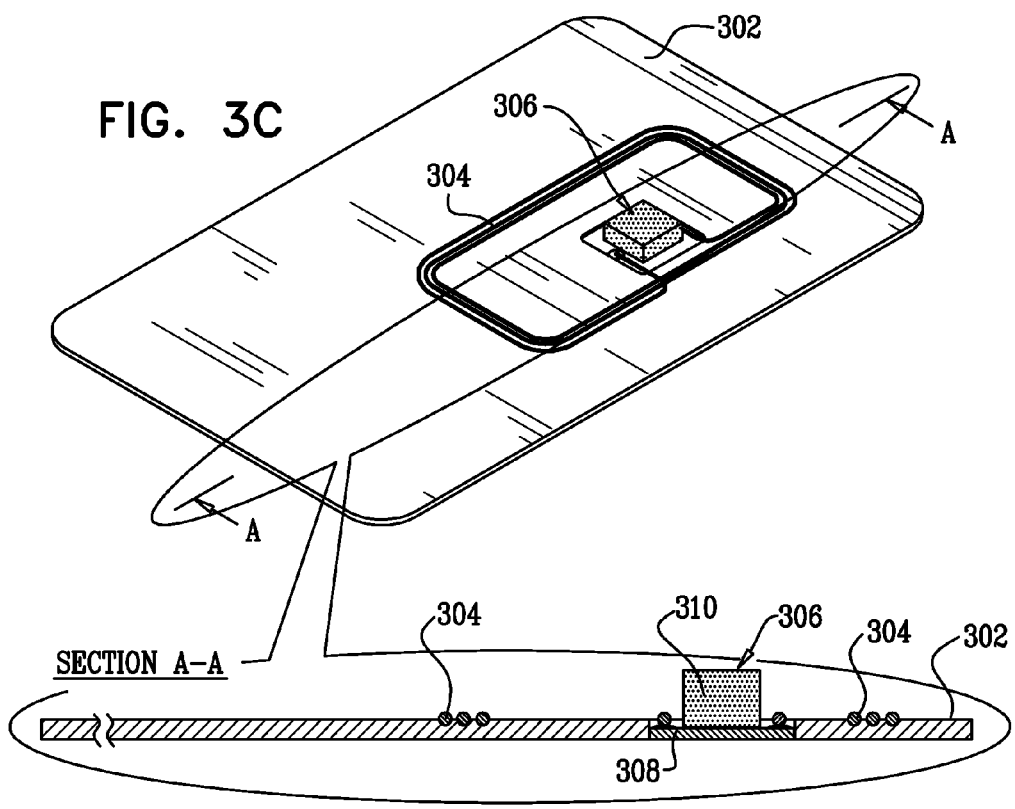

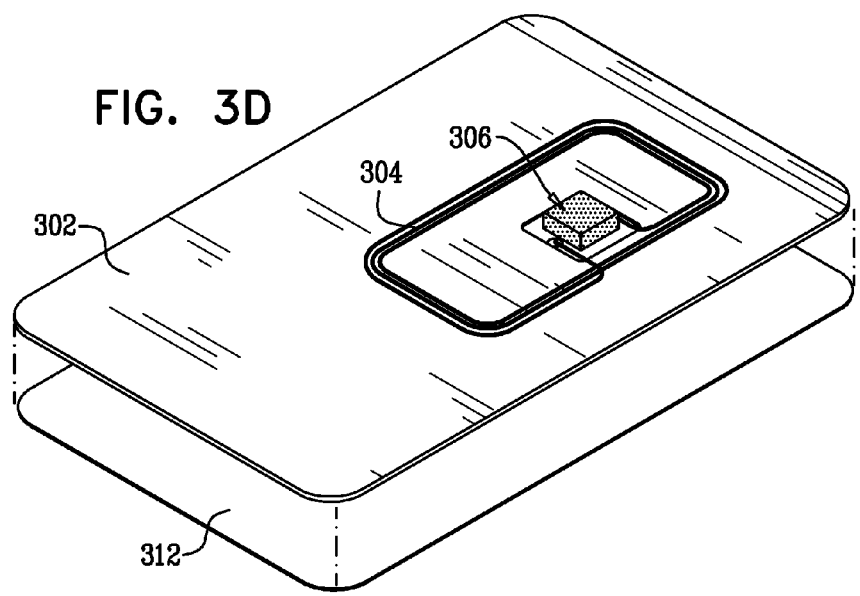
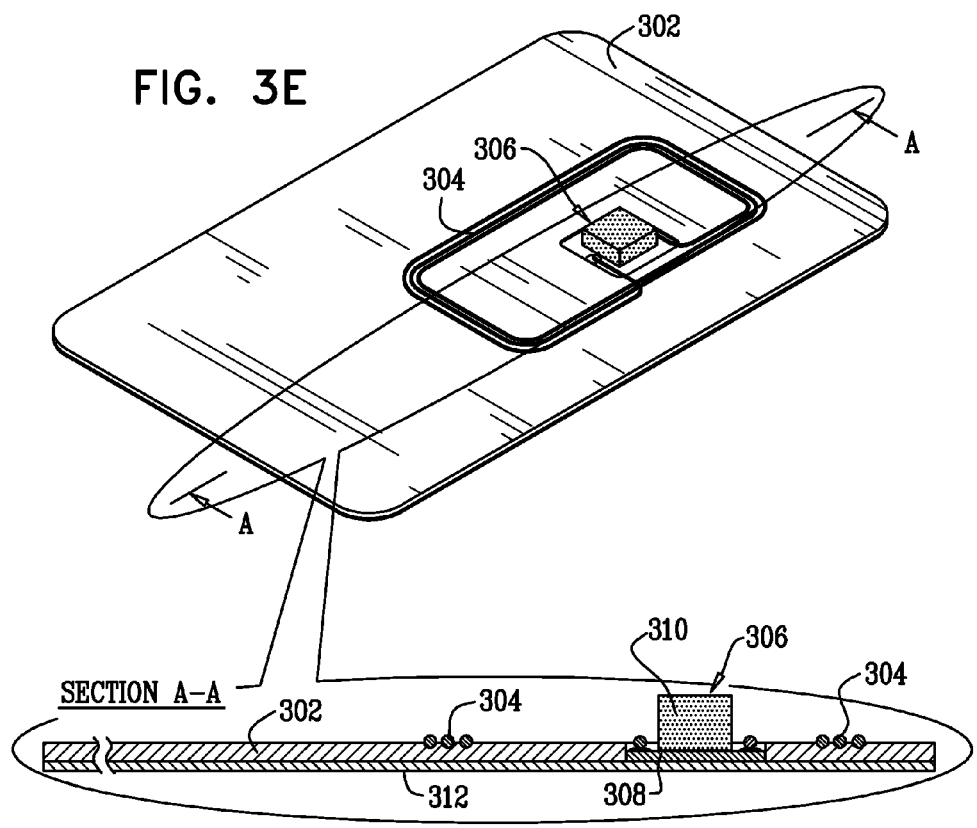

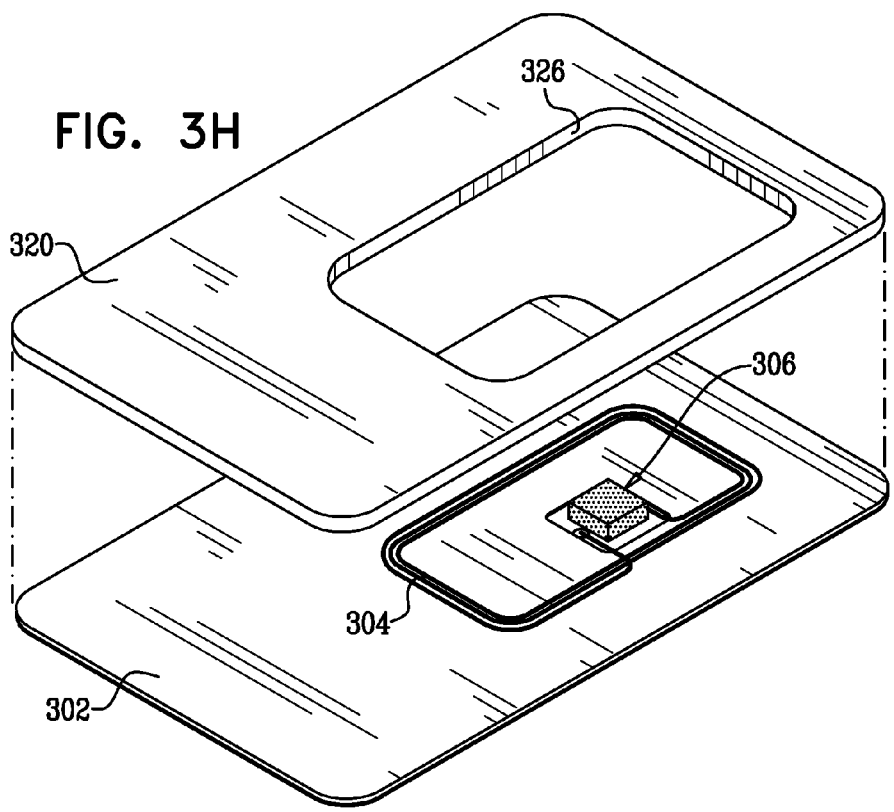
FIG. 3H
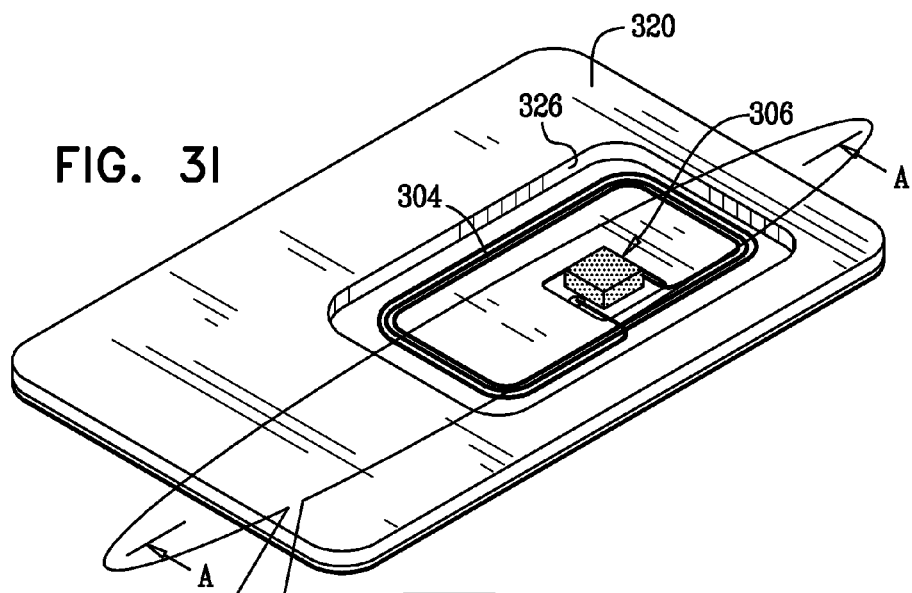
FIG. 3I
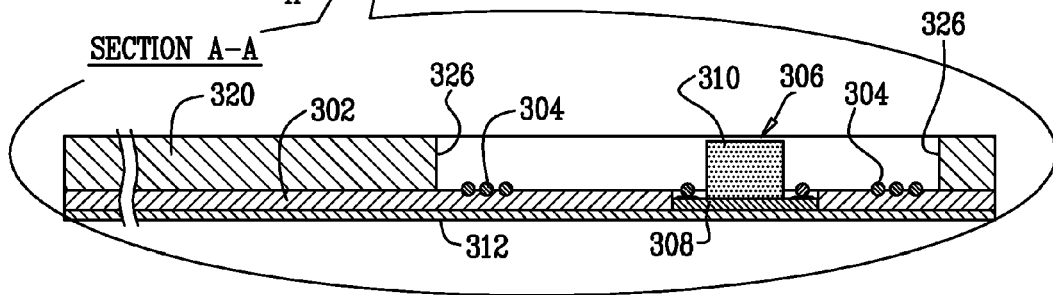

SECTION A-A

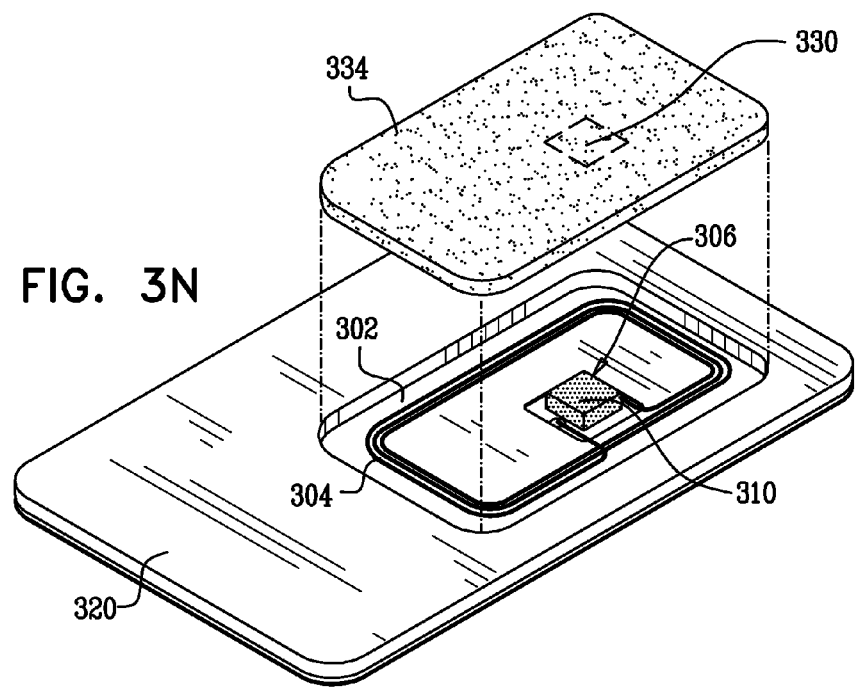
FIG. 3N
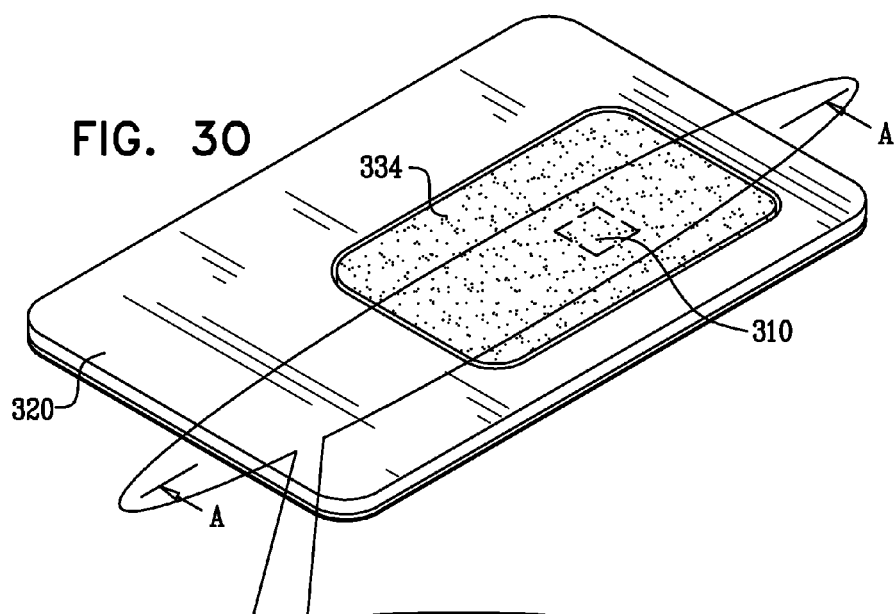
FIG. 3O
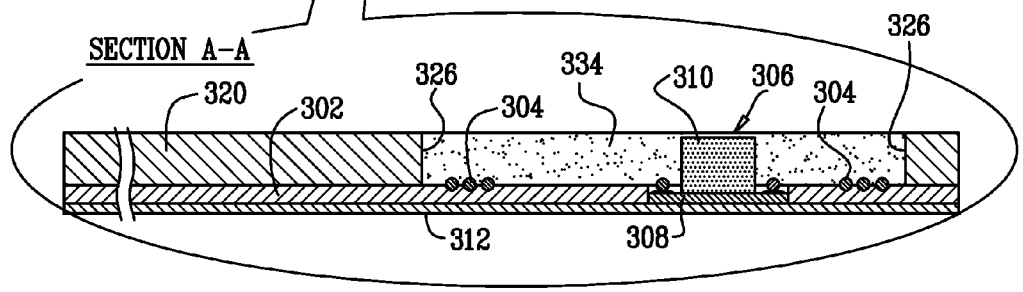
SECTION A-A

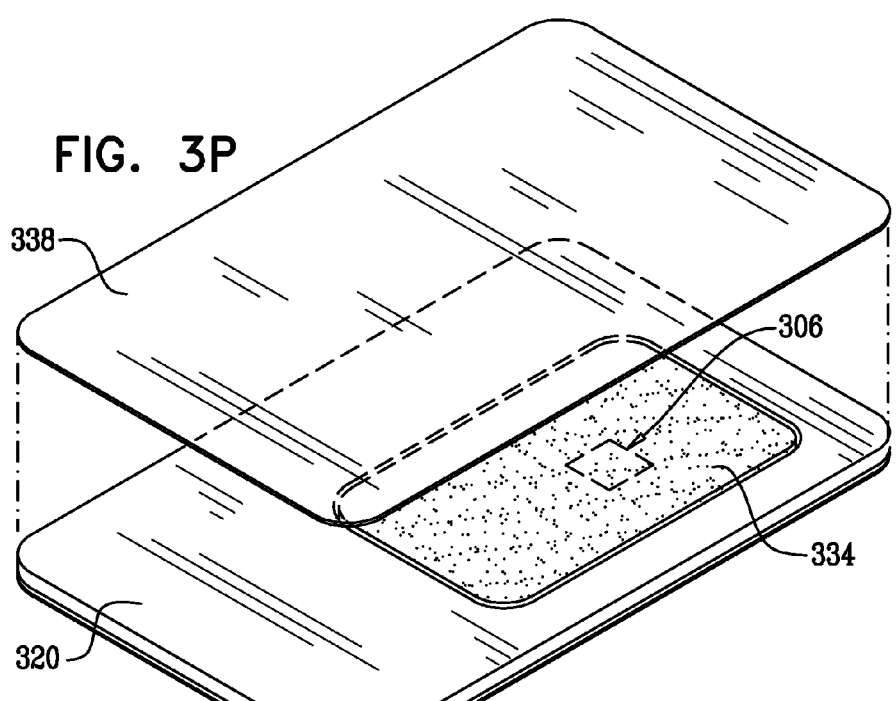
FIG. 3P
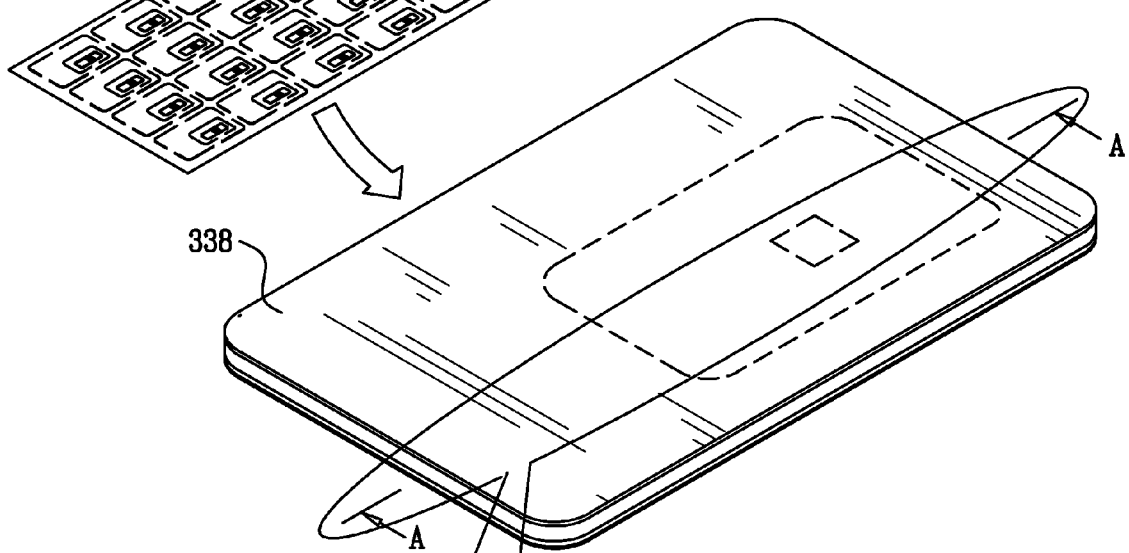
FIG. 3Q
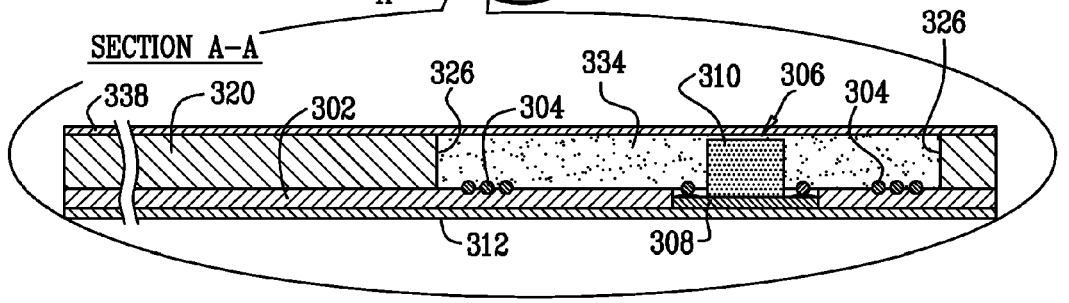

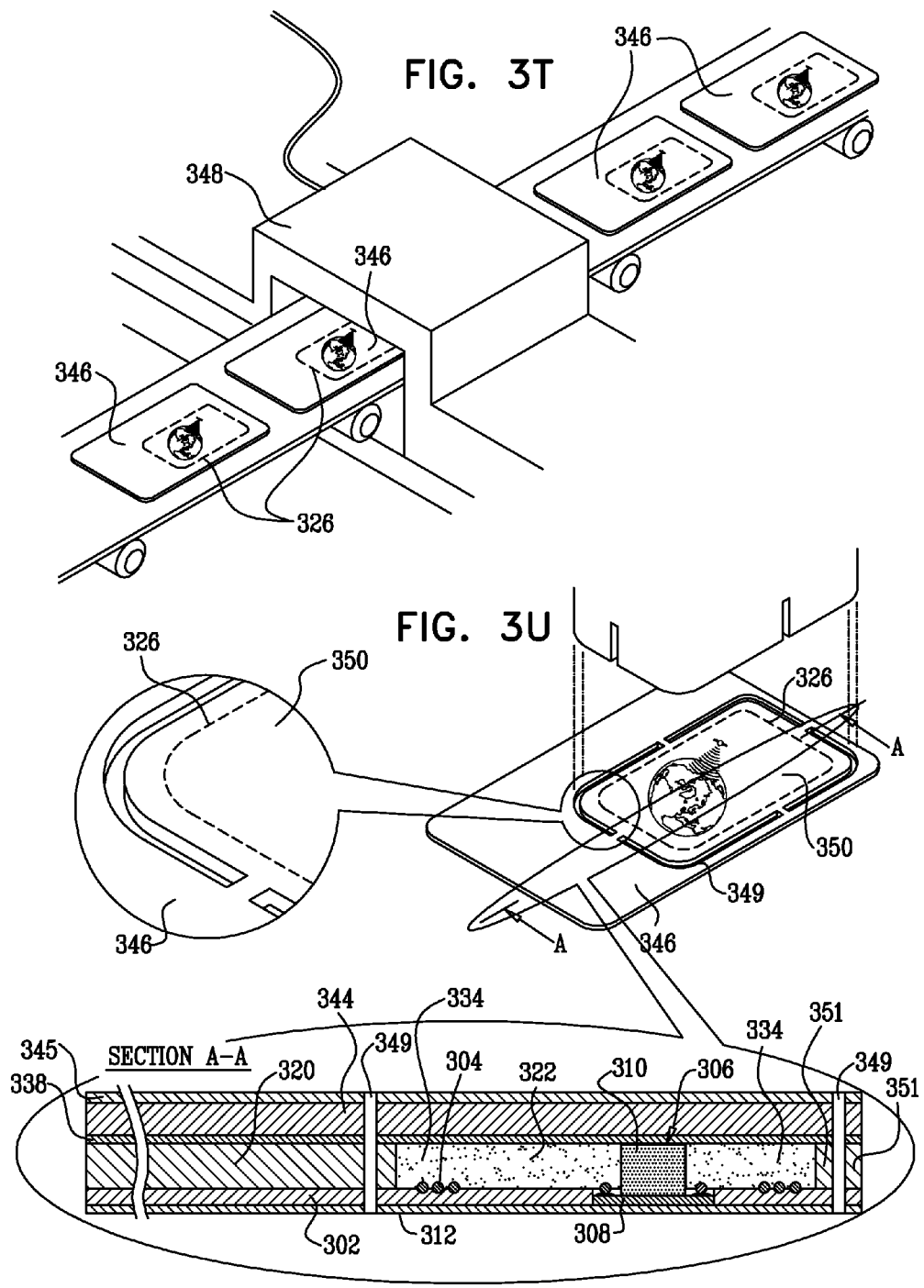

SECTION A-A

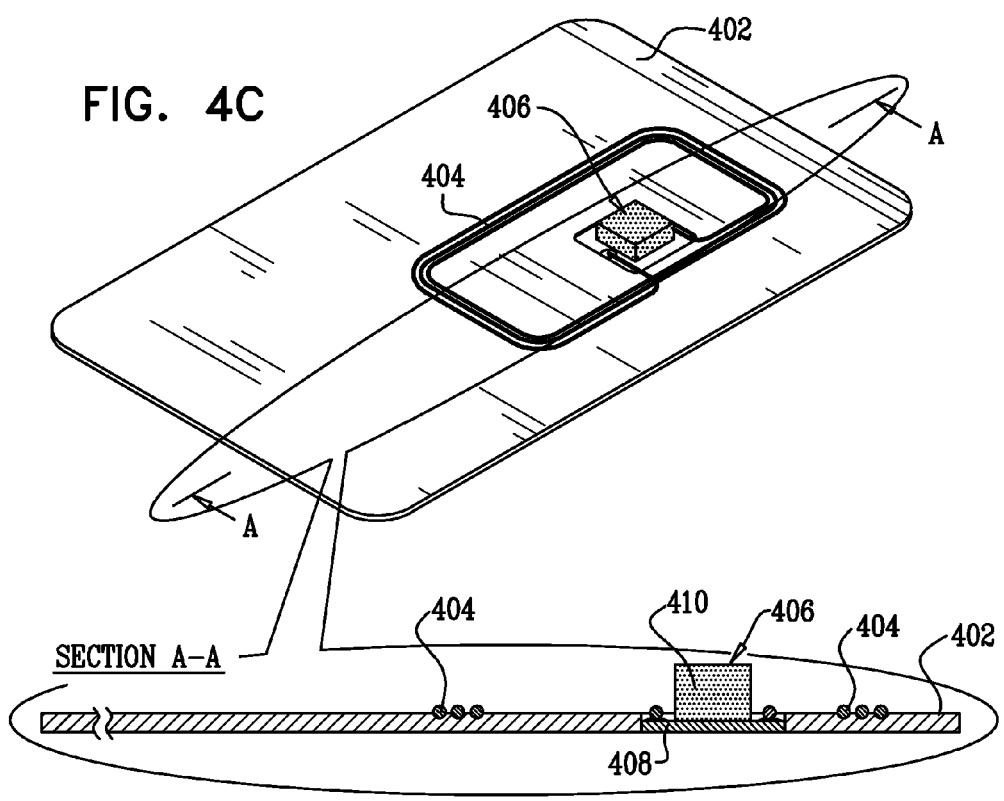

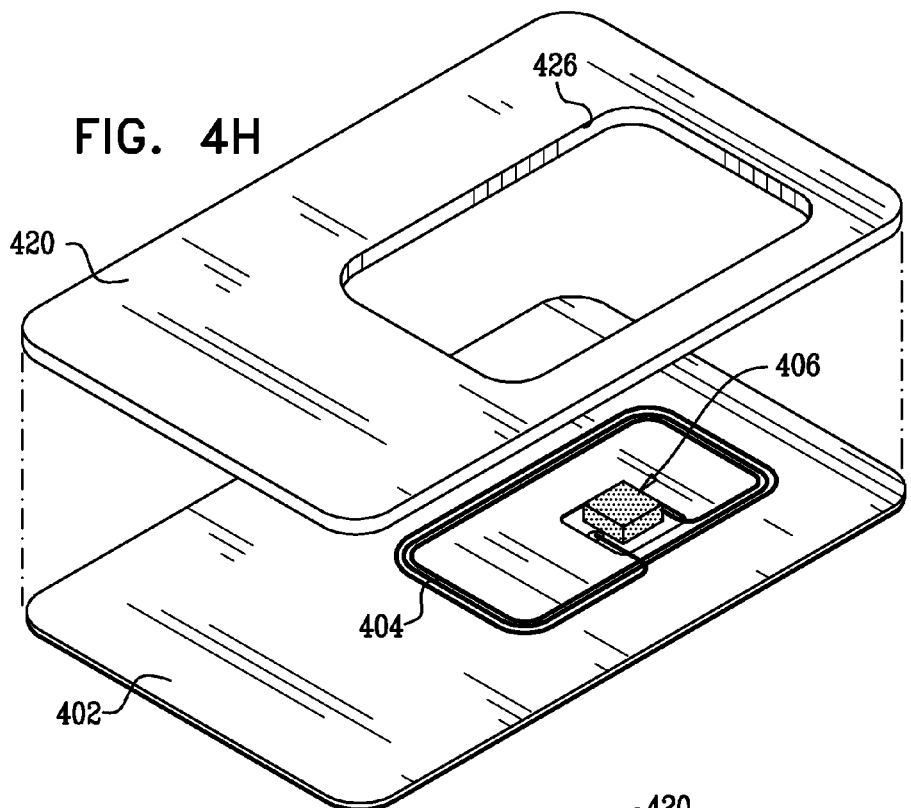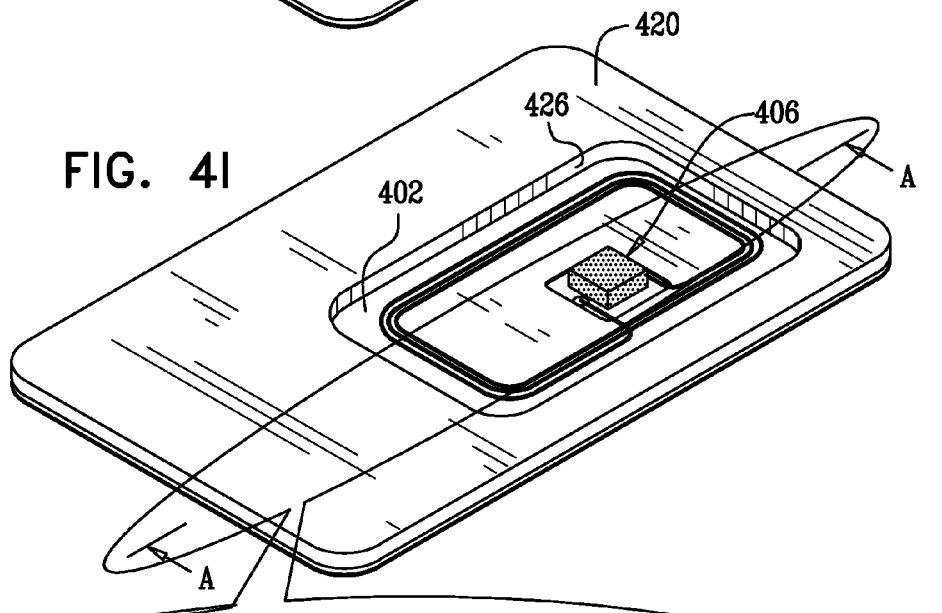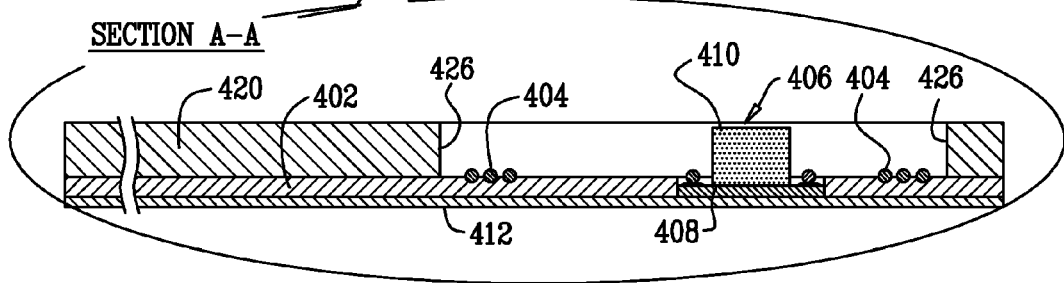

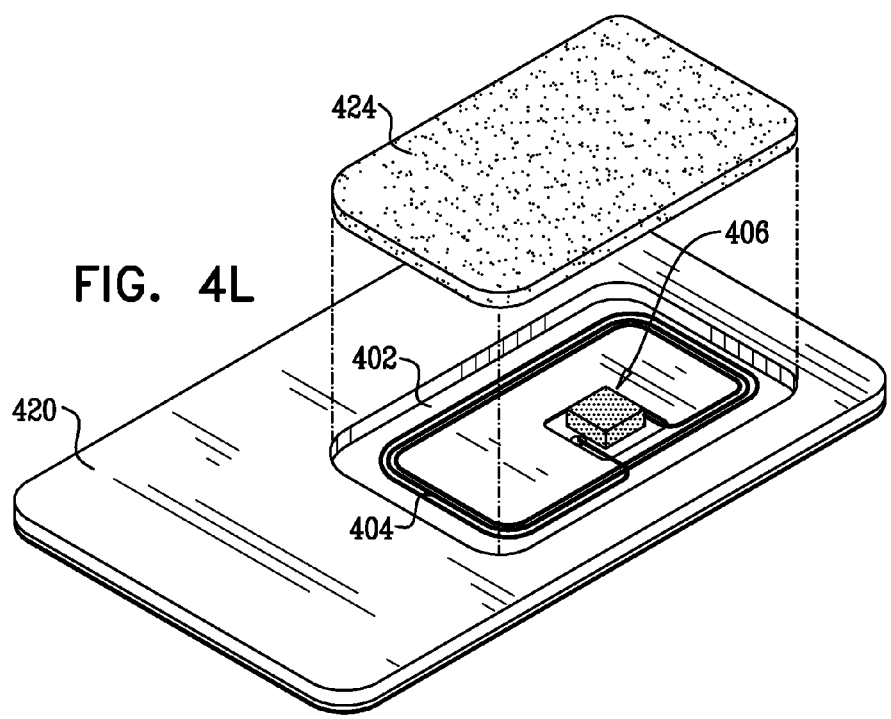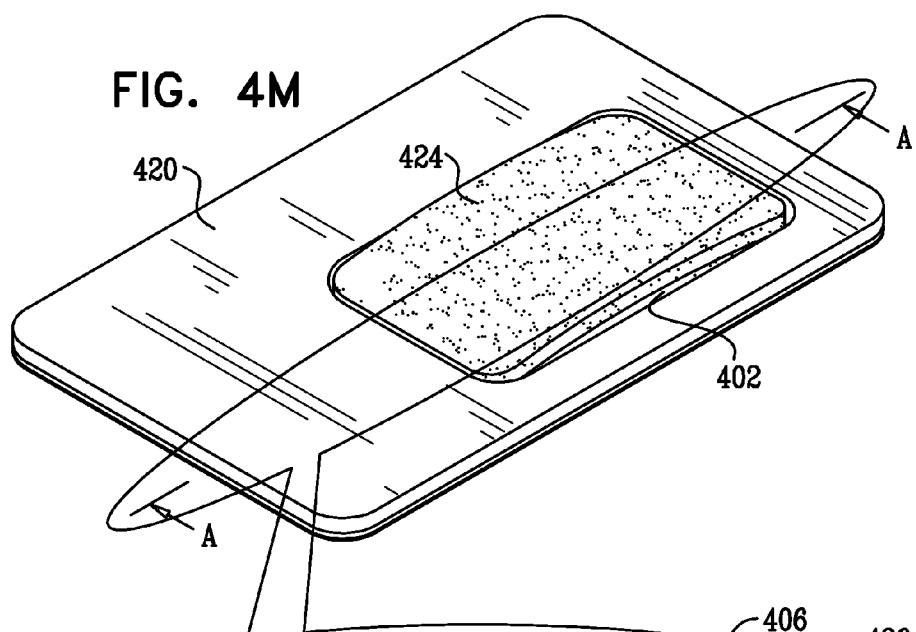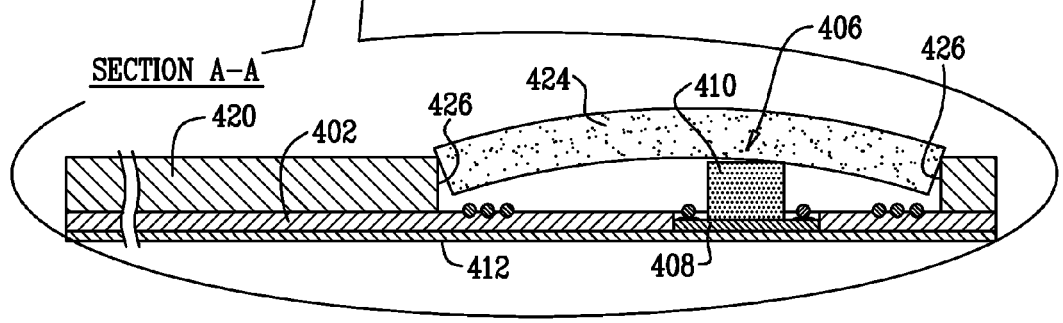

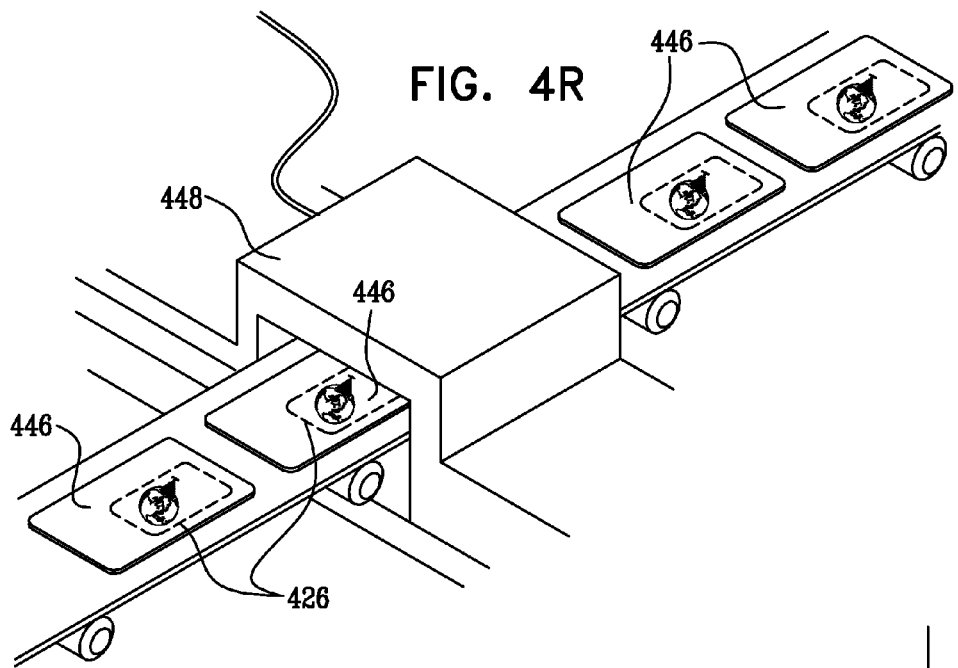
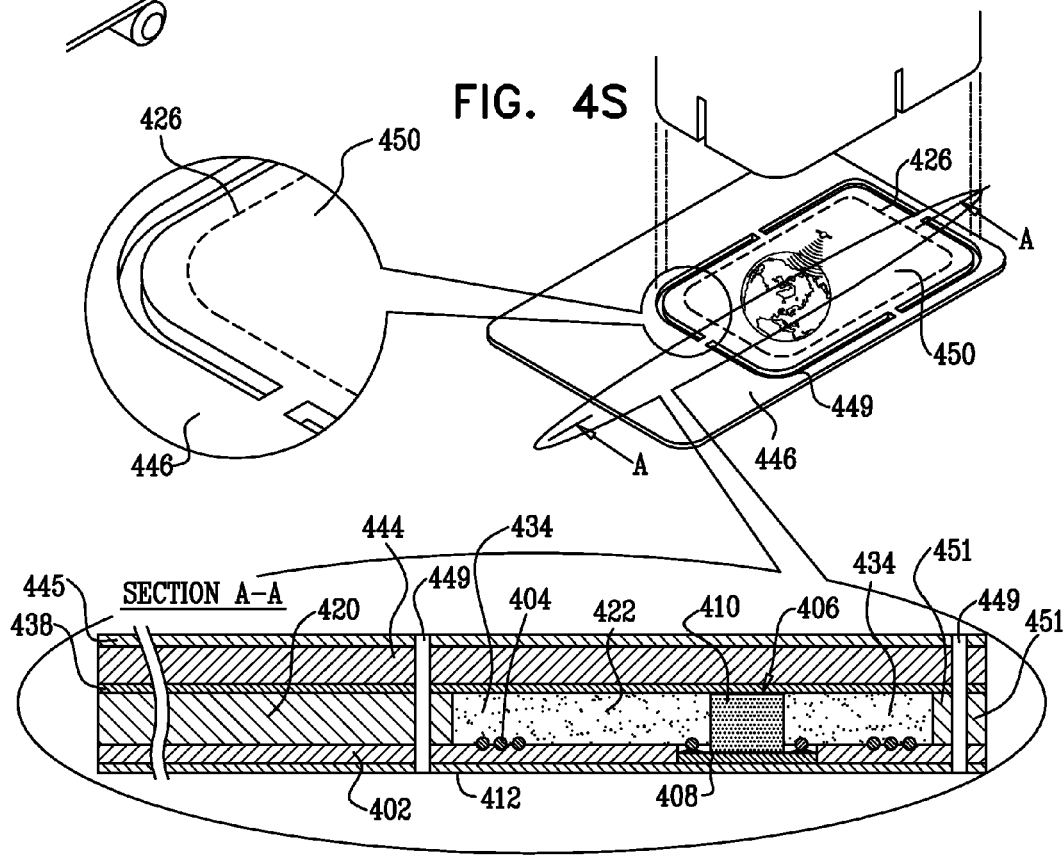

CONTACTLESS SMART STICKER

CROSS REFERENCE TO RELATED APPLICATIONS

This application is a continuation of U.S. patent application Ser. No. 12/564,222, filed on Sep. 22, 2009 and entitled "CONTACTLESS SMART STICKER", and incorporated in its entirety by reference herein.

FIELD OF THE INVENTION

The present invention relates generally to contactless smart card devices in various form factors.

BACKGROUND OF THE INVENTION

The following patent publications are believed to be relevant to the present invention: PCT/IL2007/01378 and PCT/IL2009/00075.

SUMMARY OF THE INVENTION

The present invention seeks to provide improved contactless smart card devices in various form factors as well as methods for the manufacture thereof.

There is thus provided in accordance with a preferred embodiment of the present invention a method for manufacture of a contactless smart card device including mounting at least one antenna and at least one smart card module onto a substrate layer, placing paramagnetic material over at least part of the at least one antenna, and laminating the substrate layer and the paramagnetic material to provide a laminate.

The term "smart card device" is used to denote any of the following: a smart card, typically of a size compliant with ISO Standard ID-1, a reduced size smart card—a smart card of size less than that specified in ISO Standard ID-1, such as a size suitable for a key fob or a sticker suitable for mounting on a mobile communicator, an inlay, a sheet of inlays suitable for use in manufacturing any of the aforesaid devices and a sheet of smart cards.

Preferably, the smart card device is a sheet of ISO ID-1 Standard sized smart cards.

In accordance with an embodiment of the invention, the method also includes cutting individual ISO ID-1 Standard sized cards out of the laminate.

Preferably, the smart card device has a thickness which does not exceed 840 microns.

In accordance with an embodiment of the invention, the method also includes cutting the laminate to create a reduced size smart card device which includes the at least one antenna, the at least one chip module and the paramagnetic material placed over at least part of the at least said antenna. Additionally or alternatively, the entire periphery of the reduced size smart card device extends outwardly of the paramagnetic material.

Preferably, the paramagnetic layer is formed with at least one cut-out to accommodate the at least part of the at least the chip module. Alternatively, the paramagnetic material is formed with at least one recess to accommodate the at least part of the at least one chip module.

In accordance with an embodiment of the invention, the paramagnetic material surrounds but does not overlie the at least one chip module.

Preferably, the method also includes perforating the laminate to define a manually separable reduced size smart card device including the at least one antenna, the at least one chip module and the paramagnetic material placed over at least part of the at least one antenna.

There is further provided in accordance with another preferred embodiment of the present invention a contactless smart card device including a substrate having associated therewith at least one antenna, at least one chip module, and at least one paramagnetic layer covering at least part of the at least one antenna, the substrate and the at least one paramagnetic layer being laminated together to define a laminate.

Preferably, the smart card device is a sheet of ISO ID-1 Standard sized smart cards.

In accordance with an embodiment of the invention, the smart card device having dimensions which are ISO ID-1 Standard compliant.

Preferably, the smart card device has a thickness which does not exceed 840 microns.

In accordance with an embodiment of the invention, the smart card device is a reduced size smart card device. Additionally or alternatively, the entire periphery of the reduced size smart card device extends outwardly the paramagnetic material.

Preferably, the laminate is perforated to define a manually separable reduced size smart card device.

In accordance with an embodiment of the invention, the paramagnetic layer is formed with a cut-out to accommodate as least part of the chip module. Alternatively, the paramagnetic layer is formed with a recess to accommodate at least part of the chip module.

BRIEF DESCRIPTION OF THE DRAWINGS

The present invention will be understood and appreciated more fully from the following detailed description, taken in conjunction with the drawings in which:

FIGS. 1A, 1B, 1C, 1D, 1E, 1F, 1G, 1H, 1I, 1J, 1K, 1L, 1M, 1N, 1O, 1P, 1Q, 1R, 1S, 1T, 1U, 1V, 1W, 1X, and 1Y are simplified illustrations of a method of manufacture of a contactless smart card device in accordance with a preferred embodiment of the present invention;

FIGS. 2A, 2B, 2C, 2D, 2E, 2F, 2G, 2H, 2I, 2J, 2K, 2L, 2M, 2N, 2O, 2P 2Q, 2R, 2S, 2T and 2U are simplified illustrations of a method of manufacture of a contactless smart card device in accordance with another preferred embodiment of the present invention;

FIGS. 3A, 3B, 3C, 3D, 3E, 3F, 3G, 3H, 3I, 3J, 3K, 3L, 3M, 3N, 3O, 3P, 3Q, 3R, 3S, 3T and 3U are simplified illustrations of a method of manufacture of a reduced size contactless smart card device in accordance with yet another preferred embodiment of the present invention; and FIGS. 4A, 4B, 4C, 4D, 4E, 4F, 4G, 4H, 4I, 4J, 4K, 4L, 4M, 4N, 4O, 4P, 4Q, 4R, and 4S are simplified illustrations of a method of manufacture of a reduced size contactless smart card device in accordance with still another preferred embodiment of the present invention.

DETAILED DESCRIPTION OF PREFERRED EMBODIMENTS

Reference is now made to FIGS. 1A, 1B, 1C, 1D, 1E, 1F, 1G, 1H, 1I, 1J, 1K, 1L, 1M, 1N, 1O, 1P, 1Q, 1R, 1S, 1T, 1U, 1V, 1W, 1X and 1Y, which are simplified illustrations of a method of manufacture of a contactless smart card device, and more particularly a reduced size contactless smart card device in accordance with a preferred embodiment of the present invention.

Figure 1A:
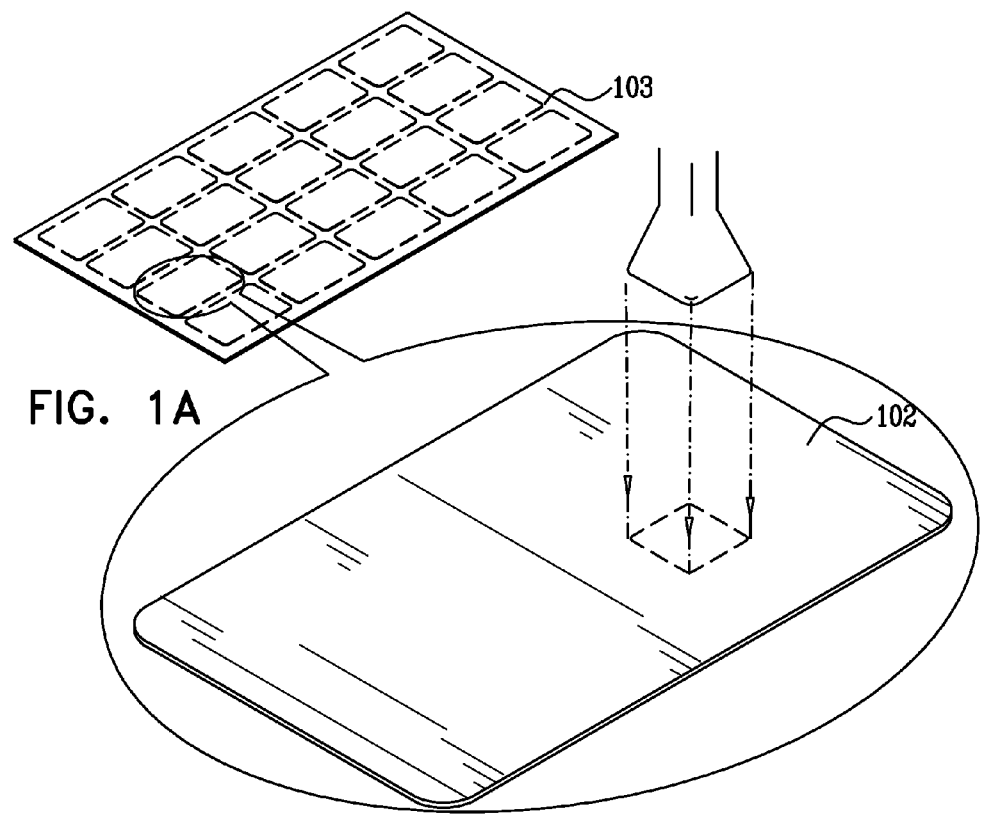
Figure 1B:
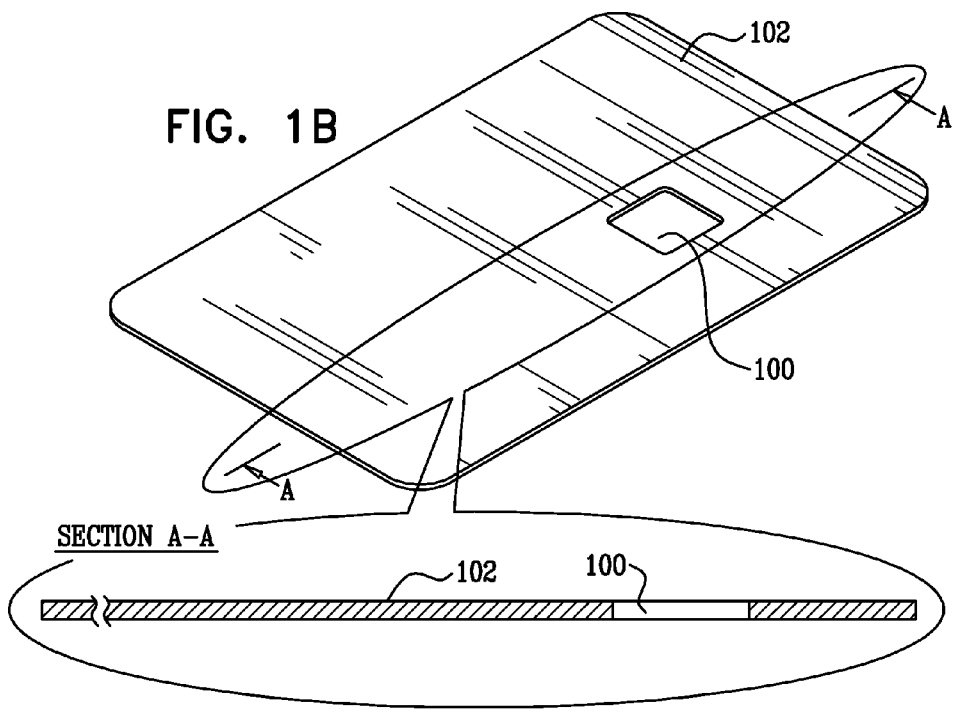

FIGS. 1A and 1B illustrate initial punching of a through-going aperture 100 in a substrate 102. The illustrated substrate is shown for the sake of clarity as a Standard smart card substrate, such as a substrate whose length and width is compliant with the ISO ID-1 standard. It is appreciated that the punching typically takes place when a plurality of substrates 102 are integrally formed as part of a sheet 103, typically formed of PVC or PET, having a thickness approximately 100 microns.

FIG. 1C illustrates the substrate 102 following mounting thereon of an antenna 104 and a smart card module 106. Mounting of the antenna 104 and the smart card module 106 on substrate 102 may be carried out in any suitable manner, for example by the techniques described and claimed in any of applicant's/assignee's patent applications: PCT/IL2007/01378 and PCT/IL2009/00075, the disclosures of which are hereby incorporated by reference.

The antenna 104 may be formed by any suitable technique and may be formed of wire as shown or alternatively in any other suitable manner, such as by screen printing or etching. Typically, the smart card module is a conventional smart card module including a base portion 108, also termed a lead frame, having a thickness of approximately 60-80 microns and an upstanding portion 110, also termed an epoxy layer, having a thickness of approximately 280 microns.

As seen in FIGS. 1D and 1E, following mounting of the antenna 104 and the smart card module 106 onto substrate 102, a plastic sheet 112, typically PVC of thickness 40-60 microns, is attached to the bottom of substrate 102 so as to underlie both the substrate 102 and the smart card module 106. Preferably the attachment is achieved by known techniques such as lamination.

Figure 1F:
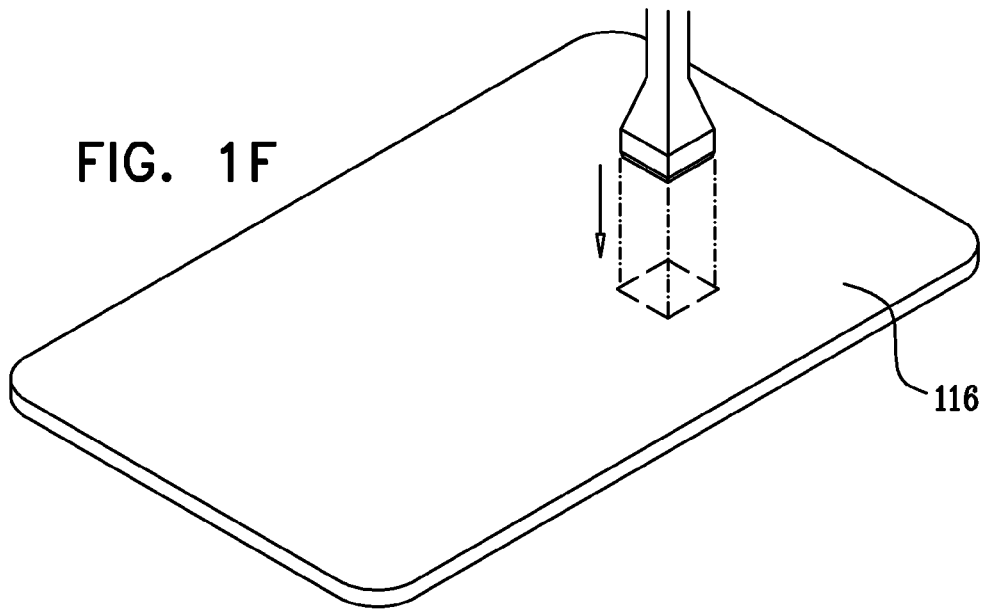
Figure 1G:
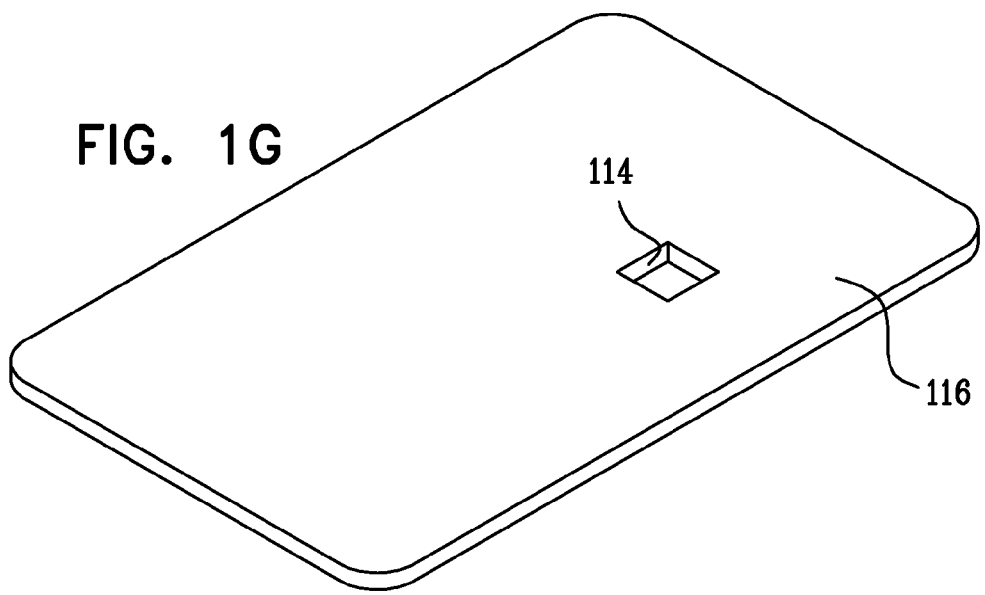

Reference is now made to FIGS. 1F and 1G, which show initial punching of a throughgoing aperture 114 in a compensation layer 116. The illustrated substrate is shown for the sake of clarity cut to a card width and length which is commonly identified as ISO ID-1 standard. It is appreciated that the punching shown in FIG. 1F typically takes place when a plurality of compensation layers 116 are integrally formed as part of a sheet (not shown) typically formed of PVC, PET, PC or TESLIN®, having a thickness approximately 275 microns.

Figure 1H:
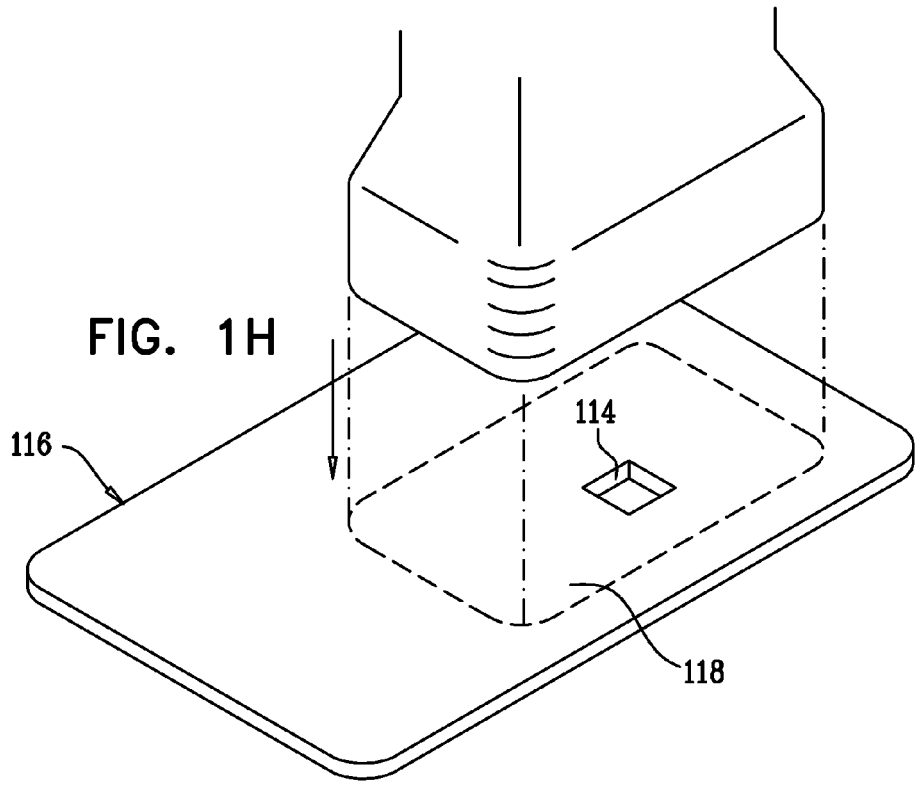

FIG. 1H illustrates punching out of a reduced size compensation layer 118 from compensation layer 116. The thus apertured remaining outer portion is retained and employed as described hereinbelow.

Figure 1I:
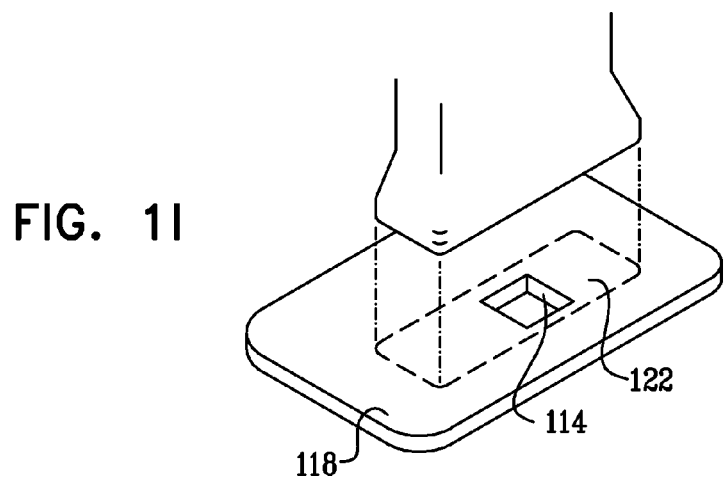

FIG. 1I illustrates punching out of an inner portion 122, including aperture 114, from compensation layer 118. The remaining outer portion is discarded or recycled as scrap.

FIGS. 1J and 1K illustrate attachment of remaining outer portion 120 over substrate 102 such that an aperture 126 thereof overlies antenna 104 and smart chip module 106 as seen clearly in FIG. 1K. Preferably the attachment is achieved by known techniques such as lamination.

Figure 1L:
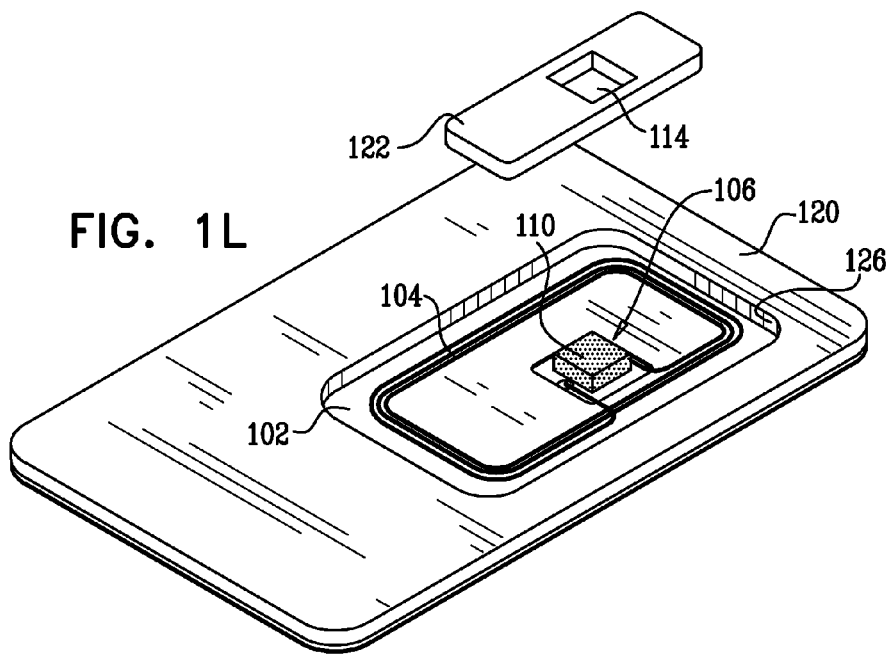
Figure 1M:
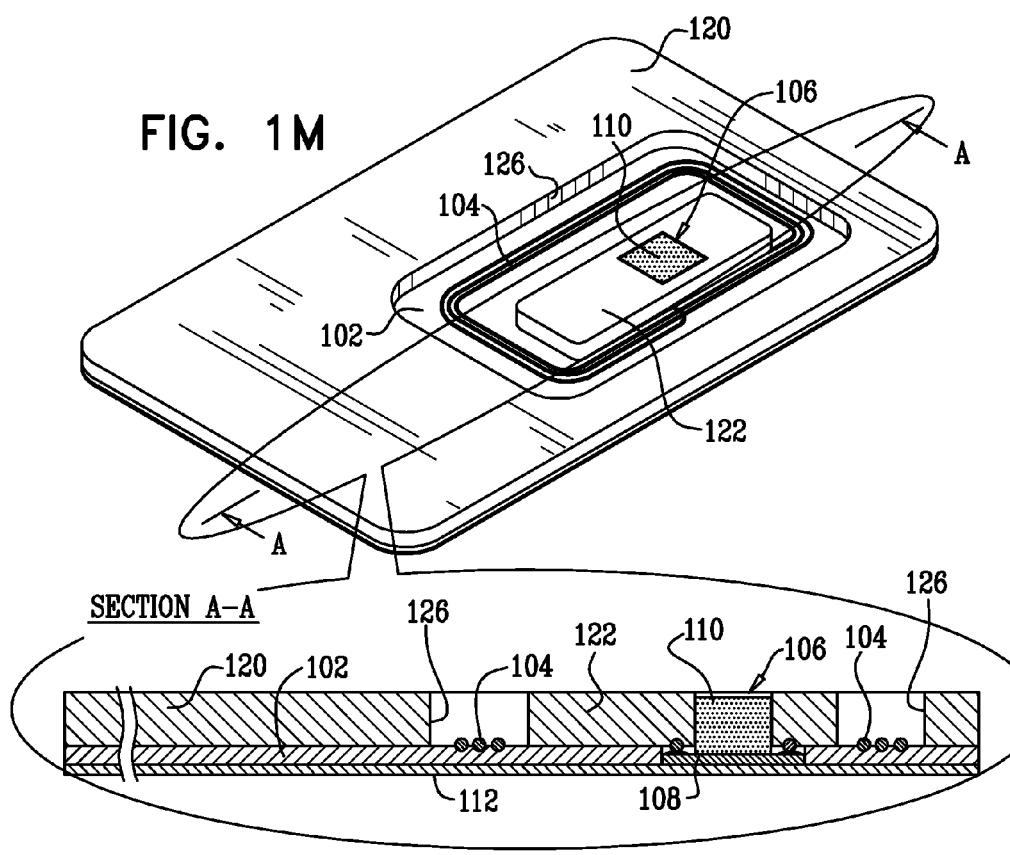

FIGS. 1L and 1M illustrate attachment of inner portion 122 over substrate 102 interiorly of antenna 104 such that the aperture 114 thereof overlies upstanding portion 110 of smart chip module 106 as seen clearly in FIG. 1M. Preferably the attachment is achieved by known techniques such as lamination.

Figure 1N:
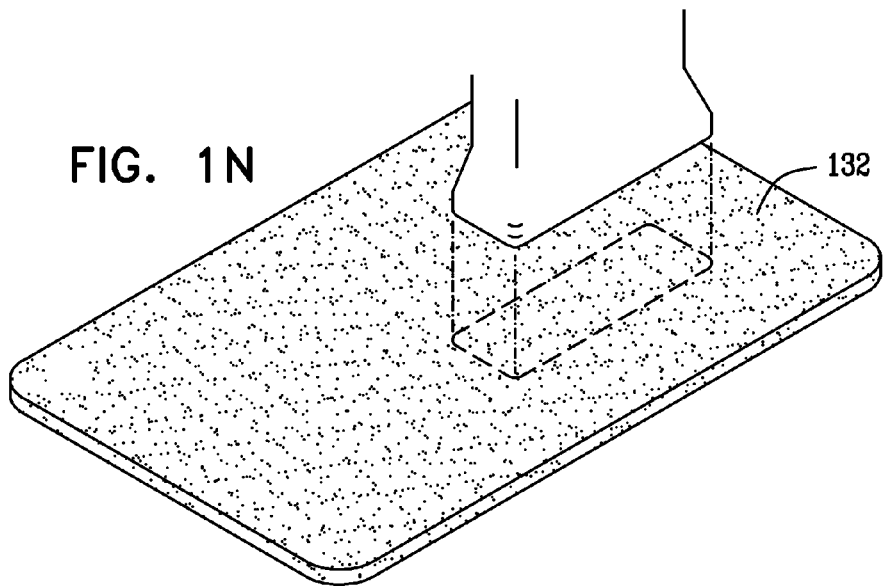
Figure 1O:
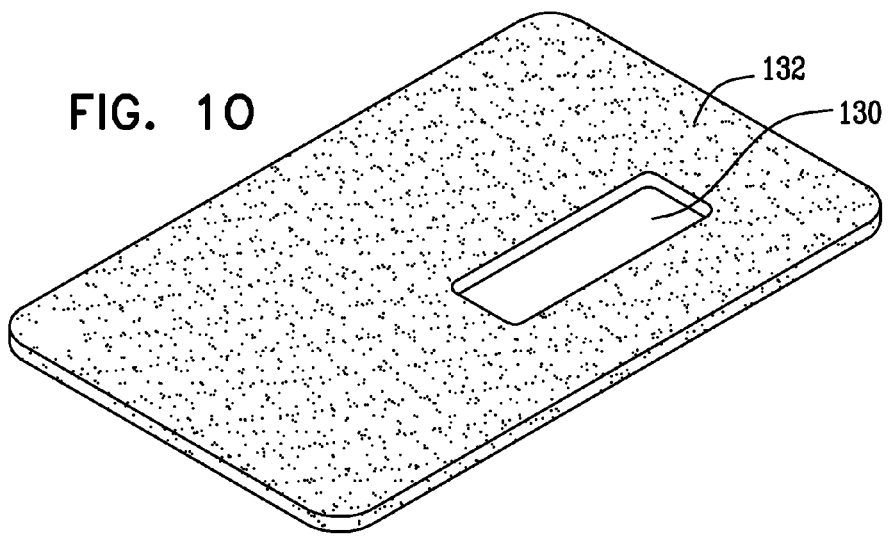

FIGS. 1N and 1O illustrate initial punching of a throughgoing aperture 130 in a layer of paramagnetic material 132, such as ferrite. The illustrated substrate is shown for the sake of clarity as having a length and width compliant with ISO Standard ID-1. It is appreciated that the punching typically takes place when a plurality of layers 132 are integrally formed as part of a larger sheet (not shown), having a thickness of approximately 260 microns.

Figure 1P:
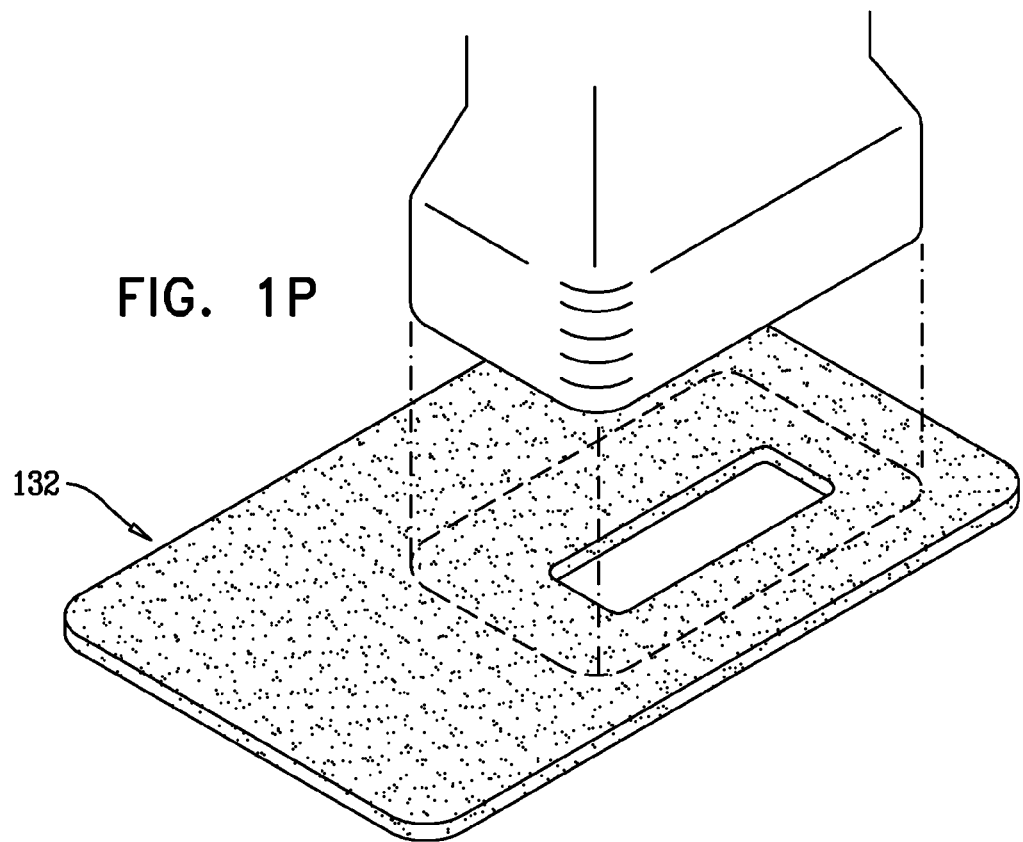
Figure 1Q:
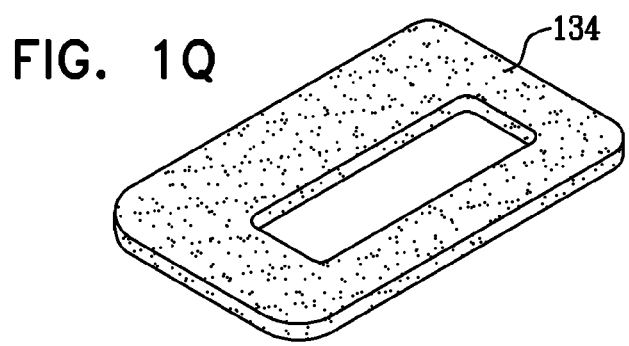

FIGS. 1P and 1Q illustrate punching out of a reduced size layer of paramagnetic material 134 from layer 132. The thus apertured remaining outer portion is discarded or recycled as scrap.

FIGS. 1R and 1S illustrate attachment of reduced size layer 134 over substrate 102 and over antenna 104 such that the aperture 130 thereof overlies inner portion 122 and upstanding portion 110 of smart chip module 106 as seen clearly in FIG. 1S. Preferably the attachment is achieved by known techniques such as lamination.

As seen in FIGS. 1T and 1U, following the steps illustrated in FIGS. 1R and 1S, a plastic sheet 138, typically PVC of thickness 40-60 microns, is attached over the structure shown in FIG. 1S so as to overlie substrate 102, antenna 104, the smart card module 106, outer portion 120, inner portion 122 and reduced size paramagnetic layer 134. The entire structure shown in FIG. 1U is preferably laminated together by any suitable laminating technique to define a laminate in the form of a sheet 143, corresponding to sheet 103.

Figure 1V:
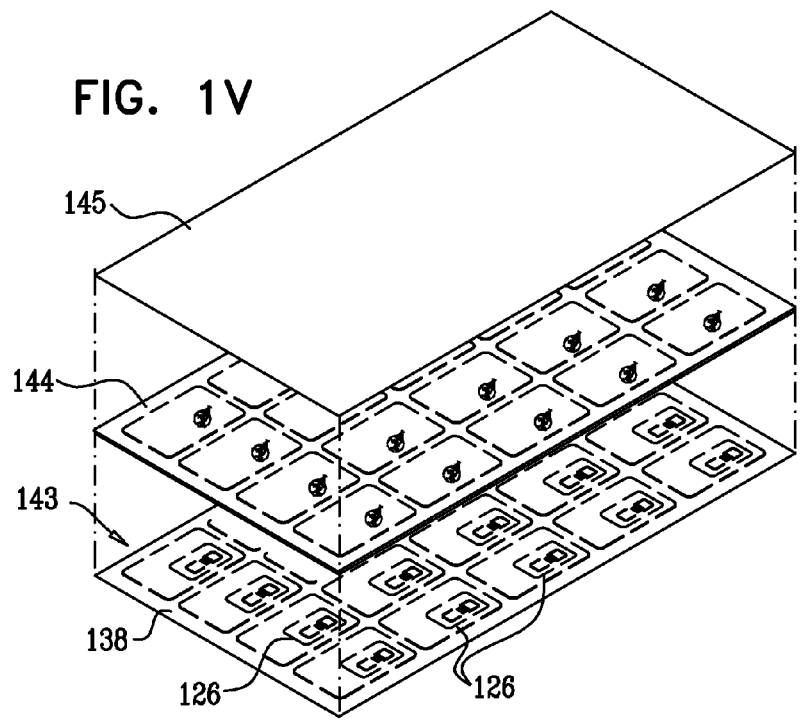

At this stage, the sheet 143 may be transferred to another facility at which an artwork sheet 144, typically PVC of thickness 200 microns bearing desired graphics and/or text, is attached over plastic sheet 138 and laminated to the sheet 143, as shown in FIG. 1V. Preferably a clear plastic overlay 145, typically PVC of thickness 70 microns, is formed over the artwork sheet 144.

Figure 1W:
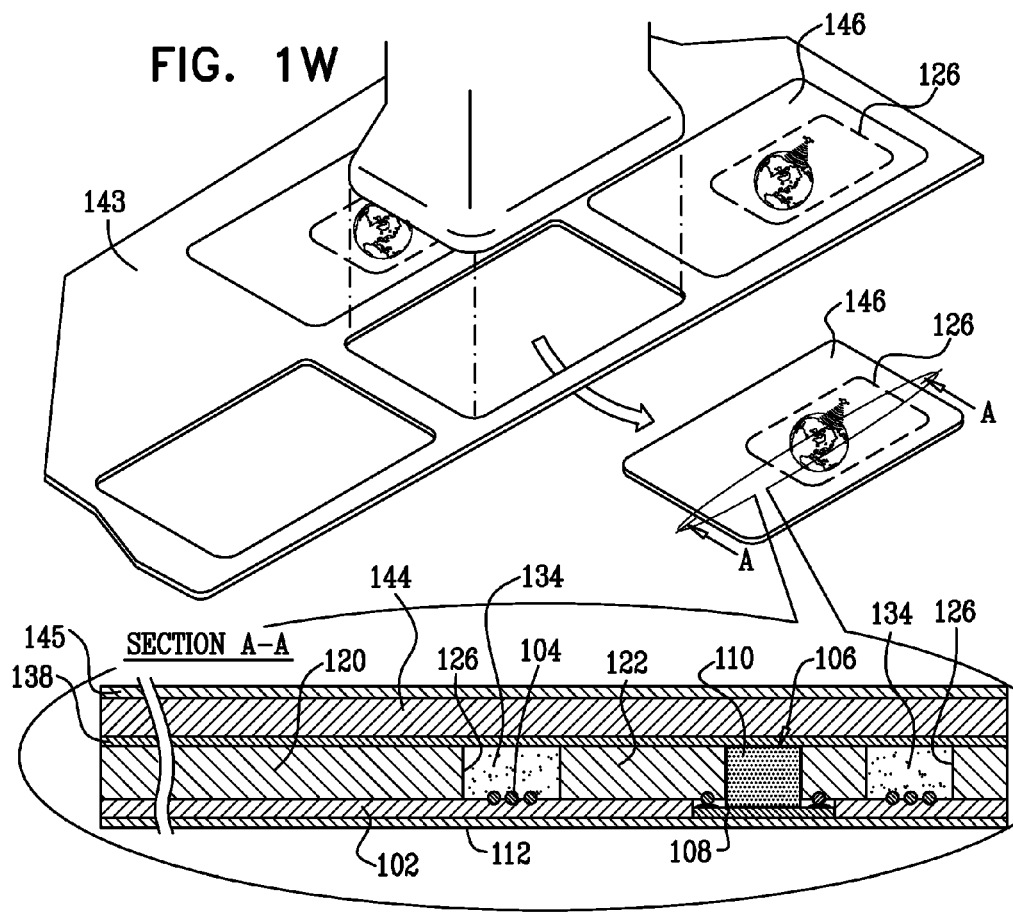

Thereafter, as shown in FIG. 1W, individual ISO ID-1 Standard sized cards 146, having a thickness of 0.76 mm+– 0.08 mm, are cut out by conventional machinery. The individual ISO ID-1 Standard sized cards 146 are then preferably individually programmed by conventional ID-1 contactless smart card programming apparatus 148 as seen in FIG. 1X.

Optionally before or following individual programming thereof, the ISO ID-1 Standard sized cards 146 are partially punched along a periphery 149 to define user-separable reduced size contactless smart card devices 150, as seen in FIG. 1Y. Typical dimensions of the reduced size contactless smart card devices 150 are 30 mm by 50 mm and are selected such that a peripheral portion 151 of compensation layer 120 surrounds the paramagnetic layer 134 in the reduced size contactless smartcard device 150. Contactless smart stickers may be realized preferably by providing a double-sided adhesive layer onto an outer facing surface of sheet 112. The adhesive layer is preferably covered by release paper.

Reference is now made to FIGS. 2A, 2B, 2C, 2D, 2E, 2F, 2G, 2H, 2I, 2J, 2K, 2L, 2M, 2N, 2O, 2P, 2Q, 2R, 2S, 2T and 2U, which are simplified illustrations of a method of manufacture of a contactless smart card device in accordance with another preferred embodiment of the present invention.

Figure 2A:
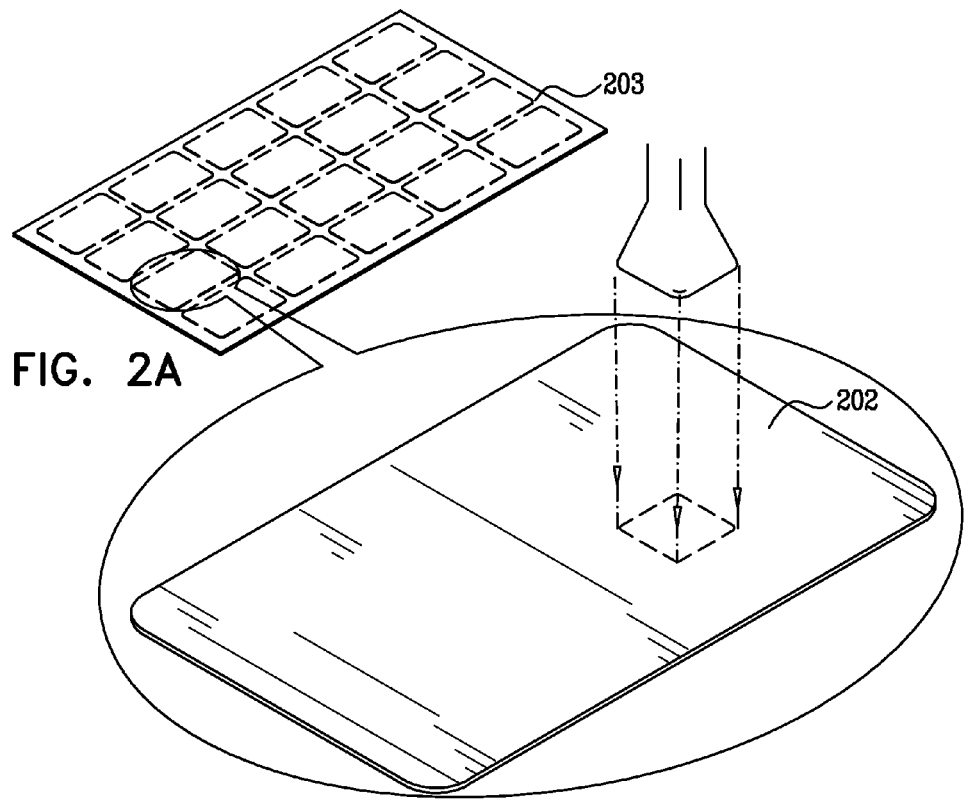
Figure 2B:
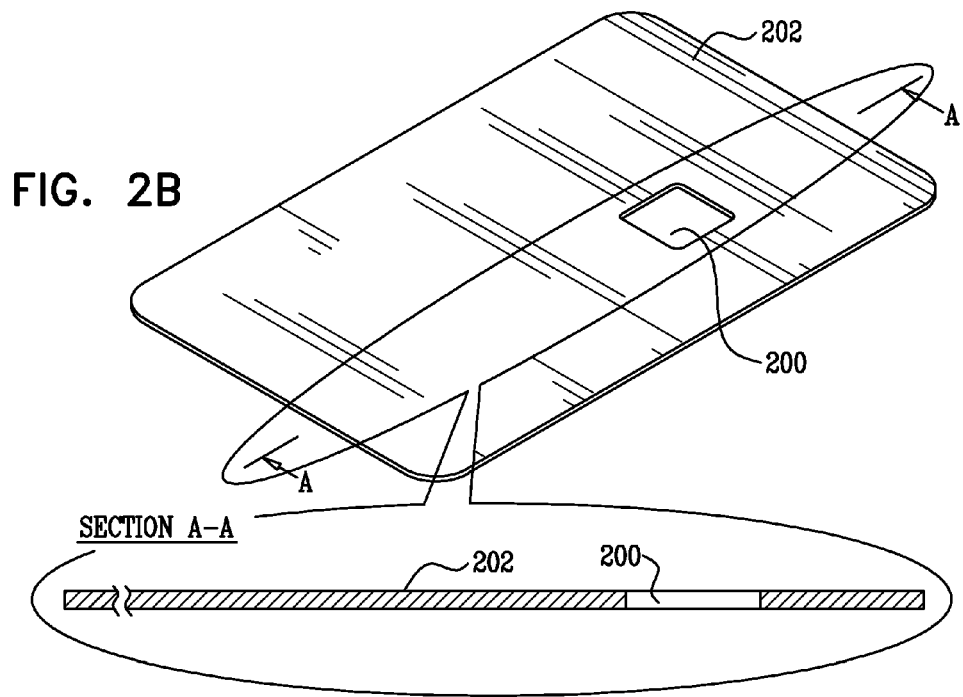

FIGS. 2A and 2B illustrate initial punching of a throughgoing aperture 200 in a substrate 202. The illustrated substrate is shown for the sake of clarity as a Standard smart card substrate, such as a substrate whose length and width are compliant with the ISO ID-1 standard. It is appreciated that the punching typically takes place when a plurality of substrates 202 are integrally formed as part of a sheet 203 typically formed of PVC or PET, having a thickness of approximately 100 microns.

FIG. 2C illustrates the substrate 202 following mounting thereon of an antenna 204 and a smart card module 206. Mounting of the antenna 204 and the smart card module 206 on substrate 202 may be carried out in any suitable manner, for example by the techniques described and claimed in any of applicant/assignee's patent applications: PCT/IL2007/01378 and PCT/IL2009/00075, the disclosures of which are hereby incorporated by reference.

The antenna 204 may be formed by any suitable technique and may be formed of wire as shown or alternatively in any other suitable manner, such as by screen printing or etching. Typically, the smart card module is a conventional smart card module including a base portion 208, also termed a lead frame, having a thickness of approximately 60-80 microns and an upstanding portion 210, also termed an epoxy layer, having a thickness of approximately 280 microns.

As seen in FIGS. 2D and 2E, following mounting of the antenna 204 and the smart card module 206 onto substrate 202, a plastic sheet 212, typically PVC of thickness 40-60 microns, is attached to the bottom of substrate 202 so as to underlie both the substrate 202 and the smart card module 206. Preferably the attachment is achieved by known techniques such as lamination.

Figure 2F:
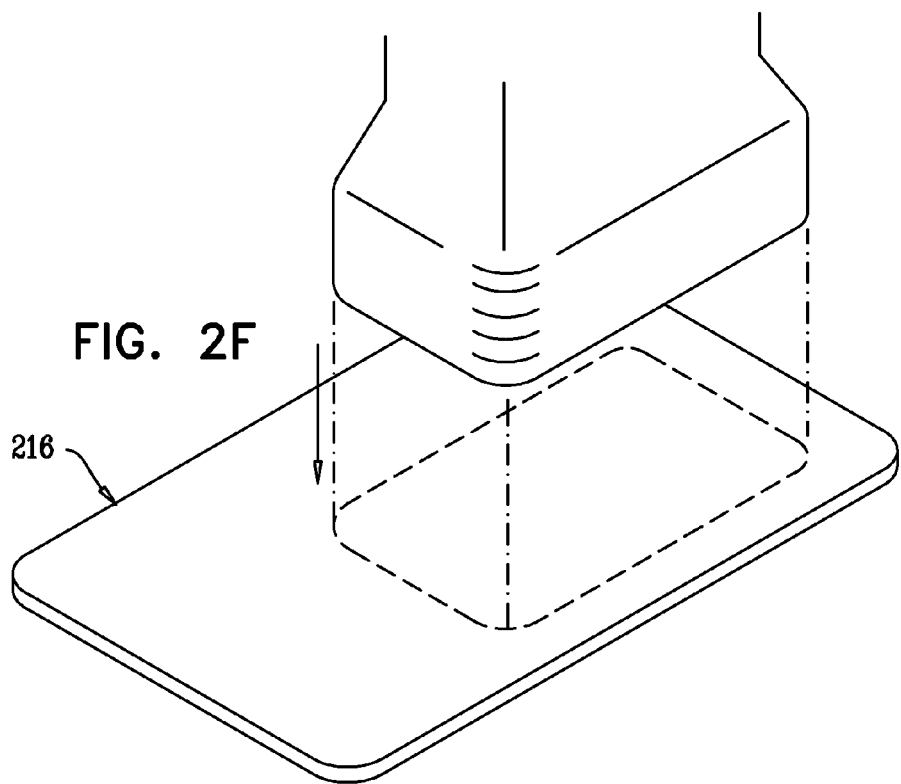
Figure 2G:
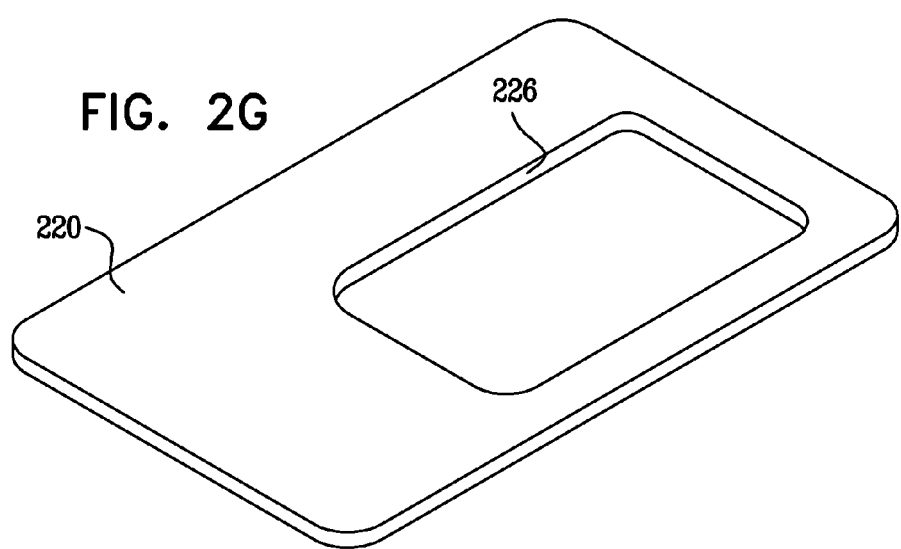

Reference is now made to FIGS. 2F and 2G, which show punching of a throughgoing aperture 226 in a compensation layer 216. The thus apertured remaining outer portion, designated by reference numeral 220, is retained and employed as described hereinbelow. The illustrated substrate is shown for the sake of clarity cut to a length and width which are compliant with the ISO ID-1 Standard. It is appreciated that the punching shown in FIG. 2F typically takes place when a plurality of compensation layers 216 are integrally formed as part of a sheet (not shown) typically formed of PVC, PET, PC or TESLIN®, having a thickness approximately 275 microns.

FIGS. 2H and 2I illustrate attachment of remaining outer portion 220 over substrate 202 such that the aperture 226 thereof overlies antenna 204 and smart chip module 206 as seen clearly in FIG. 2I. Preferably the attachment is achieved by known techniques such as lamination.

Figure 2J:
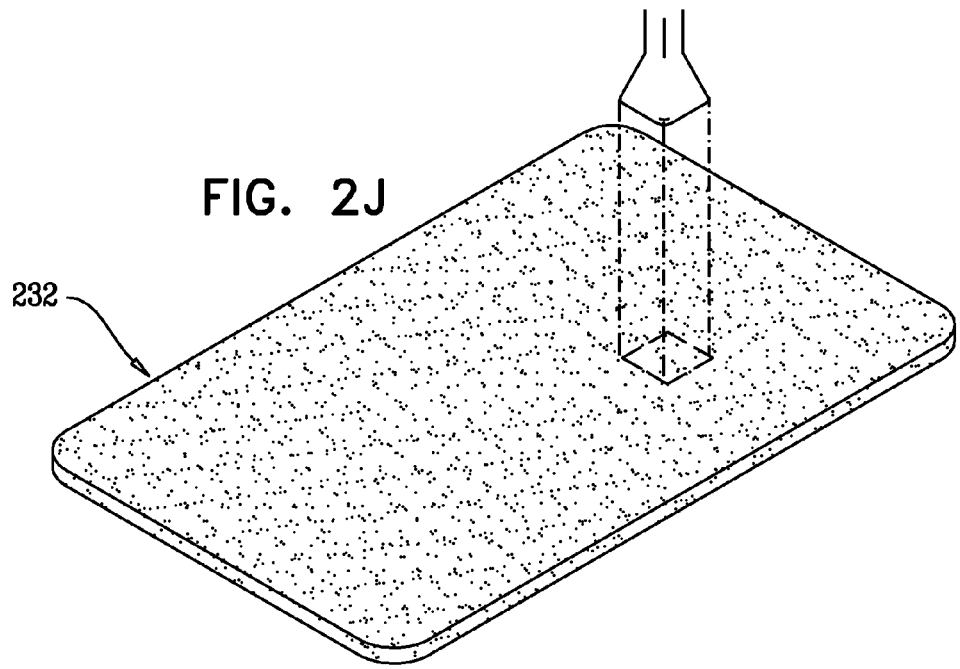
Figure 2K:
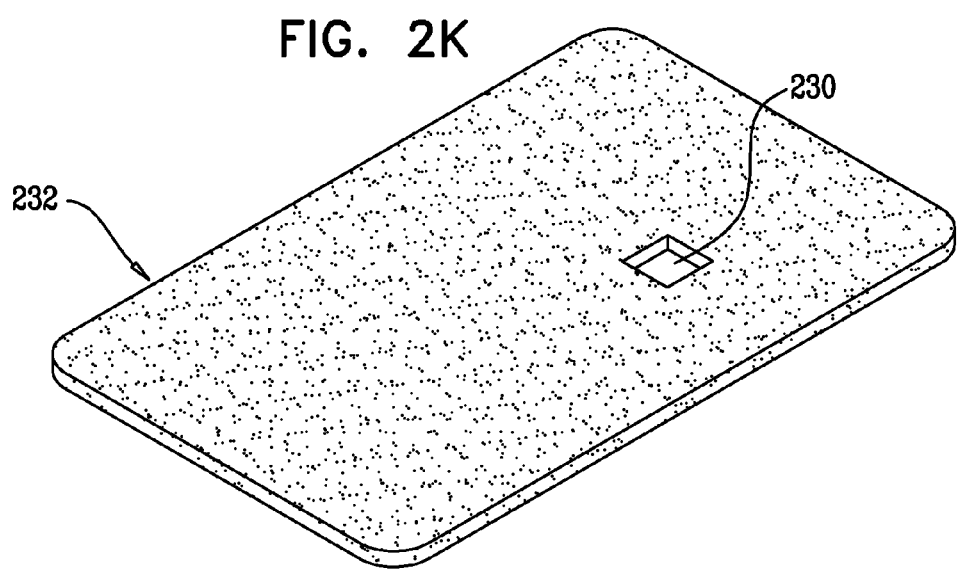

FIGS. 2J and 2K illustrate initial punching of a throughgoing aperture 230 in a layer of paramagnetic material 232, such as ferrite. The illustrated substrate is shown for the sake of clarity as having a length and width which are compliant with as ISO ID-1 Standard. It is appreciated that the punching typically takes place when a plurality of layers 232 are integrally formed as part of a larger sheet (not shown), having a thickness of approximately 260 microns.

Figure 2L:
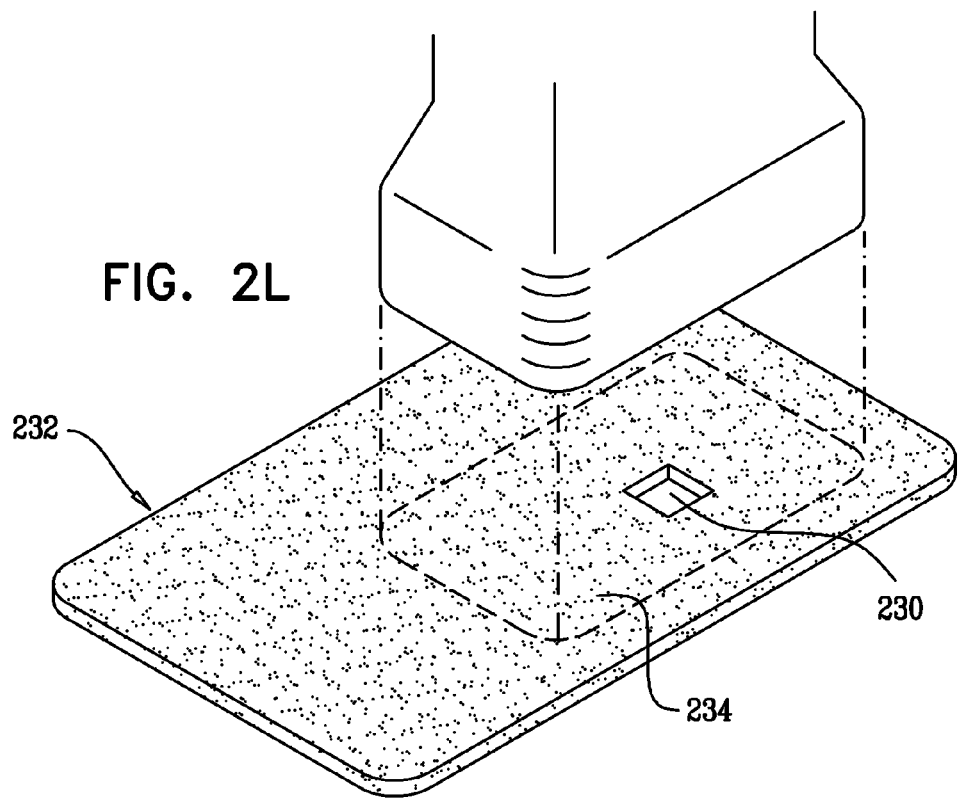
Figure 2M:
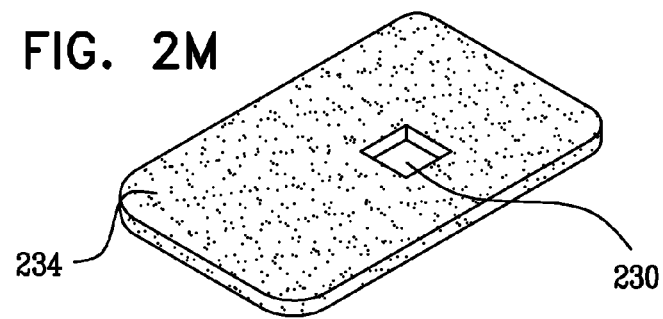

FIGS. 2L and 2M illustrate punching out of a reduced size apertured layer of paramagnetic material 234 from layer 232. The remaining outer portion is discarded or recycled as scrap.

FIGS. 2N and 2O illustrate attachment of reduced size layer 234 over substrate 202 and over antenna 204 such that the aperture 230 thereof overlies upstanding portion 210 of smart chip module 206 as seen clearly in FIG. 2O. Preferably the attachment is achieved by known techniques such as lamination.

As seen in FIGS. 2P and 2Q, following the steps illustrated in FIGS. 2N and 2O, a plastic sheet 238, typically PVC of thickness 40-60 microns, is attached over the structure shown in FIG. 2O so as to overlie substrate 202, outer portion 220, antenna 204, smart card module 206, and reduced size paramagnetic layer 234. The entire structure shown in FIG. 2Q, in the form of a sheet 243, corresponding to sheet 203, is preferably laminated together by any suitable laminating technique.

At this stage, the sheet 243 may be transferred to another facility at which an artwork sheet 244, typically PVC of thickness 200 microns bearing desired graphics and/or text, is attached over plastic sheet 238 and laminated to the sheet 243, as shown in FIG. 2R. Preferably, a clear plastic overlay 245, typically PVC of thickness 70 microns, is formed over the artwork sheet 244.

Thereafter, as shown in FIG. 2S, individual ISO ID-1 Standard sized cards 246, having a thickness of 0.76 mm+−0.08 mm are cut out of sheet 243 by conventional machinery. The individual ID-1 sized cards 246 are then individually programmed by conventional contactless smart card programming apparatus 248, as seen in FIG. 2T.

Optionally before or following individual programming thereof, the ID-1 sized cards 246 are partially punched or otherwise perforated along a periphery 249 to define user-separable reduced size contactless smart card devices 250, as seen in FIG. 2U. Typical dimensions of the reduced size contactless smart card devices 250 are 30 mm by 50 mm and its dimensions are selected such that a peripheral portion 251 of compensation layer 220 surrounds the paramagnetic layer 234 in the reduced size contactless smartcard device 250.

Contactless smart stickers may be realized by providing a double sided adhesive layer onto an outer facing surface of sheet 212. The adhesive layer is preferably covered by release paper.

Reference is now made to FIGS. 3A, 3B, 3C, 3D, 3E, 3F, 3G, 3H, 3I, 3J, 3K, 3L, 3M, 3N, 3O, 3P, 3Q, 3R, 3S, 3T and 3U, which are simplified illustrations of a method of manufacture of a contactless smart card device in accordance with yet another preferred embodiment of the present invention.

Figure 3A:
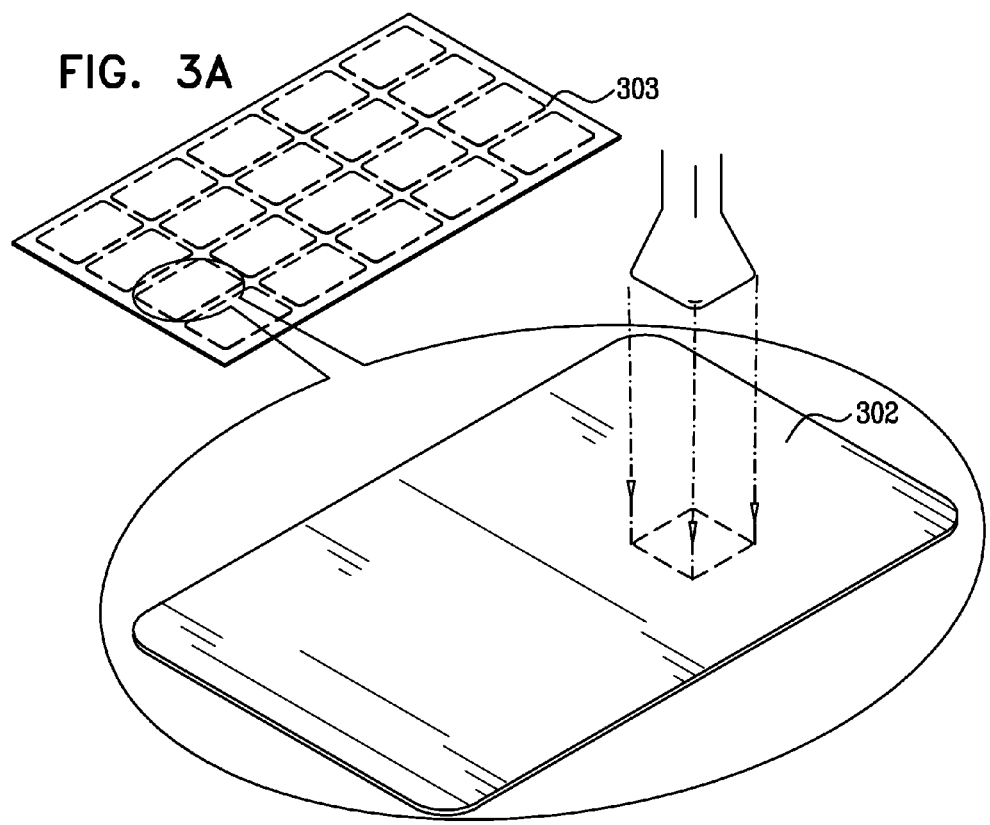
Figure 3B:
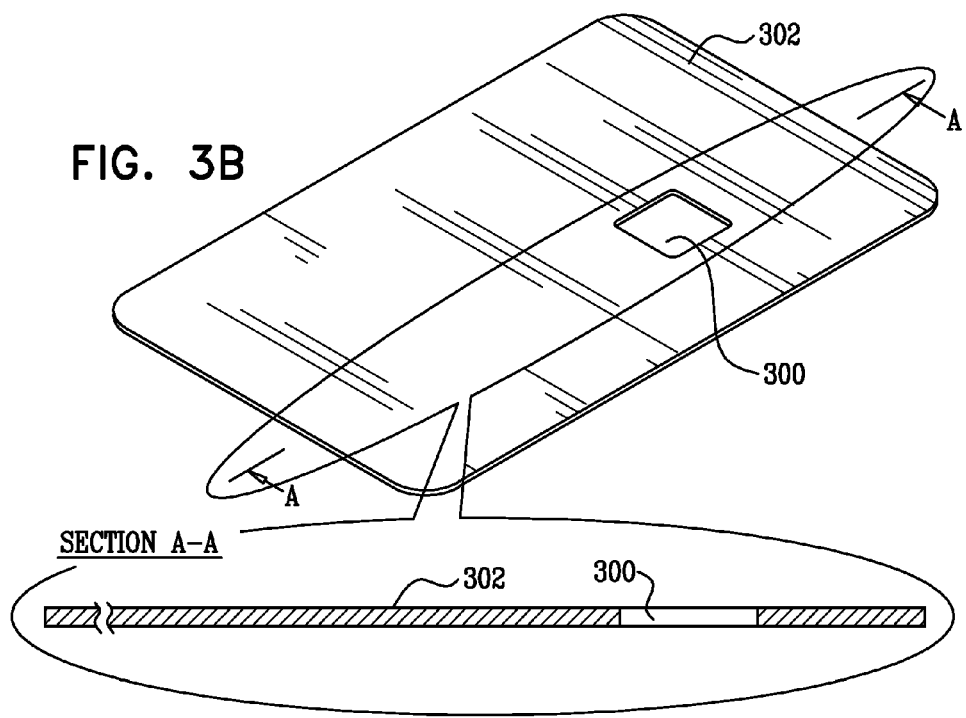

FIGS. 3A and 3B illustrate initial punching of a throughgoing aperture 300 in a substrate 302. The illustrated substrate is shown for the sake of clarity as a Standard smart card substrate, such as a substrate whose size is commonly identified as ISO ID-1 Standard. It is appreciated that the punching typically takes place when a plurality of substrates 302 are integrally formed as part of a sheet 303 typically formed of PVC or PET, having a thickness approximately 100 microns.

FIG. 3C illustrates the substrate 302 following mounting thereon of an antenna 304 and a smart card module 306. Mounting of the antenna 304 and the smart card module 306 on substrate 302 may be carried out in any suitable manner, for example by the techniques described and claimed in any of applicant/assignees patent applications PCT/IL2007/01378 and PCT/IL2009/00075, the disclosures of which are hereby incorporated by reference.

The antenna 304 may be formed by any suitable technique and may be formed of wire as shown or alternatively in any other suitable manner, such as by screen printing or etching. Typically, the smart card module is a conventional smart card module including a base portion 308, also termed a lead frame, having a thickness of approximately 60-80 microns and an upstanding portion 310, also termed an epoxy layer, having a thickness of approximately 280 microns.

As seen in FIGS. 3D and 3E, following mounting of the antenna 304 and the smart card module 306 onto substrate 302, a plastic sheet 312, typically PVC of thickness 40-60 microns, is attached to the bottom of substrate 302 so as to underlie both the substrate 302 and the smart card module 306. Preferably the attachment is achieved by known techniques such as lamination.

Figure 3F:
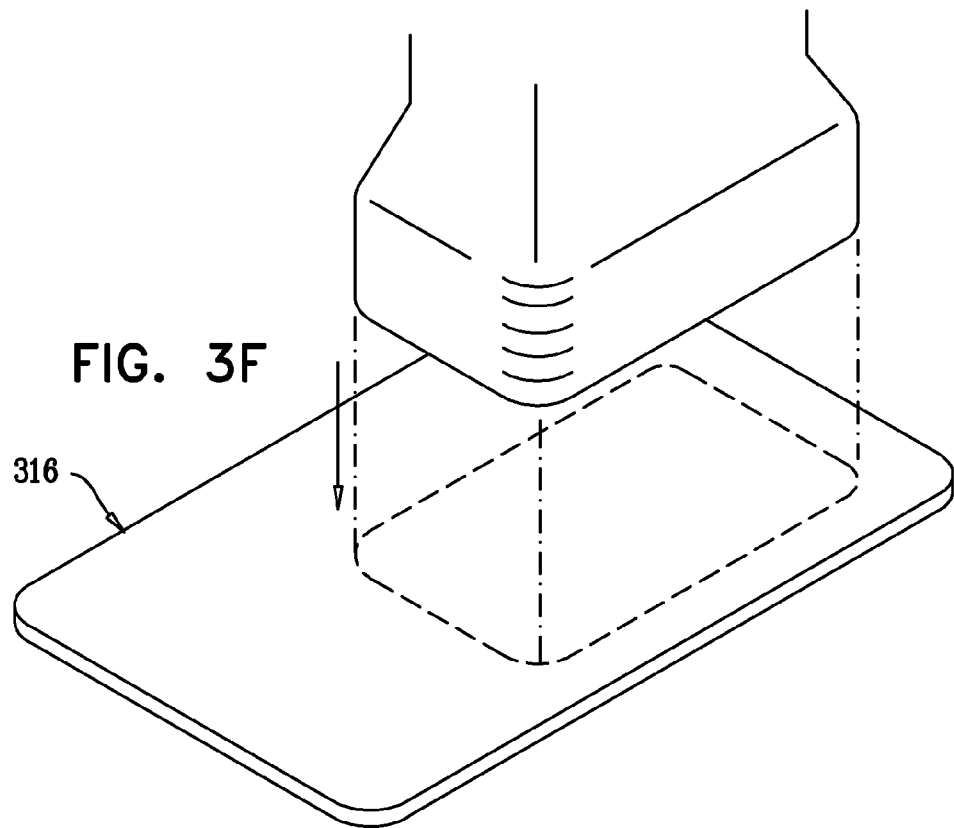
Figure 3G:
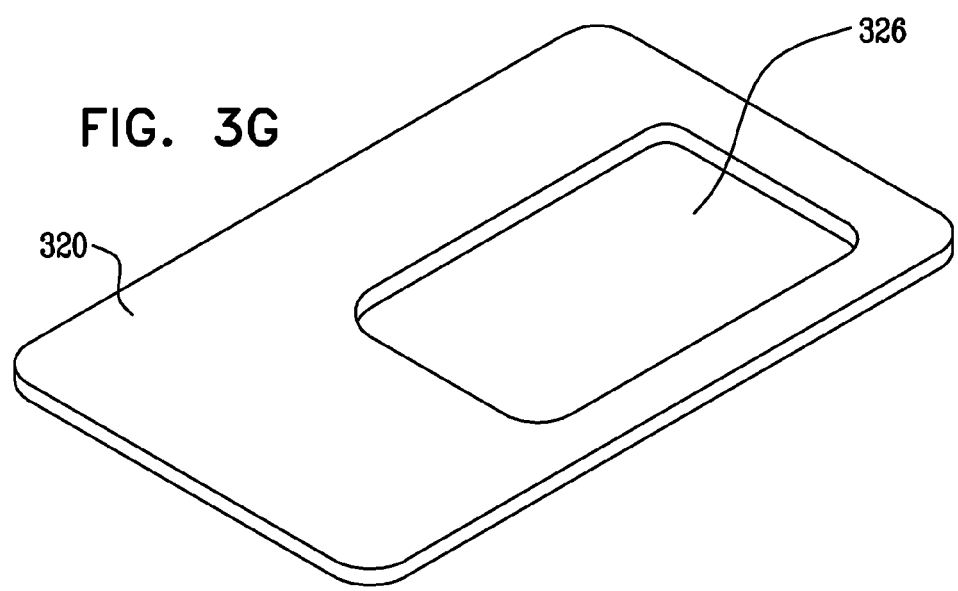

Reference is now made to FIGS. 3F and 3G, which show punching of a throughgoing aperture 326 in a compensation layer 316. The thus apertured remaining outer portion, designated by reference numeral 320, is retained and employed as described hereinbelow. The illustrated substrate is shown for the sake of clarity cut to a length and width which are commonly identified as ISO ID-1 Standard. It is appreciated that the punching shown in FIG. 3F typically takes place when a plurality of compensation layers 316 are integrally formed as part of a sheet (not shown) typically formed of PVC, PET, PC or TESLIN®, having a thickness approximately 275 microns.

FIGS. 3H and 3I illustrate attachment of remaining outer portion 320 over substrate 302 such that the aperture 326 thereof overlies antenna 304 and smart chip module 306 as seen clearly in FIG. 3I. Preferably the attachment is achieved by known techniques such as lamination.

Figure 3J:
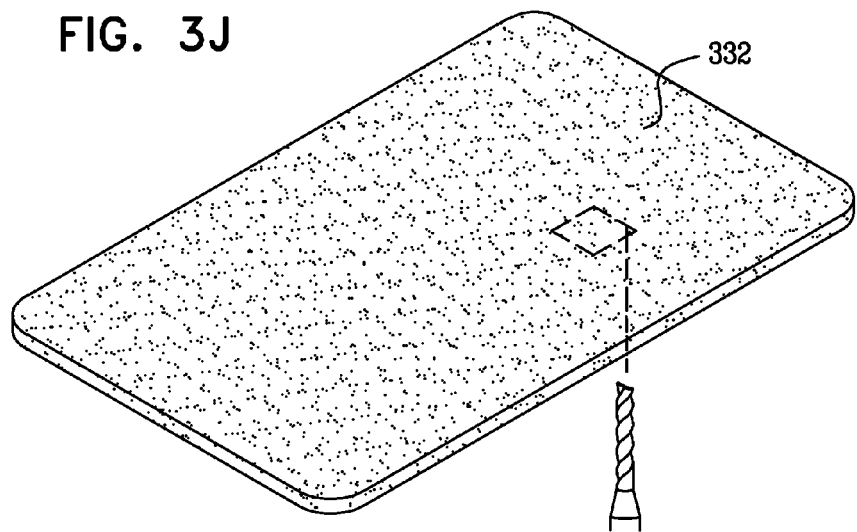
Figure 3K:
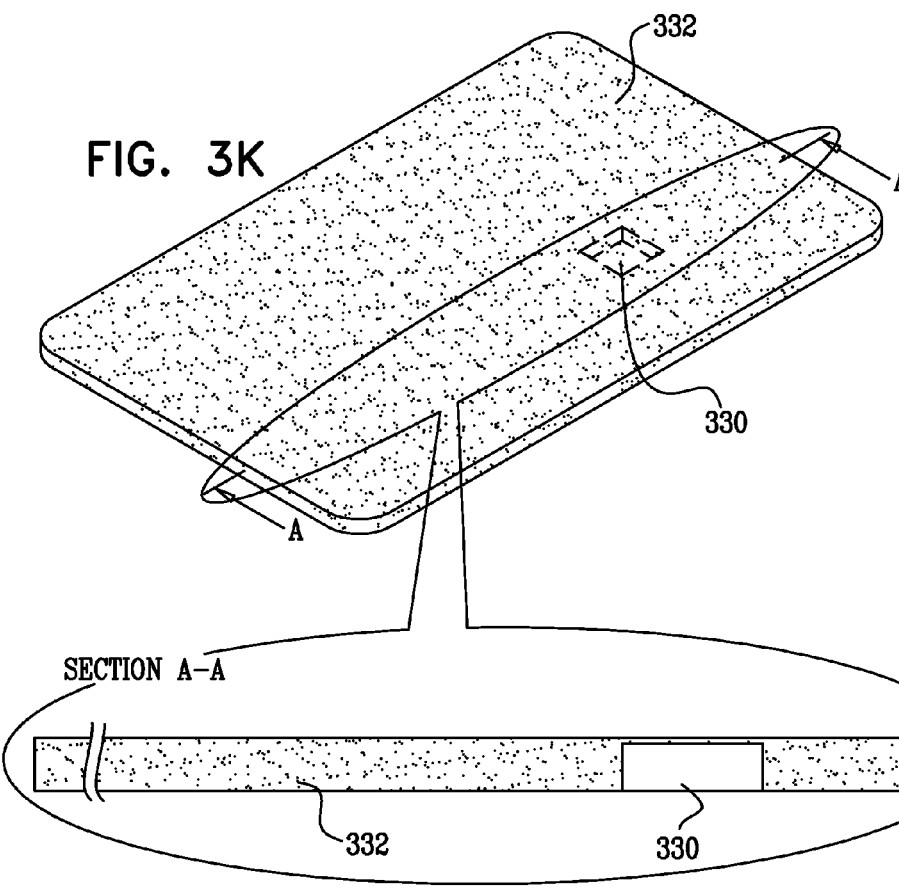

FIGS. 3J and 3K illustrate initial machining of a recess 330 in a layer of paramagnetic material 332, such as ferrite. The illustrated substrate is shown for the sake of clarity as having a length and width commonly identified as ISO ID-1 Standard. It is appreciated that the punching typically takes place when a plurality of layers 332 are integrally formed as part of a larger sheet (not shown), having a thickness of approximately 260 microns.

Figure 3L:
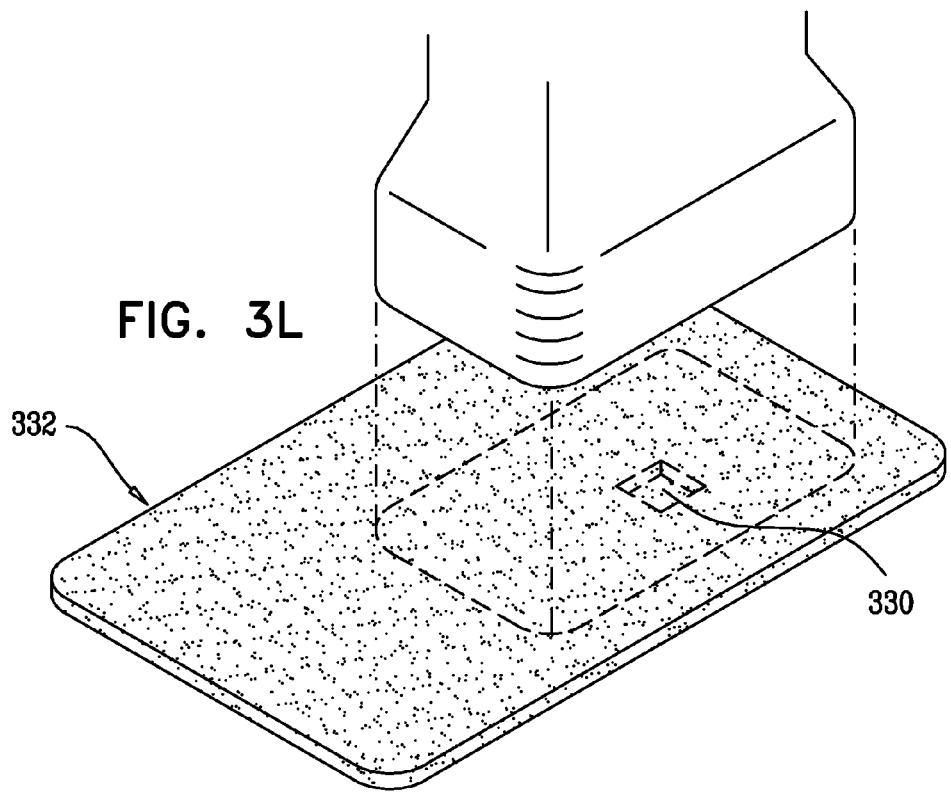
Figure 3M:
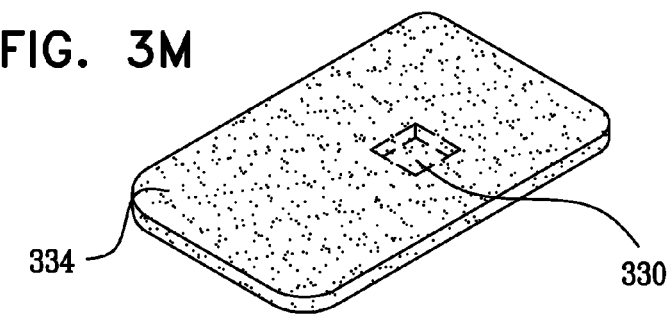

FIGS. 3L and 3M illustrate punching out of a reduced size apertured layer of paramagnetic material 334 from layer 332. The remaining outer portion is discarded or recycled as scrap.

FIGS. 3N and 3O illustrate attachment of reduced size layer 334 over substrate 302 and over antenna 304 such that the recess 330 overlies upstanding portion 310 of smart chip module 306 as seen clearly in FIG. 3O. Preferably the attachment is achieved by known techniques such as lamination.

As seen in FIGS. 3P and 3Q, following the steps illustrated in FIGS. 3N and 3O, a plastic sheet 338, typically PVC of thickness 40-60 microns, is attached over the structure shown in FIG. 3O so as to overlie substrate 302, outer portion 320, antenna 304, smart card module 306, and reduced size paramagnetic layer 334. The entire structure shown in FIG. 3Q, in the form of a sheet 343, corresponding to sheet 303, is preferably laminated together by any suitable laminating technique.

Figure 3R:
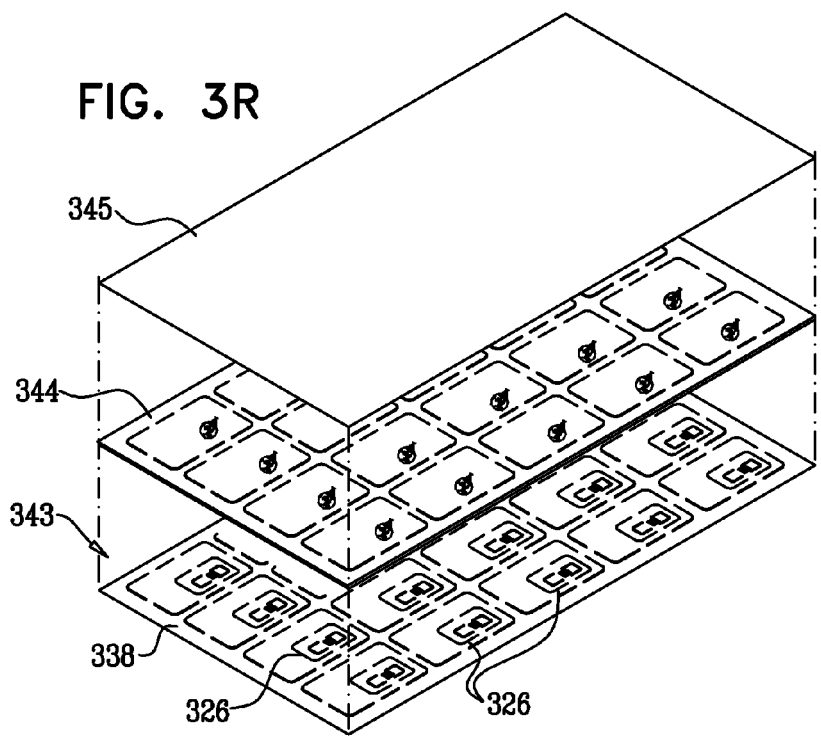

At this stage, the sheet 343 may be transferred to another facility at which an artwork sheet 344, typically PVC of thickness 200 microns bearing desired graphics and/or text, is attached over plastic sheet 338 and laminated to the sheet 343, as shown in FIG. 3R. Preferably, a clear plastic overlay 345 typically PVC of thickness 70 microns, is formed over the artwork sheet 344.

Figure 3S:
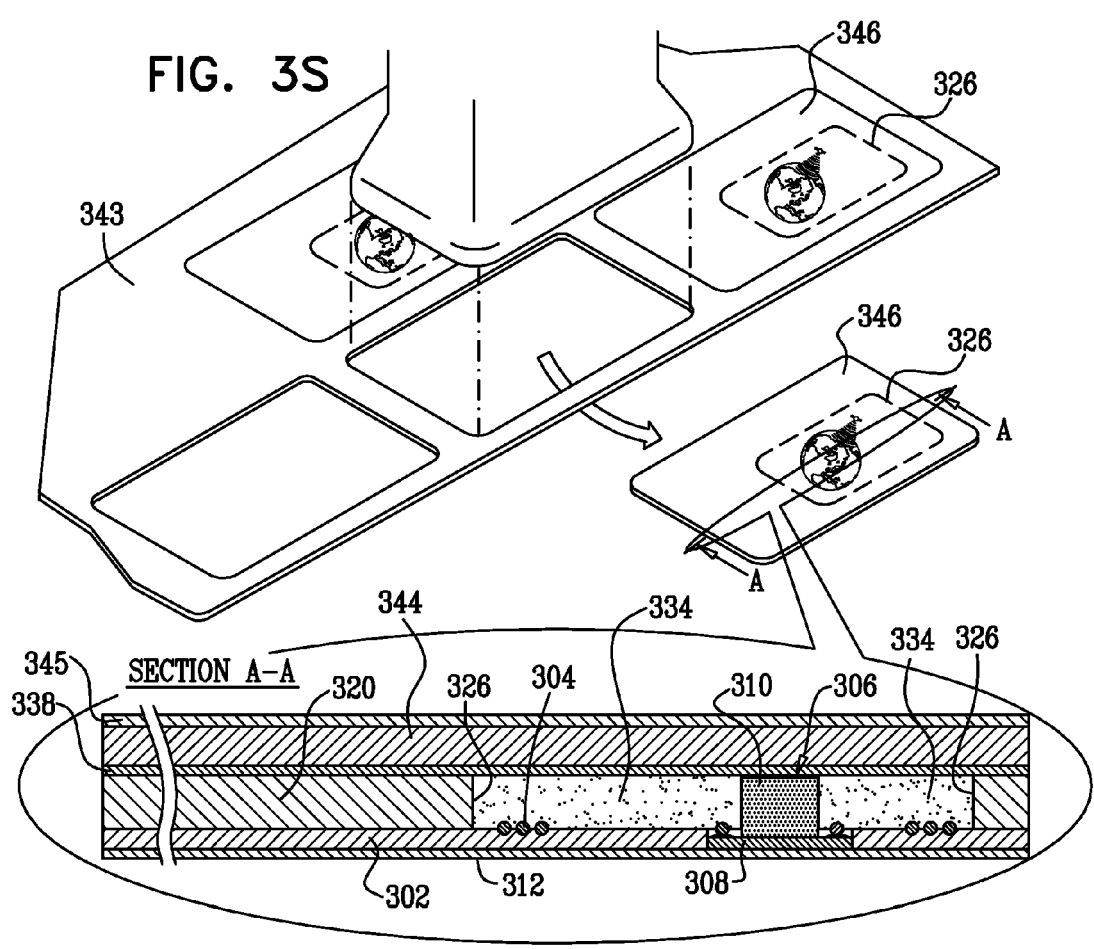

Thereafter, as shown in FIG. 3S, individual ID-1 sized cards 346, having a thickness of 0.76 mm+−0.08 mm, are cut out of sheet 343 by conventional machinery. The individual ID-1 sized cards 346 are then individually programmed by conventional contactless smart card programming apparatus 348, as seen in FIG. 3T.

Optionally before or following individual programming thereof, the ID-1 sized cards 346 are partially punched or otherwise perforated along a periphery 349 to define user-separable reduced size contactless smart card devices 350, as seen in FIG. 3U. Typical dimensions of the reduced size contactless smart card devices 350 are 30 mm by 50 mm and are selected such that a peripheral portion 351 of compensation layer 320 surrounds the paramagnetic layer 334 in the reduced size contactless smartcard device 350.

Contactless smart stickers may be realized by providing a double sided adhesive layer onto an outer facing surface of sheet 312. The adhesive layer is preferably covered by release paper.

Reference is now made to FIGS. 4A, 4B, 4C, 4D, 4E, 4F, 4G, 4H, 4I, 4J, 4K, 4L, 4M, 4N, 4O, 4P, 4Q, 4R and 4S, which are simplified illustrations of a method of manufacture of a contactless smart card device in accordance with yet another preferred embodiment of the present invention.

Figure 4A:
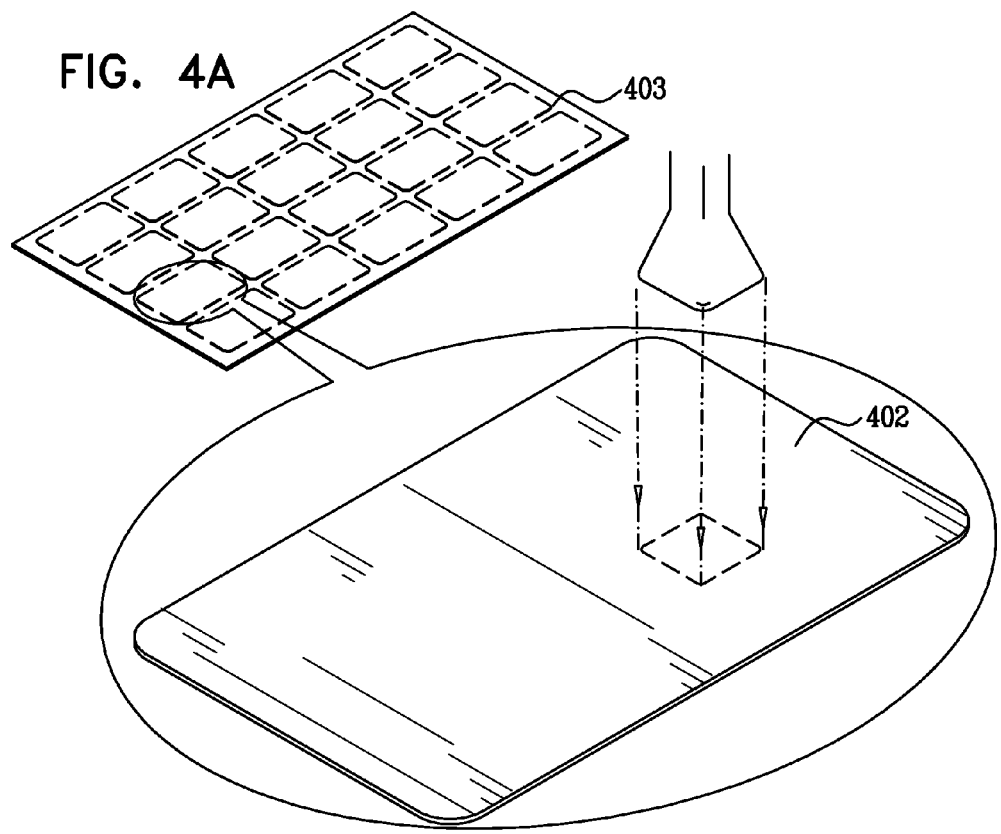
Figure 4B:
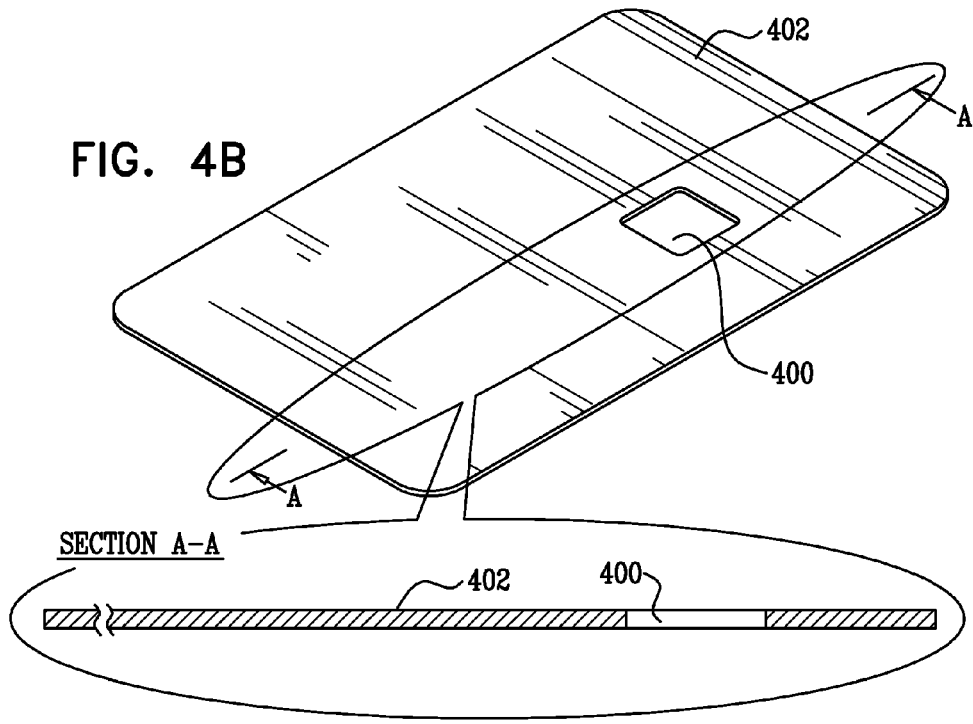

FIGS. 4A and 4B illustrate initial punching of a throughgoing aperture 400 in a substrate 402. The illustrated substrate is shown for the sake of clarity as a Standard smart card substrate, such as a substrate whose size is commonly identified as ISO ID-1 Standard. It is appreciated that the punching typically takes place when a plurality of substrates 402 are integrally formed as part of a sheet 403 typically formed of PVC or PET, having a thickness approximately 100 microns.

FIG. 4C illustrates the substrate 402 following mounting thereon of an antenna 404 and a smart card module 406. Mounting of the antenna 404 and the smart card module 406 on substrate 402 may be carried out in any suitable manner, for example by the techniques described and claimed in any of applicant/assignee's patent applications PCT/IL2007/01378 and PCT/IL2009/00075, the disclosures of which are hereby incorporated by reference.

The antenna 404 may be formed by any suitable technique and may be formed of wire as shown or alternatively in any other suitable manner, such as by screen printing or etching Typically, the smart card module is a conventional smart card module including a base portion 408, also termed a lead frame, having a thickness of approximately 60-80 microns and an upstanding portion 410, also termed an epoxy layer, having a thickness of approximately 280 microns.

Figure 4D:
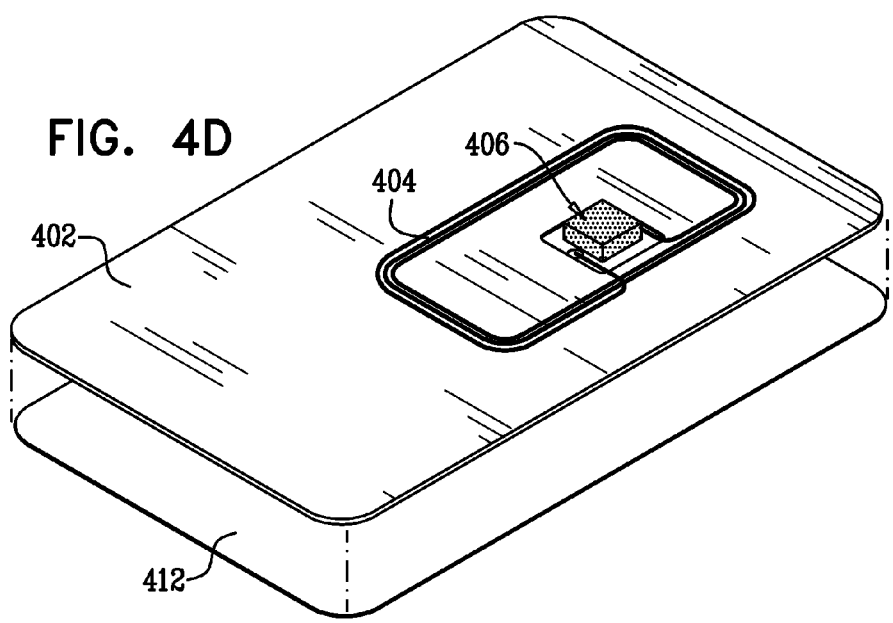
Figure 4E:
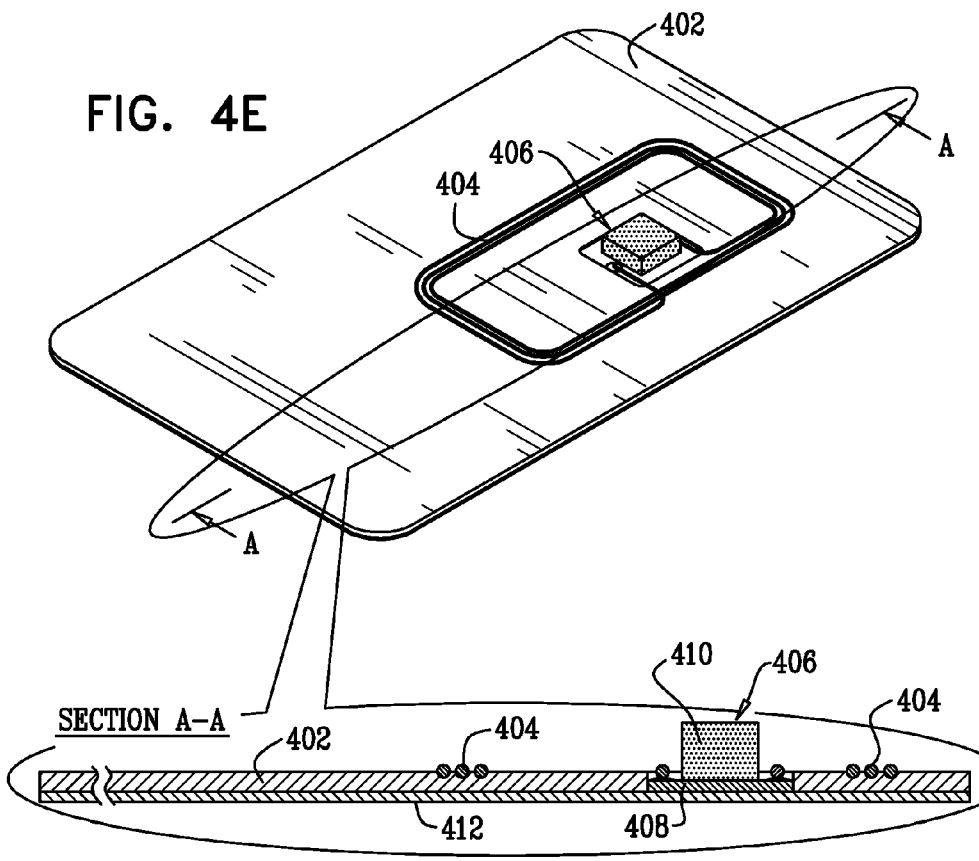

As seen in FIGS. 4D and 4E, following mounting of the antenna 404 and the smart card module 406 onto substrate 402, a plastic sheet 412, typically PVC of thickness 40-60 microns, is attached to the bottom of substrate 402 so as to underlie both the substrate 402 and the smart card module 406. Preferably the attachment is achieved by known techniques such as lamination.

Figure 4F:
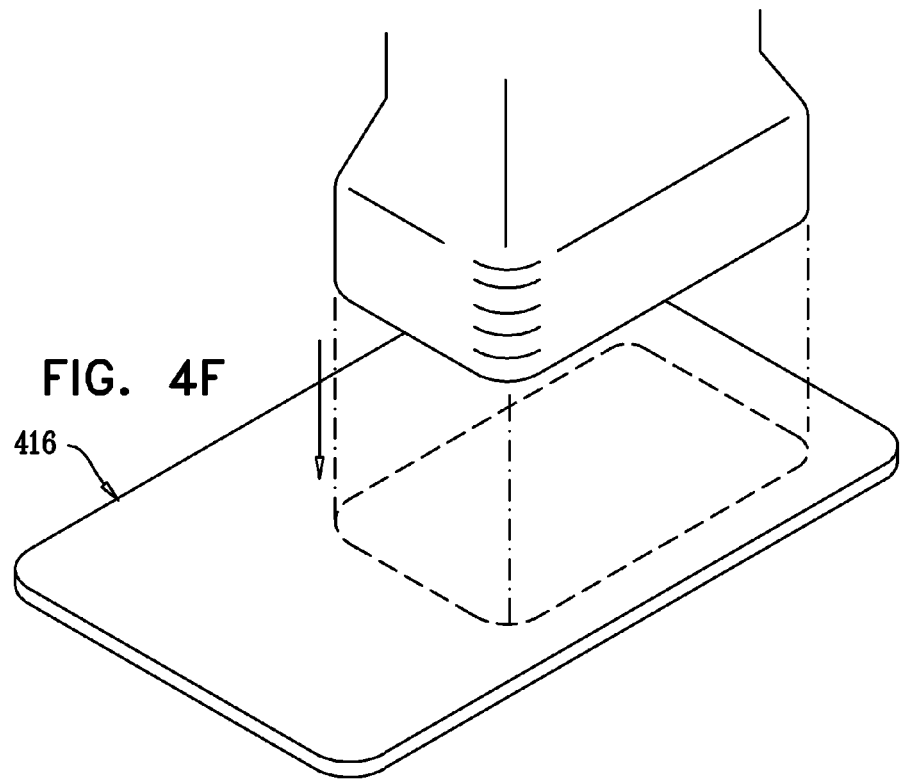
Figure 4G:
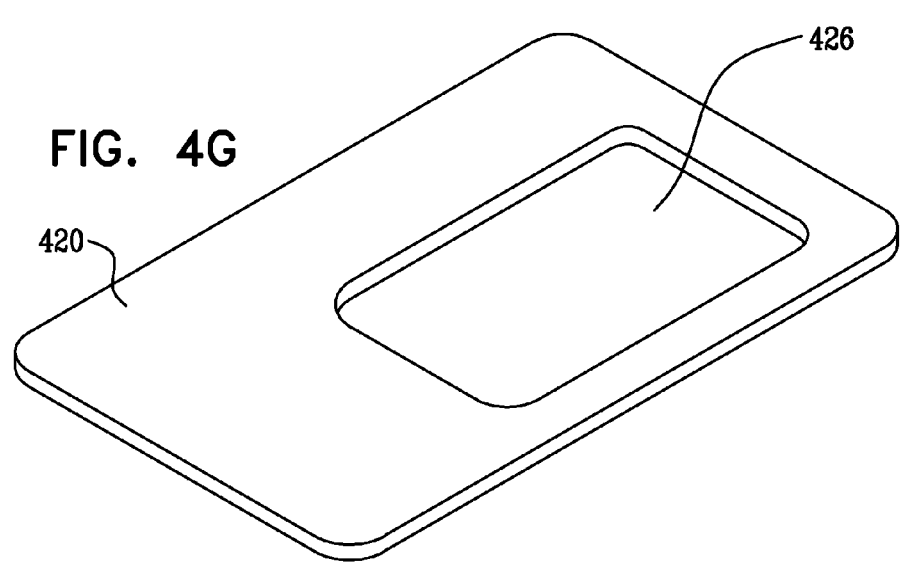

Reference is now made to FIGS. 4F and 4G, which show punching of a throughgoing aperture 426 in a compensation layer 416. The thus apertured remaining outer portion, designated by reference numeral 420, is retained and employed as described hereinbelow. The illustrated substrate is shown for the sake of clarity cut to a length and width which are commonly identified as ISO ID-1 Standard. It is appreciated that the punching shown in FIG. 4F typically takes place when a plurality of compensation layers 416 are integrally formed as part of a sheet (not shown) typically formed of PVC, PET, PC or TESLIN®, having a thickness of approximately 275 microns.

FIGS. 4H and 4I illustrate attachment of remaining outer portion 420 over substrate 402 such that the aperture 426 thereof overlies antenna 404 and smart chip module 406 as seen clearly in FIG. 4I. Preferably the attachment is achieved by known techniques such as lamination.

Figure 4J:
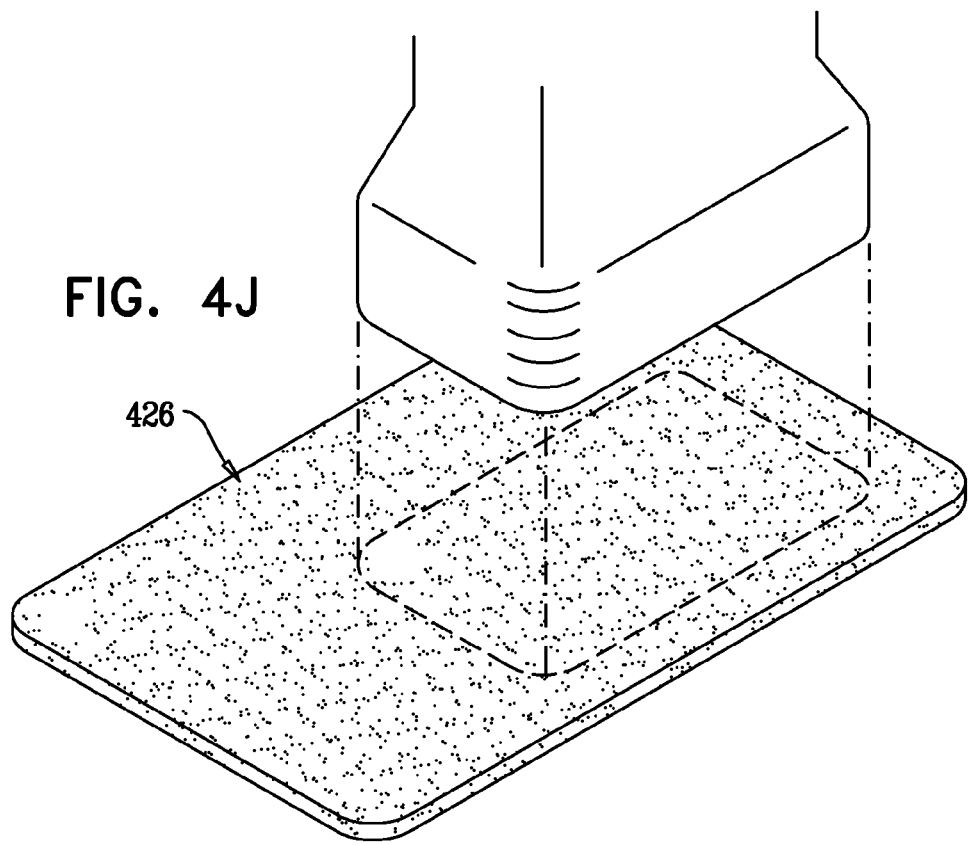
Figure 4K:
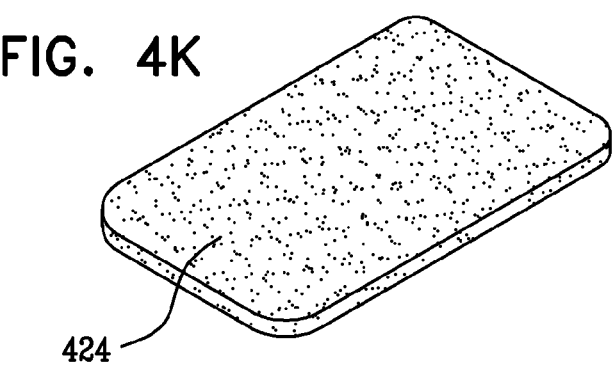

FIGS. 4J and 4K illustrate punching out of a reduced size layer of paramagnetic material 424 from a sheet of paramagnetic material 426, such as ferrite. The remaining outer portion, designated by reference numeral 428, is discarded or recycled as scrap. The illustrated layer 426 is shown for the sake of clarity as having a length and width compliant with the ISO ID-1 Standard. It is appreciated that the punching typically takes place when a plurality of layers 426 are integrally formed as part of a larger sheet (not shown), having a thickness approximately 260 microns.

FIGS. 4L and 4M illustrate attachment of reduced size layer 424 over substrate 402, antenna 404 and smart chip module 406 as seen clearly in FIG. 4M. Preferably the attachment is achieved by known techniques such as lamination.

Figure 4N:
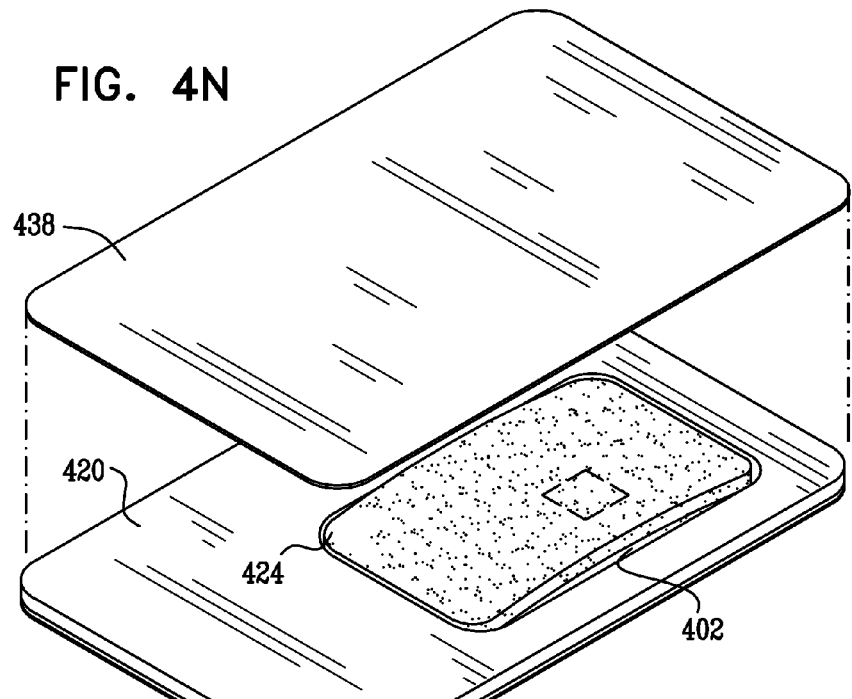
Figure 4O:
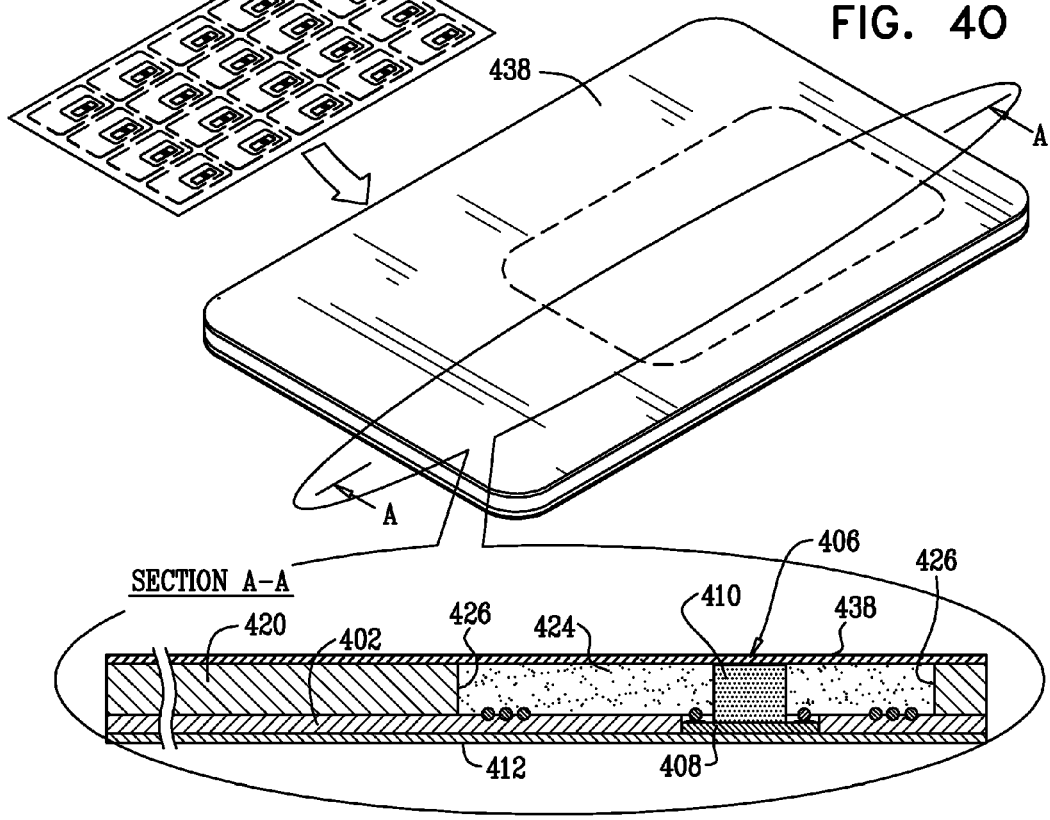

As seen in FIGS. 4N and 4O, following the steps illustrated in FIGS. 4L and 4M, a plastic sheet 438, typically PVC of thickness 40-60 microns, is attached over the structure shown in FIG. 4M so as to overlie substrate 402, outer portion 420, antenna 404, smart card module 406, and reduced size paramagnetic layer 424. The entire structure shown in FIG. 4O, in the form of a sheet 443, corresponding to sheet 403, is preferably laminated together by any suitable laminating technique.

At this stage, the sheet 443 may be transferred to another facility at which an artwork sheet 444, typically PVC of thickness 200 microns, bearing desired graphics and/or text, is attached over plastic sheet 438 and laminated to the sheet

Figure 4P:
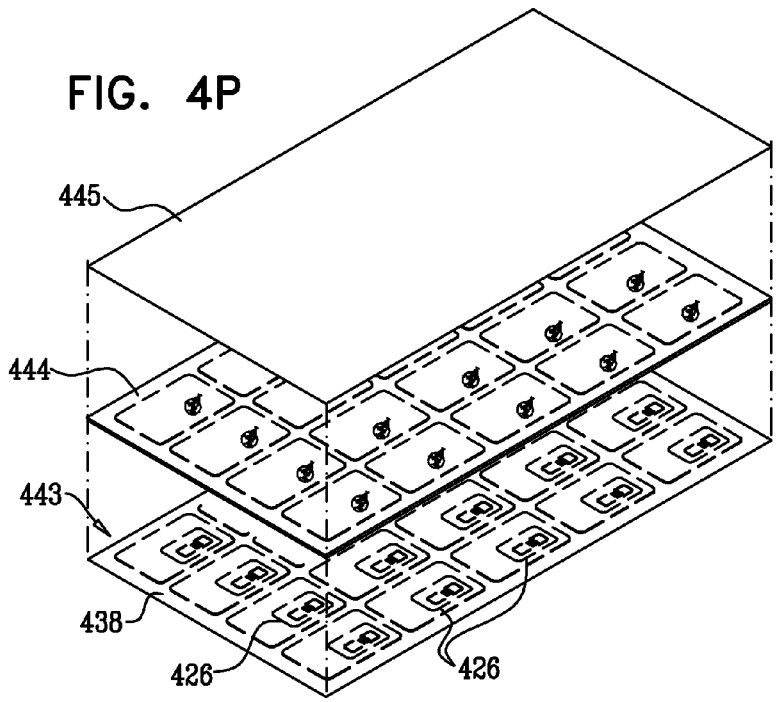

444, as shown in FIG. 4P. Preferably, a clear plastic overlay 445 typically PVC of thickness 70 microns, is formed over the artwork sheet 444.

Figure 4Q:
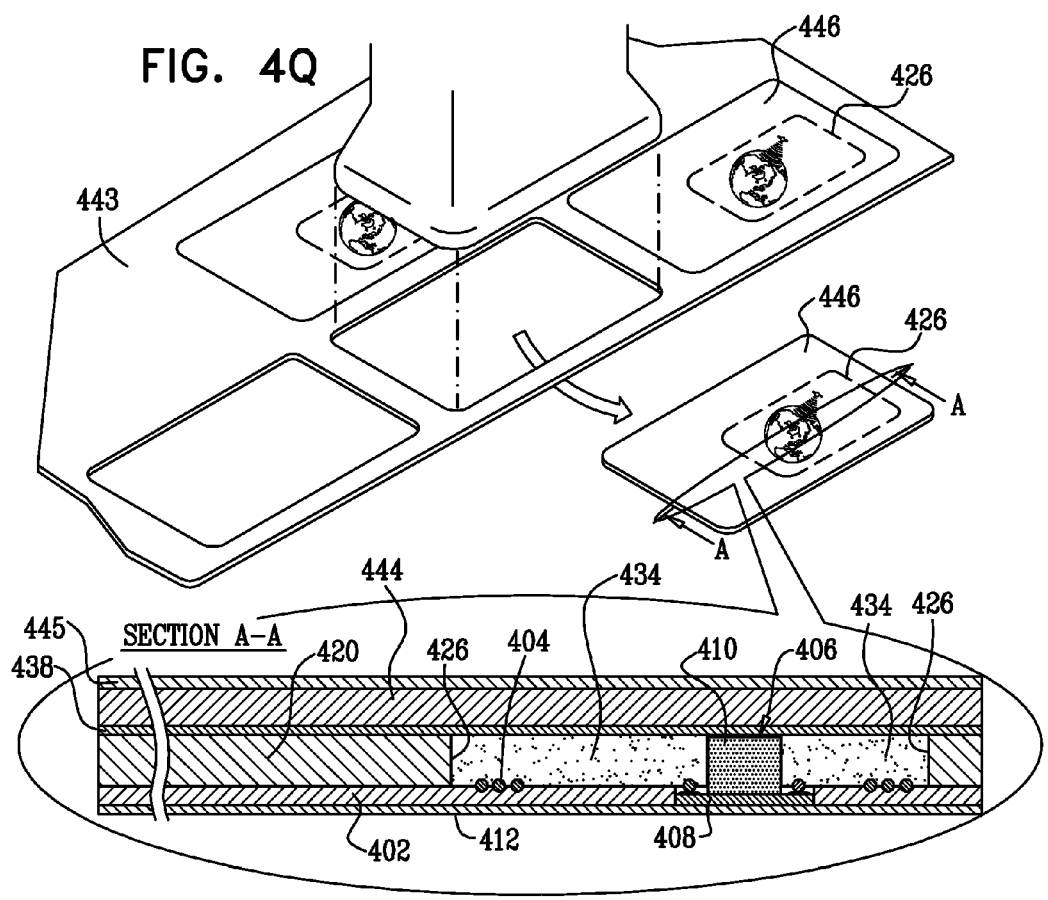

Thereafter, as shown in FIG. 4Q, individual ISO ID-1 Standard sized cards 446, having a thickness of 0.76 mm+−0.08 mm, are cut out of sheet 443 by conventional machinery. The individual ID-1 sized cards 446 are then individually programmed by conventional contactless smart card programming apparatus 448 as seen in FIG. 4R.

Optionally before or following individual programming thereof, the ID-1 sized cards 446 are partially punched or otherwise perforated along a periphery 449 to define user-separable reduced size contactless smart card devices 450, as seen in FIG. 4S. Typical dimensions of the reduced size contactless smart card devices 450 are 30 mm by 50 mm and are selected such that a peripheral portion 451 of compensation layer 420 surrounds the paramagnetic layer 434 in the reduced size contactless smartcard device 450.

Contactless smart stickers may be realized by providing a double sided adhesive layer onto an outer facing surface of sheet 412. The adhesive layer is preferably covered by release paper.

It is appreciated that the order in which the various stages of manufacture are presented hereinabove is not necessarily the only possible order in which these stages may be carried out. The various stages may be carried out in any suitable order.

It will be appreciated by persons skilled in the art that the present invention is not limited by what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

What is claimed is:

1. A method for manufacture of a contactless smart card device comprising:
   mounting at least one antenna and at least one chip module onto a substrate layer;
   placing paramagnetic material over at least part of said at least one antenna; said paramagnetic material overlying said at least one chip module;
   laminating said substrate layer and said paramagnetic material to provide a laminate; and
   perforating said laminate to define a manually separable reduced size smart card device comprising said at least one antenna, said at least one chip module and said paramagnetic material being placed over at least part of said at least one antenna, the entire periphery of said reduced size smart card device extending outwardly of said paramagnetic material.

2. A method for manufacture of a contactless smart card device according to claim 1 wherein said smart card device is a sheet of ISO ID-1 Standard sized smart cards.

3. A method for manufacture of a contactless smart card device according to claim 1 and also comprising cutting individual ISO ID-1 Standard sized cards out of said laminate.

4. A method for manufacture of a contactless smart card device according to claim 1 wherein said smart card device has a thickness which does not exceed 840 microns.

5. A method for manufacture of a contactless smart card device according to claim 1 and also comprising cutting said laminate to create a reduced size smart card device comprising said at least one antenna, said at least one chip module and said paramagnetic material.

6. A method for manufacture of a contactless smart card device according to claim 5 and wherein the entire periphery of said reduced size smart card device extends outwardly of said paramagnetic material.

7. A method for manufacture of a contactless smart card device according to claim 1 and wherein said paramagnetic layer is formed with at least one cut-out to accommodate at least part of said at least one chip module.

8. A method for manufacture of a contactless smart card device according to claim 1 and wherein said paramagnetic layer is formed with at least one recess to accommodate at least part of said at least one chip module.

9. A method for manufacture of a contactless smart card device according to claim 1 and wherein said paramagnetic layer surrounds but does not overlie said at least one chip module.

10. A method for manufacture of a contactless smart card device according to claim 1 and also comprising perforating said laminate to define a manually separable reduced size smart card device comprising said at least one antenna, said at least one chip module and said paramagnetic material placed over at least part of said at least one antenna.

11. A contactless smart card device comprising: a substrate having associated therewith at least one antenna and at least one chip module; and at least one paramagnetic layer covering at least part of said at least one antenna, said paramagnetic layer being formed with at least one engraved recess to accommodate at least part of said at least one chip module, said paramagnetic layer surrounding and overlying said at least one chip module; and said substrate and said at least one paramagnetic layer being laminated together to define a laminate.

12. A contactless smart card device according to claim 11 wherein said smart card device is a sheet of ISO ID-1 Standard sized smart cards.

13. A contactless smart card device according to claim 11 and wherein said smart card device is a smart card having dimensions which are ISO ID-1 Standard compliant.

14. A contactless smart card device according to claim 11 wherein said smart card device has a thickness which does not exceed 840 microns.

15. A contactless smart card device according to claim 11 wherein said smart card device is a reduced size smart card device.

16. A contactless smart card device according to claim 15 wherein the entire periphery of said reduced size smart card device extends outwardly of said paramagnetic material.

17. A contactless smart card device according to claim 11 wherein said laminate is perforated to define a manually separable reduced size smart card device.

\* \* \* \* \*